US012634925B2

(12) United States Patent
Wang et al.

(10) Patent No.: US 12,634,925 B2
(45) Date of Patent: May 19, 2026

(54) INTRA-UE PRIORITIZATION OR MULTIPLEXING FOR HANDLING OVERLAP OF UPLINK CHANNELS

(71) Applicant: Intel Corporation, Santa Clara, CA (US)

(72) Inventors: Yi Wang, Beijing (CN); Toufiqul Islam, Santa Clara, CA (US); Debdeep Chatterjee, San Jose, CA (US); Sergey Panteleev, Dublin (IE); Yingyang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/955,435

(22) Filed: Sep. 28, 2022

(65) Prior Publication Data

US 2023/0035866 A1     Feb. 2, 2023

Related U.S. Application Data

(60) Provisional application No. 63/250,168, filed on Sep. 29, 2021, provisional application No. 63/275,387, filed on Nov. 3, 2021, provisional application No. 63/277,496, filed on Nov. 9, 2021, provisional application No. 63/297,644, filed on Jan. 7, 2022.

(51) Int. Cl.
*H04W 72/1268* (2023.01)
*H04W 72/566* (2023.01)

(52) U.S. Cl.
CPC ..... *H04W 72/1268* (2013.01); *H04W 72/569* (2023.01)

(58) Field of Classification Search
CPC ........... H04W 72/1268; H04W 72/569; H04W 72/21; H04W 72/566
See application file for complete search history.

(56) References Cited

U.S. PATENT DOCUMENTS

2020/0146049 A1* 5/2020 Tang ..................... H04L 1/1854
2022/0394707 A1* 12/2022 Chen .................. H04W 72/569
2023/0156685 A1* 5/2023 Zhang ................... H04W 72/21
370/329

* cited by examiner

*Primary Examiner* — Ankur Jain
(74) *Attorney, Agent, or Firm* — Schwegman Lundberg & Woessner, P.A.

(57) ABSTRACT

Various embodiments herein provide techniques for handling overlap of uplink (UL) channels (e.g., UL control channels and/or UL data channels), such as prioritizing and/or multiplexing uplink channels. In some embodiments, the overlapped channels may have different priorities. Other embodiments may be described and claimed.

16 Claims, 37 Drawing Sheets

LP PUCCH

HP PUCCH

Mux HP UCI onto LP PUSCH

LP PUSCH
Indicate to mux

Figure 3D multiplexing

| HP PUSCH |

| LP PUCCH |     | LP PUCSH |

Multiplex LP UCI onto HP PUSCH
Drop LP PUSCH

Figure 11B multiplexing

| HP PUCCH |

| LP PUCCH |     | LP PUCSH |

Multiplex both LP and HP UCI onto LP PUSCH

Figure 11A

2000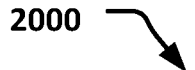

identifying resources on which a user equipment (UE) is to transmit an uplink message with uplink control information (UCI) with a first priority and UCI with a second priority, wherein the first priority is a higher priority than the second priority
2002 determining, based on the identification, not to schedule a physical uplink control channel (PUCCH) with the first priority that overlaps with the identified resources
2004

Figure 20

INTRA-UE PRIORITIZATION OR MULTIPLEXING FOR HANDLING OVERLAP OF UPLINK CHANNELS

CROSS REFERENCE TO RELATED APPLICATION

The present application claims priority to U.S. Provisional Patent Application No. 63/250,168, which was filed Sep. 29, 2021, U.S. Provisional Patent Application No. 63/275,387, which was filed Nov. 3, 2021, U.S. Provisional Patent Application No. 63/277,496, which was filed Nov. 9, 2021, and U.S. Provisional Patent Application No. 63/297,644, which was filed Jan. 7, 2022, the disclosures of which are hereby incorporated by reference.

FIELD

Various embodiments generally may relate to the field of wireless communications. For example, some embodiments may relate to techniques for handling overlap of uplink (UL) channels (e.g., UL control channels and/or UL data channels).

BACKGROUND

In wireless cellular networks, different services may be supported in a carrier or serving cell. A New Radio (NR) user equipment (UE) may support one or more service types. If communication of more than one service type with varying reliability and latency requirements can be made in a carrier/serving cell, it is possible that a scheduled/configured resource for transmission of a first service type may overlap with a resource for transmission of a second service type for a given UE. In order to handle collision and prioritize more urgent transmission, the 3GPP Release 16 (Rel16) specification allows for scheduling or configuring resource for a transmission of either high or low priority where the priority level is indicated to the UE. A configured UE may transmit 'high' priority transmission and drop the 'low' priority transmission in UL in case of an overlap. However, always dropping 'low' priority transmission may be quite detrimental for spectral efficiency and UE perceived throughput for the 'low' priority transmission which may potentially carry high payload control information of one or multiple carriers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 3C, 3D, and 3E illustrate examples of multiplexing UCI in accordance with various embodiments.

FIG. 11A illustrates an example of a HP PUCCH with DCI that overlaps with both LP PUCCH and LP PUSCH, in accordance with various embodiments.

FIG. 11B illustrates an example with dynamic indication in DCI for HP PUSCH to multiplex, in accordance with various embodiments.

FIG. 20 illustrates an example procedure for practicing the various embodiments herein.

DETAILED DESCRIPTION

Figure 1A:
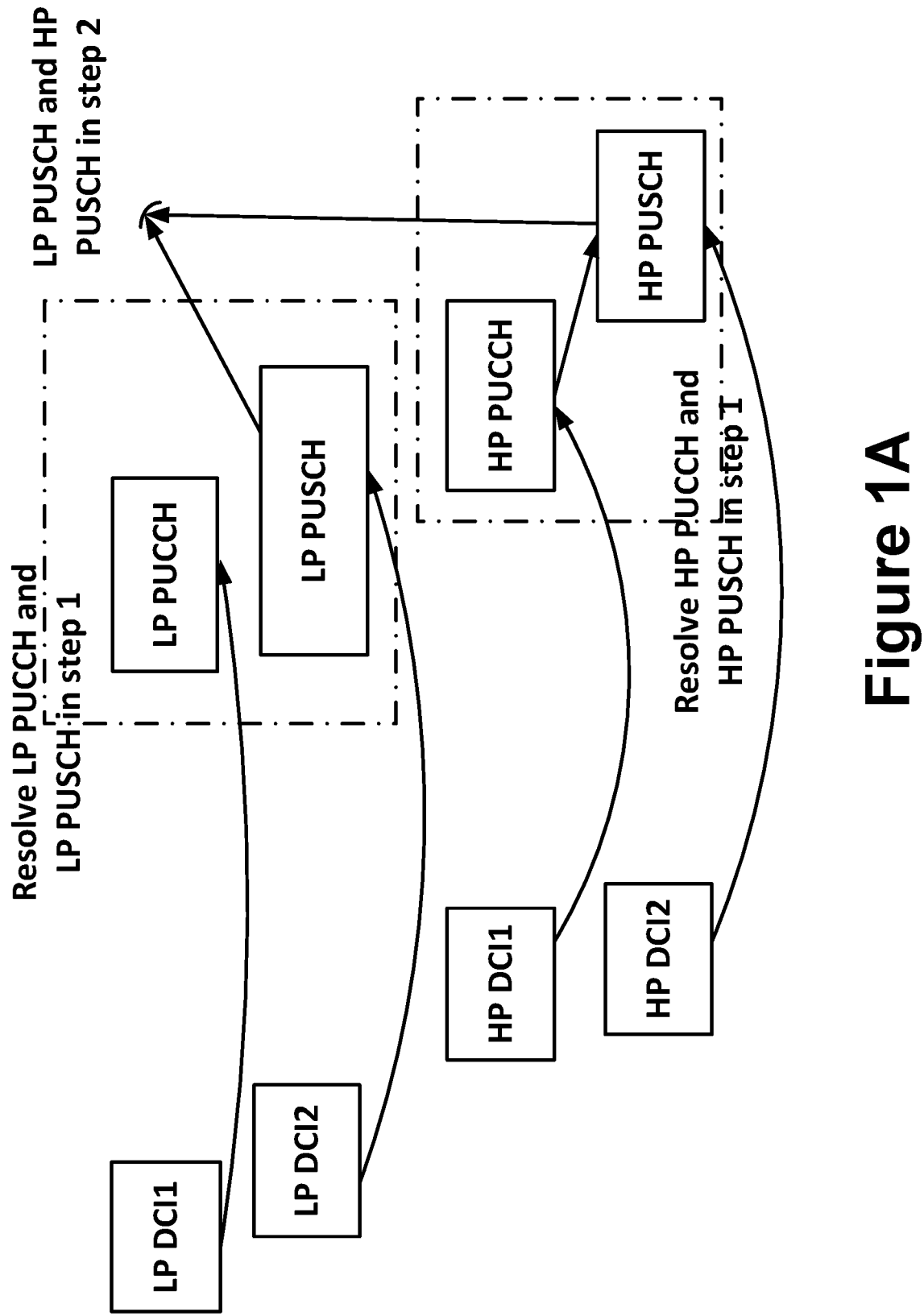
FIG. 1A illustrates an example of a two-step procedure for handling overlapping physical uplink control channels (PUCCHs) and/or physical uplink shared channels (PUSCHs) with different priorities in which resultant UL channels of step 1 is handled in step 2, in accordance with various embodiments.
Figure 1B:
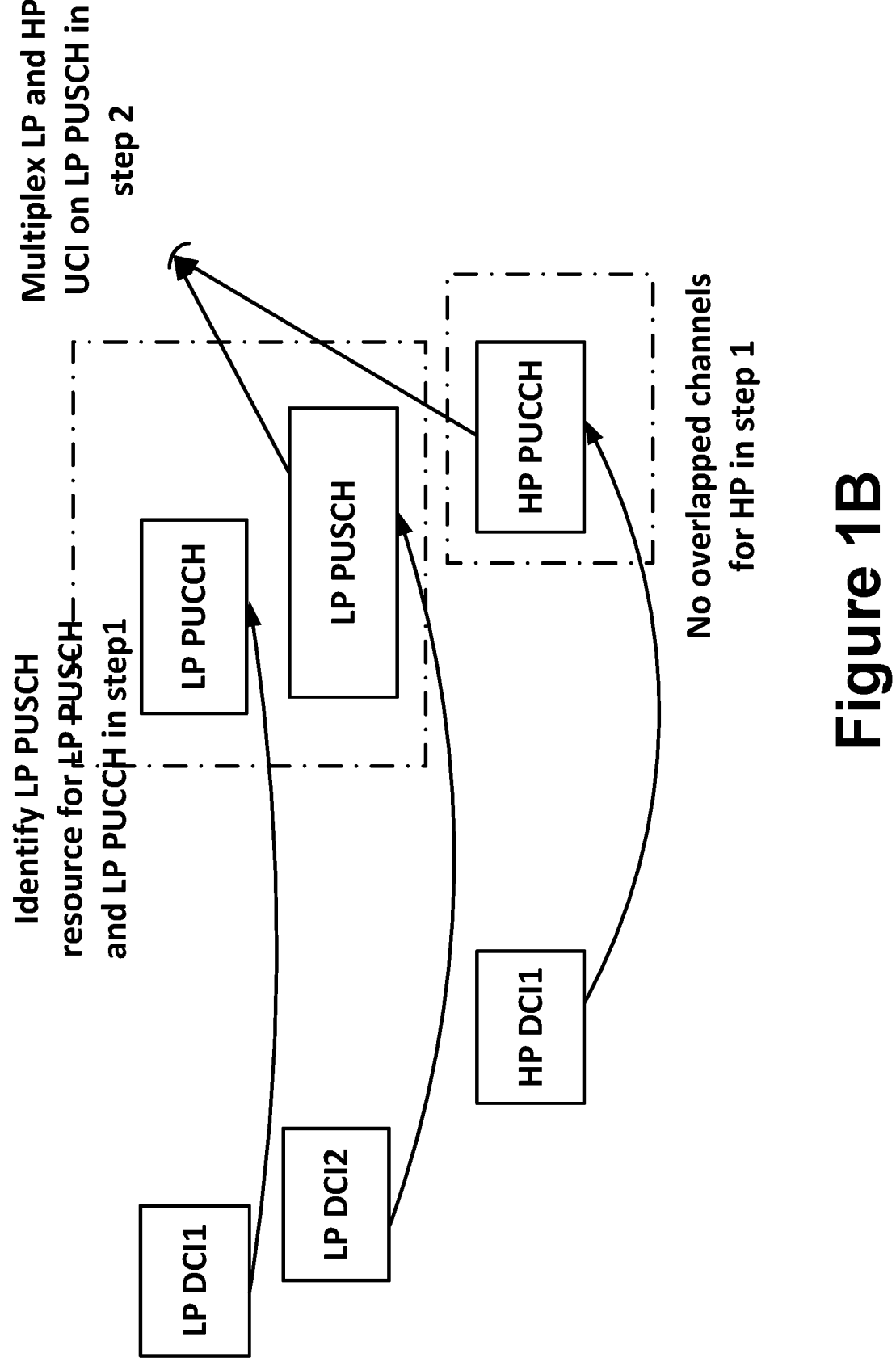
FIG. 1B illustrates an example of the two-step procedure in which resources are identified in step 1 and low priority (LP) and high priority (HP) uplink control information (UCI) is multiplexed in step 2, in accordance with various embodiments.
Figure 1C:
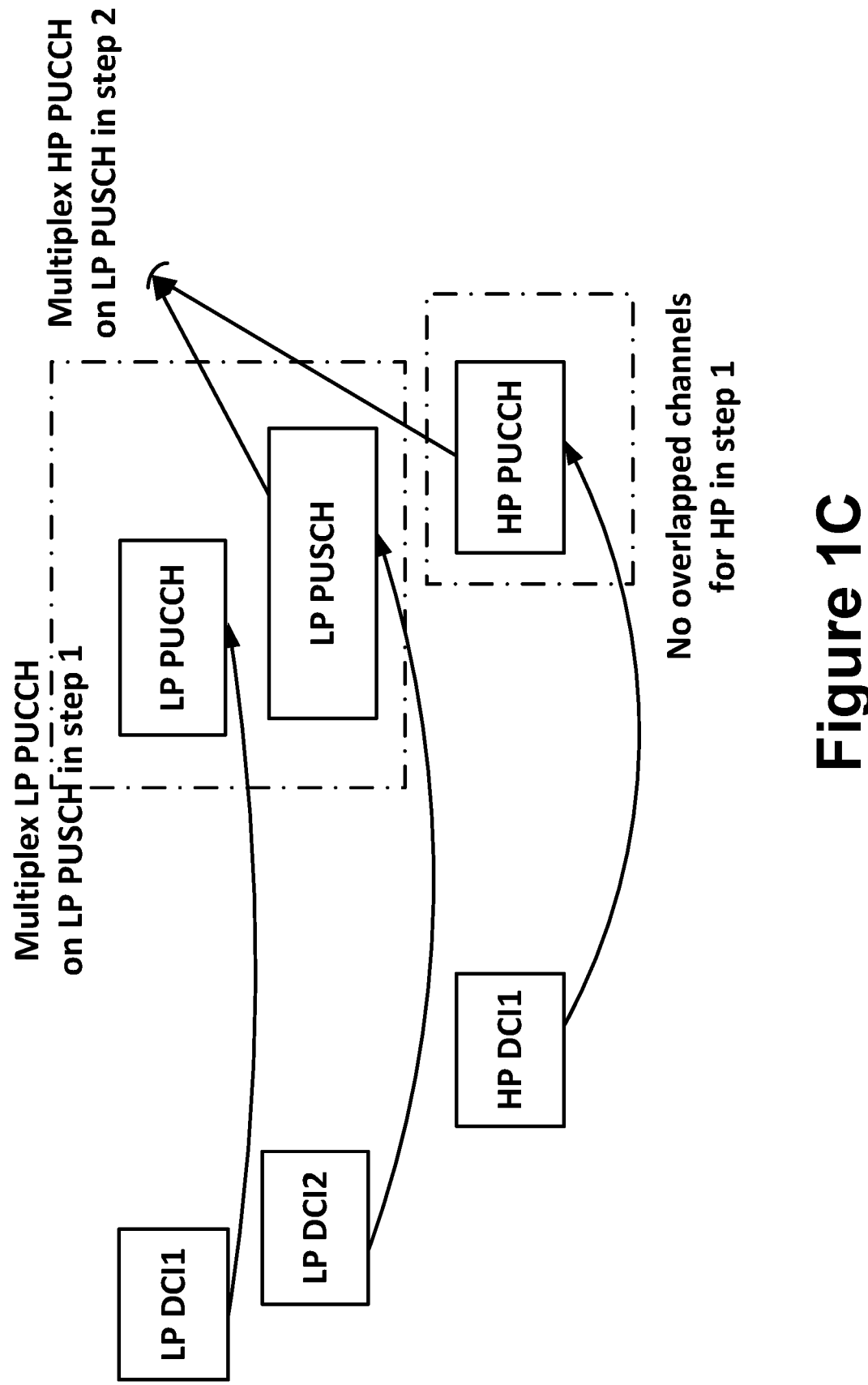
FIG. 1C illustrates an example of the two-step procedure in which the UE performs multiplexing within a same priority in step 1 and multiplexes additional UCI in step 2, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In wireless cellular networks, different services may be supported in a carrier or serving cell. An NR UE may support one or more service types. If communication of more than one service type with varying reliability and latency requirements can be made in a carrier/serving cell, it is possible that a scheduled/configured resource for transmission of a first service type may overlap with a resource for transmission of a second service type for a given UE. In order to handle collision and prioritize more urgent transmission, the 3GPP Release 16 (Rel16) specification allows for scheduling or configuring resource for a transmission of either high or low priority where the priority level is indicated to the UE. A configured UE may transmit 'high' priority transmission and drop the 'low' priority transmission in UL in case of an overlap. However, always dropping 'low' priority transmission may be quite detrimental for spectral efficiency and UE perceived throughput for the 'low' priority transmission which may potentially carry high payload control information of one or multiple carriers. Hence, solution is necessary for efficient multiplexing of UL transmissions of 'high' and 'low' priority for a given UE which may provide better flexibility in resource management without sacrificing QoS requirements for either service types much. Embodiments herein relate to methods of multiplexing and/or prioritization of high priority (HP) and low priority (LP) UL transmissions.

The Release 16 solution considers always dropping of LP channels when there is an overlap of high and low priority UL channels. The existing solution may not be spectrally efficient.

Various embodiments herein provide mechanisms for multiplexing and prioritization between low and high priority UL transmissions. The embodiments may enhance system spectral efficiency and scheduling flexibility.

The embodiments discussed below may be used in licensed or unlicensed spectrum, FDD or TDD or flexible duplex system frame structures, FR1 and/or FR2 spectrum. PUCCH transmission may contain UCI such as one or more of: SR, HARQ-ACK, CSI. According to Rel15, if one or more PUCCHs carrying UCI such as HARQ-ACK and/or CSI overlap with PUSCH, one or more of the UCIs can be multiplexed onto PUSCH and PUCCH can be dropped. PUSCH transmission can be based on dynamic UL grant or without UL grant, e.g., configured grant. PUCCH transmission can be based on dynamic DL assignment or without DL assignment, e.g., PUCCH for SPS PDSCH HARQ-ACK. PUCCH or PUSCH transmission can be of high or low priority. If no priority is configured or indicated, then the transmission may be regarded with low priority. Here, smaller priority index is associated with lower priority, and larger priority index is associated with higher priority.

One or more of the examples/embodiments below consider multiplexing of HARQ-ACKs of different priority. In particular, embodiments may include multiplexing of one or more HARQ-ACKs based on a first codebook and one or more HARQ-ACKs based on a second codebook, where first codebook is associated with high priority and second codebook is associated with low priority. The two codebooks may have any of the following configurations:

One is slot-based and one is sub-slot-based.

Both are slot-based.

Both are sub-slot-based

Here, slot or sub-slot based implies PUCCH resource for HARQ transmission based on a codebook that spans a slot or sub-lot, respectively. For a given numerology, slot occupies 14 symbols for Normal CP and 12 symbols for Extended CP, where a sub-slot duration is less than a slot, e.g., can be from 1 symbol to 13 symbols. A sub-slot may or may not cross the slot boundary.

Here, it is assumed that if a UE is configured with two codebooks, codebooks are configured/associated with different priorities. For example, if first (second) codebook is indicated for use of HARQ-ACK transmission, it is assumed of priority index 0, e.g., low priority (priority index 1, e.g., high priority). Indication of which codebook to use can be conveyed by an explicit indication in a field in a DCI format providing DL scheduling assignment. For SPS-PDSCH, codebook identification can be provided by higher layer signaling. Below, multiplexing HARQ-ACKs based on two HARQ-ACK codebooks and multiplexing two HARQ-ACK codebooks are used interchangeably and have similar meaning.

When a UE handles overlapping PUCCHs/PUSCHs with different priorities within a PUCCH group, in general, there are two steps:

Step 1: Resolve overlapping PUCCHs and/or PUSCHs with the same priority

Step 2: Resolve overlapping PUCCHs and/or PUSCHs with different priorities

In one embodiment, in step 1, UE resolving overlapping PUCCHs and/or PUSCHs with the same priority includes Step 1-1: Resolve overlapped PUCCHs with same priority Step 1-2: Resolve overlapped PUSCH and resultant PUCCHs from step 1-1 with same priority In step 2, the overlapping PUCCHs and/or PUSCHs with different priorities to be resolved is the resultant PUCCHs and/or PUSCHs of step 1.

The resultant PUCCH in step 1-2 is a PUCCH that results from multiplexing overlapped PUCCH resources.

The resultant PUCCH/PUSCH of step 1 in step 2 is a PUCCH/PUSCH that results from multiplexing overlapped PUCCH/PUSCH resources with same priority in step 1.

In step 2, there can be multiple sub-steps, and the outcome can be multiplexing between different priorities or cancellation of LP UL transmission. Alternatively, the outcome can be multiplexing between different priorities, cancellation of LP UL transmission or LP UL transmission without multiplexing with HP. Further details are described below, e.g., with respect to FIGS. 2-5.

UE assumes the timeline for multiplexing and PUCCH overriding (e.g., Section 9.2.5 and 9.2.3 TS 38. 213 v 16.0), if any, should be met for all the PUCCH and PUSCHs with same priority. UE does not consider the interaction between PUCCHs/PUSCHs with different priorities when the UE resolves overlapping PUCCHs and/or PUSCHs with the same priority.

In one example, a UE does not expect handling overlap of PUCCH/PUSCHs in one priority would change the UCI multiplexing or PUCCH overriding procedure and resultant PUCCH/PUSCHs in another priority in step 1.

In one example, a UE does not expect a PUCCH/PUSCH with one priority that results from resolving overlapping PUCCHs and/or PUSCHs with different priorities in or after step 2 to overlap with another PUCCH/PUSCH with same priority. For example, UE may not expect a resultant HP PUCCH after step 2 would overlap with another HP PUCCH or PUSCH which is not previously overlapped in step 1. In another example, a UE does not expect a PUCCH/PUSCH with one priority that results from resolving overlapping PUCCHs and/or PUSCHs with different priorities in or after step 2 to overlap with another PUCCH/PUSCH with same or different priority.

In one example, only the resultant UL channel (PUCCH and/or PUSCH) of step 1 for each priority is handled in step 2, without the consideration of intermediate PUCCH/PUSCH in step 1. As shown in FIG. 1A, in step 1, for LP, LP UCI carried by LP PUCCH is multiplexed onto LP PUSCH, the resultant UL channel is LP PUSCH. In step 1, for HP, HP UCI carried by HP PUCCH is multiplexed onto HP PUSCH, the resultant UL channel is HP PUSCH. Therefore, only LP PUSCH and HP PUSCH is handled in step 2. gNB ensures the corresponding timeline.

In another example, the resultant UL channel (PUCCH and/or PUSCH) of step 1 for low priority is handled with the consideration of intermediate PUCCH/PUSCH for high priority in step 2. Therefore, step 2 is performed before or after resolving overlapping among channels of larger priority in step 1.

In one example, UE identifies the resultant PUCCH/PUSCH for each priority in Step 1 of resolving overlap of channels of same priority without performing multiplexing UCIs of PUCCHs and PUSCHs of same priority. In step 2, UE multiplexes all LP and/or HP UCI onto LP and/or HP PUSCH.

In case of cancellation, UE performs the cancellation before Step 2. Alternatively, UE performs cancellation during step 2.

In another example, UE identifies the resultant PUCCH/PUSCH for each priority in Step 1 of resolving overlap of channels of same priority and performs multiplexing UCIs of PUCCHs and PUSCHs of same priority. In step 2, UE multiplexes additional LP and/or HP UCIs onto LP and/or HP PUSCH with previously multiplexed UCIs, if any.

In one example, if there are overlapped PUSCHs with different priorities, UE performs the cancellation of LP PUSCH before step 1, or before step 1-2 for low priority.

In another example, if there're overlapped PUSCHs with different priorities, and if there is only one MAC PDU is generated, UE performs the cancellation of LP PUSCH before step 1, or before step 1-2 for low priority. For example, if LP PUSCH and HP PUSCH is overlapped, MAC layer only generates MAC PDU for HP PUSCH while no MAC PDU for LP PUSCH. Then, UE cancels LP PUSCH before step 1-1 and step 1-2 for LP UL channels, or UE removes the LP PUSCH in step 1-2 for LP UL channels.

In another example, if there are overlapped PUSCHs with different priorities, and if there is more than one MAC PDU is generated for the PUSCHs, UE performs the cancellation of LP PUSCH before step 2, or in step 2. For example, UE cancels LP PUSCH before resolving overlapped PUCCH and PUSCH with different priorities in step 2, or UE cancels LP PUSCH after resolving overlapped PUCCH and PUSCH with different priorities in step 2.

In one embodiment, in step 2, the overlapping PUCCHs and/or PUSCHs with different priorities to be resolved is the resultant PUCCHs and/or PUSCHs of step 1.

In step 2, a UE decides whether to multiplex overlapped PUCCHs or overlapped PUCCH and PUSCHs with different priorities or not multiplex overlapped PUCCHs or overlapped PUCCH and PUSCHs with different priorities. If UE does not multiplex overlapped PUCCHs or overlapped PUCCH and PUSCHs with different priorities, UE cancels the overlapped PUCCH or PUSCH with low priority, or UE transmits the PUCCH or PUSCH with low priority without multiplexing with HP UL channel.

UE cancels the overlapped PUCCH or PUSCH with low priority according to at least one of the following rules:

(1) UE cancels a LP PUCCH or PUSCH, and transmits HP PUCCH or PUSCH, if the LP PUCCH or PUSCH carries a LP UCI type that cannot be multiplexed with a HP PUCCH or PUSCH. For example, if a LP PUCCH carries LP periodic CSI, UE cancels the LP PUCCH, because LP periodic CSI cannot be multiplexed with a HP UCI or HP PUSCH.

(2) UE cancels a LP PUCCH or PUSCH, and transmits HP PUCCH, if the LP PUCCH or PUSCH resource that results from multiplexing HP PUCCH with the LP PUCCH or PUSCH ends later than the last symbol of the HP PUCCH.

a. UE cancels a LP PUCCH, and transmits HP PUCCH without LP UCI, if the resultant HP PUCCH resource that would be used for multiplexing HP PUCCH with the LP PUCCH ends later than the last symbol of the HP PUCCH before multiplexing.

b. UE cancels a LP PUSCH, and transmits HP PUCCH, if the LP PUSCH resource that results from multiplexing HP PUCCH with the LP PUSCH ends later than the last symbol of HP PUCCH before multiplexing.

(3) UE cancels a LP PUCCH, and transmits HP PUCCH without LP UCI, if the PUCCH resource that results from multiplexing HP PUCCH with the LP PUCCH would overlap with another UL channel (PUCCH or PUSCH) with same priority as the resultant PUCCH resource.

(4) UE cancels a LP PUCCH or PUSCH, and transmits HP PUCCH or PUSCH, if the LP PUCCH or PUSCH resource that results from multiplexing HP PUCCH with the LP PUCCH or PUSCH would be cancelled.

For example, the LP PUCCH or PUSCH would be semi-statically cancelled by another channel. The another channel includes at least HP PUCCH or PUSCH not in response to a DCI, semi-static DL symbols, SS/PBCH, Type-0 CSS with Coreset 0.

For another example, the LP PUCCH or PUSCH would be cancelled by another channel. The another channel includes at least HP PUCCH or PUSCH, flexible or DL symbol indicated by SFI or dynamic grant, semi-static DL symbols, SS/PBCH, Type-0 CSS with Coreset 0. Here, the presence of the another channel should be known before the latest time to determine multiplexing.

(5) UE cancels a LP PUCCH or PUSCH, and transmits HP PUCCH or PUSCH, if the timeline for multiplexing is not met for one or more of the overlapping PUCCH/PUSCHs. For example, if a HP PUCCH overlaps with a LP PUSCH, but the HP PUCCH does not meet the timeline for multiplexing UCI onto the LP PUSCH, UE cancels the LP PUSCH without multiplexing HP PUCCH with the LP PUSCH. UE does not expect to be indicated to multiplex the channels if the timeline is not met. UE expects the timeline for cancellation is met.

Figure 2:
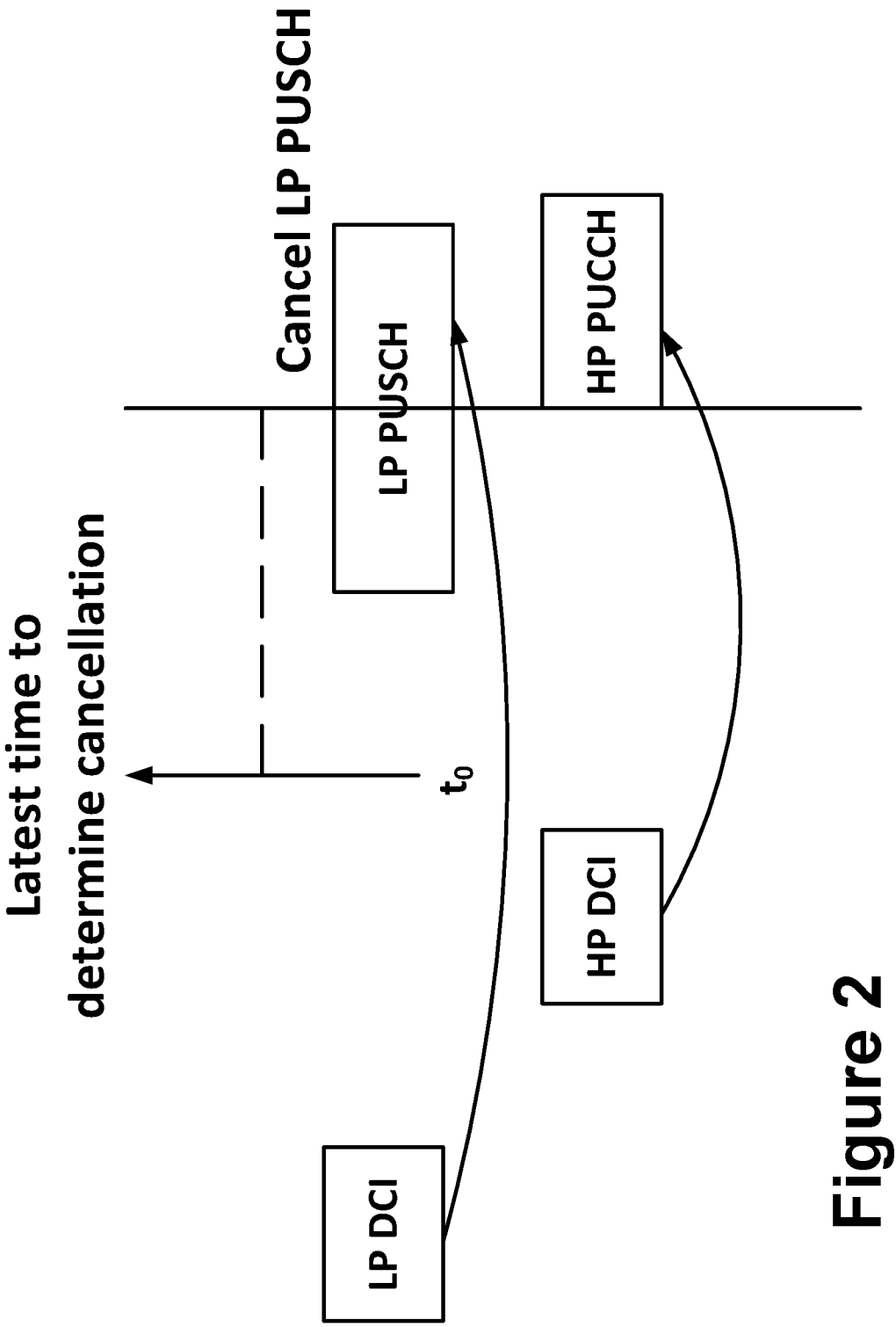
FIG. 2 illustrates an example in which a multiplexing timeline is not met but a cancellation timeline is met, in accordance with various embodiments.

FIG. 2 provides one example. In Rel-15, if a HARQ-ACK is to be multiplexed onto a PUSCH, the DL assignment for PDSCH associated with the HARQ-ACK transmission should not come later than the UL grant, otherwise, it is an error case. Here, if a UL grant scheduling LP PUSCH arrives earlier than a DL assignment scheduling HP PDSCH with HARQ-ACK transmission overlapped with the LP PUSCH, the timeline is not met. Then, UE cancels the LP PUSCH transmission.

FIG. 3 provides another example. To reduce the impact on HP scheduling, the timeline for multiplexing of HP UCI onto LP PUSCH can be relaxed, compared with Rel-15. The DL assignment for a PDSCH associated with HP PUCCH can come later than UL grant for LP PUSCH. As long as the DL assignment comes no later than the latest time to determine multiplexing which is determined by the first symbol S0 of the earliest PUCCH or PUSCH among the overlapped PUCCHs and PUSCHs and $$T_{proc,1}^{mux,i}, T_{proc,2}^{mux,i}, T_{proc,release}^{mux,i}$$

and $$T_{proc,CSI}^{mux}$$

(cf. Section 9.2.5 TS 38.213 v 16.0), UE multiplexes the HP HARQ-ACK onto the LP PUSCH, otherwise, UE cancels the LP PUSCH.

(6) UE cancels a LP PUCCH or PUSCH, and transmits HP PUCCH or PUSCH, if the UE receives an indication to not multiplex overlapped HP PUCCH or PUSCH with the LP PUCCH or PUSCH.

For example, a UE receives an UL grant, such as in DCI format 0-1, 0-2, for a HP PUSCH with the indication to disable multiplexing LP UCI onto the HP PUSCH.

In one example, if a UE receives a DCI without the bit field of dynamic indication of multiplexing, such as in DCI 0_0 or DCI 1_0, it is treated as an indication of no multiplexing. Alternatively, it is treated as an indication of multiplexing, if the multiplexing is enabled by RRC signaling.

(7) In another example, if a UE is configured with semi-static indication of multiplexing, e.g., by RRC signaling, a DCI without the bit field of dynamic indication of multiplexing is treated as an indication of multiplexing. UE cancels a LP PUSCH, and transmits HP PUCCH, if the LP PUSCH is not in response to a DCI. For example, a LP PUSCH is a CG PUSCH.

In Rel-16, a UCI is multiplexed onto a PUSCH without checking the PUSCH overlapped with semi-static DL symbol or SS/PBCH or Coreset 0. Therefore, it is possible that the PUSCH with UCI is dropped. To avoid drop of HP UCI, HP UCI is not multiplexed onto the LP CG PUSCH.

(8) UE cancels a LP PUCCH, and transmits HP PUCCH, if the HP PUCCH is not in response to a DCI.

(9) UE cancels a LP PUCCH, and transmits HP PUCCHs without LP UCI, if the LP PUCCH overlaps with more than one non-overlapped HP PUCCHs.

(10) UE cancels a LP PUCCH or LP PUSCH, if the starting symbol of LP PUCCH or LP PUSCH is earlier than the overlapped HP PUCCH or HP PUSCH, if a UE has UE capability of ul-IntraUE-Mux-r16. Alternatively, UE cancels a LP PUCCH or LP PUSCH, if the starting symbol of LP PUCCH or LP PUSCH is in a sub-slot earlier than the sub-slot of the overlapped HP PUCCH or HP PUSCH, if a UE has UE capability of ul-IntraUE-Mux-r16.

Then, the UE can cancel the LP PUSCH or LP PUCCH before the first symbol that would overlap with the HP PUSCH or HP PUCCH transmission, according to the cancellation timeline, e.g., $T_{proc,2}$ with $d_{2,1}=d_1$ wherein $d_1$ is determined by pusch-PreparationLow-Priority-r16 with the reference to the first symbol of LP PUSCH or LP PUCCH that would overlap with the HP PUSCH or HP PUCCH transmission. In one example, gNB can configure whether UE cancels LP PUCCH or LP PUSCH as described in (10), or UE multiplexed LP PUCCH or LP PUSCH with overlapped HP PUCCH or HP PUSCH with the assumption of multiplexing timeline is met.

(11) UE multiplexed LP PUCCH/PUSCHs with HP PUCCH/PUSCHs, if the condition to cancel the LP PUCCH or PUSCH is not met. The condition can be at least one of (1)~(10), or can be other pre-defined rules.

UE transmits the PUCCH or PUSCH with low priority without multiplexing with HP UL channel according to at least one of the following rules:

(12) If a PUCCH with priority i overlaps with a PUCCH with priority j, and at least one of the PUCCHs can be multiplexed with another PUSCH. UE transmits one PUCCH, and transmits a PUSCH with UCI from the other PUCCH.

Figure 3A:
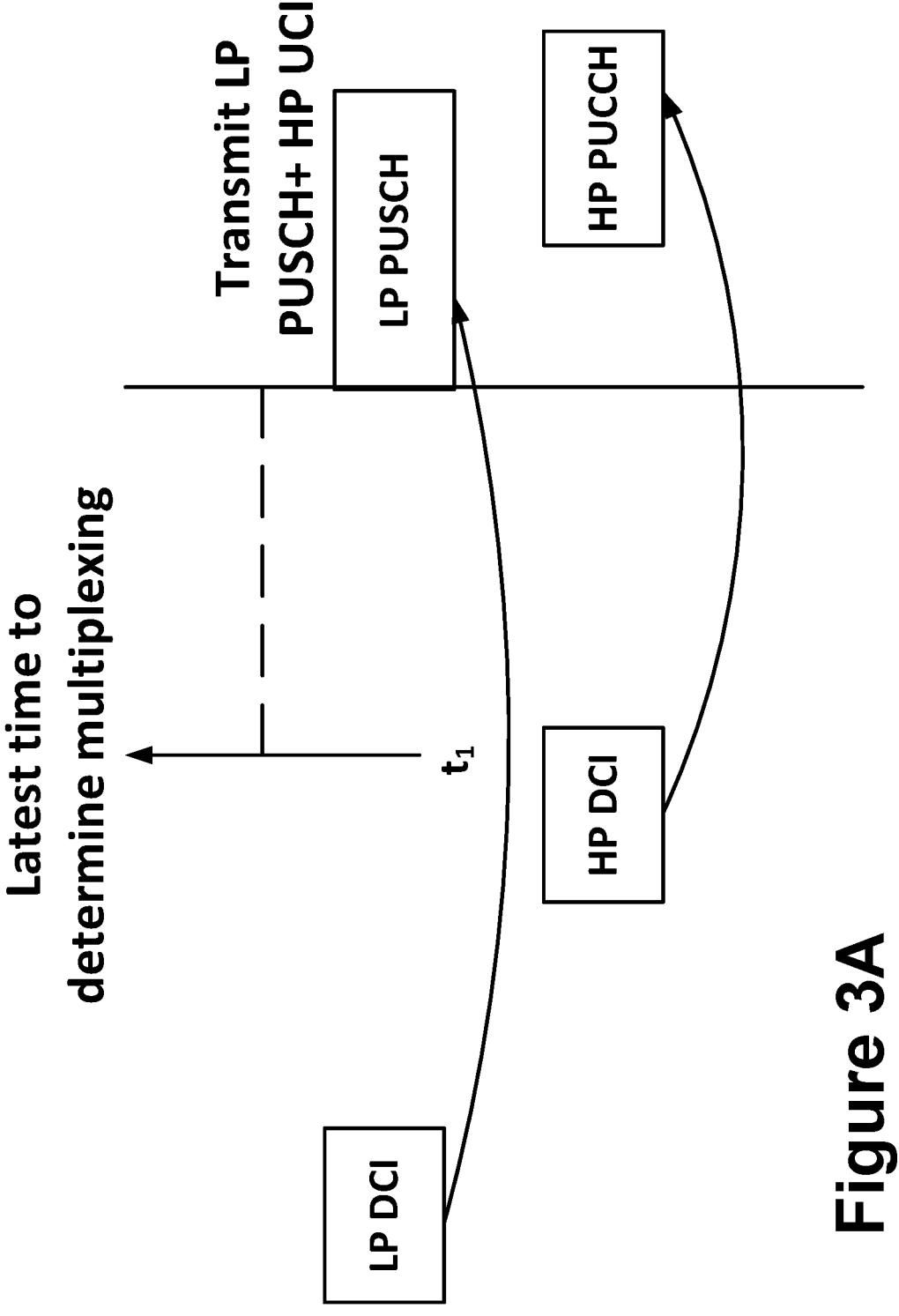
FIG. 3A illustrates an example in which a multiplexing timeline is met and UE multiplexes HP UCI onto LP PUSCH, in accordance with various embodiments.
Figure 3B:
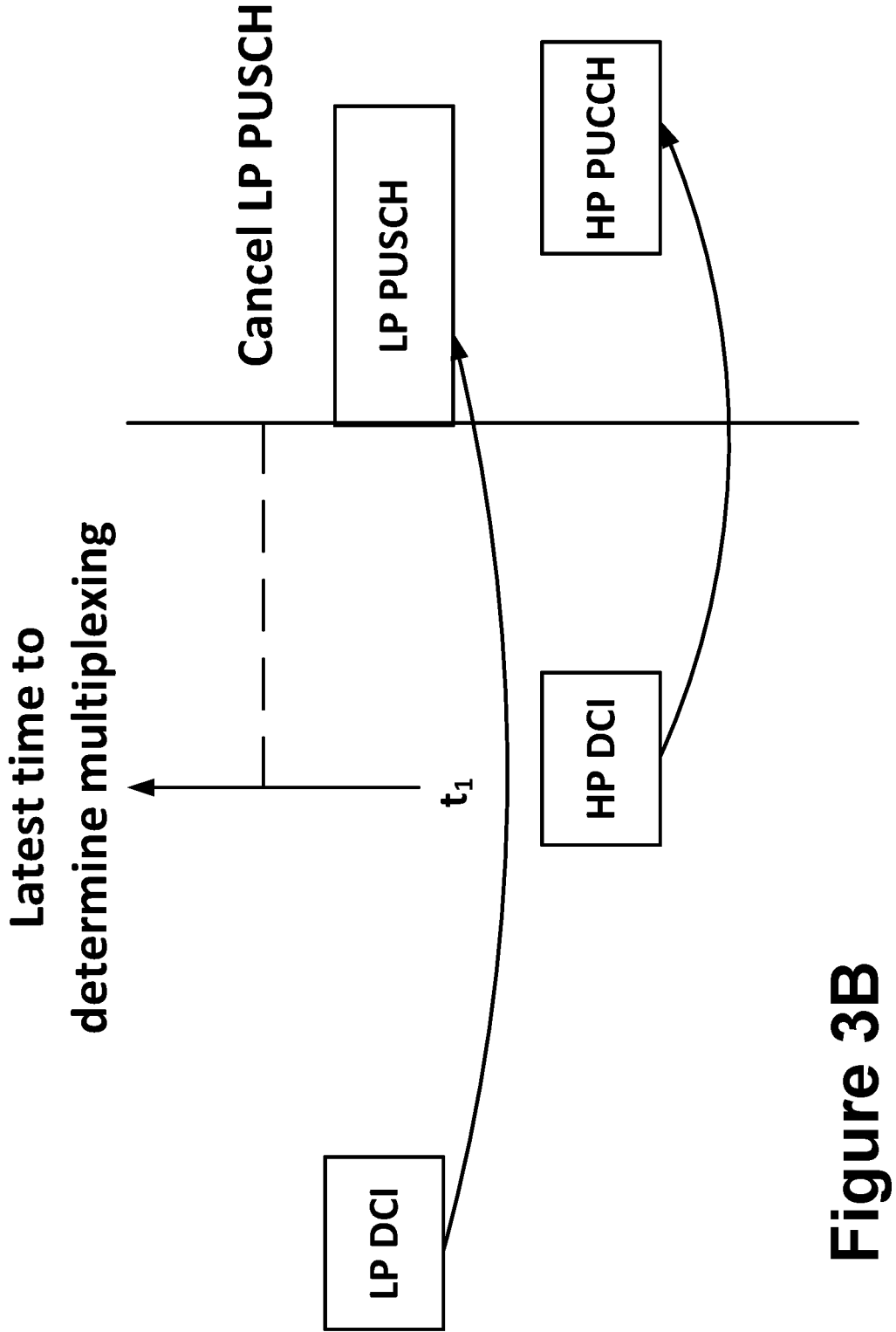
FIG. 3B illustrates an example in which a multiplexing timeline is not met and UE cancels LP PUSCH and transmits HP PUCCH, in accordance with various embodiments.
Figure 3C:
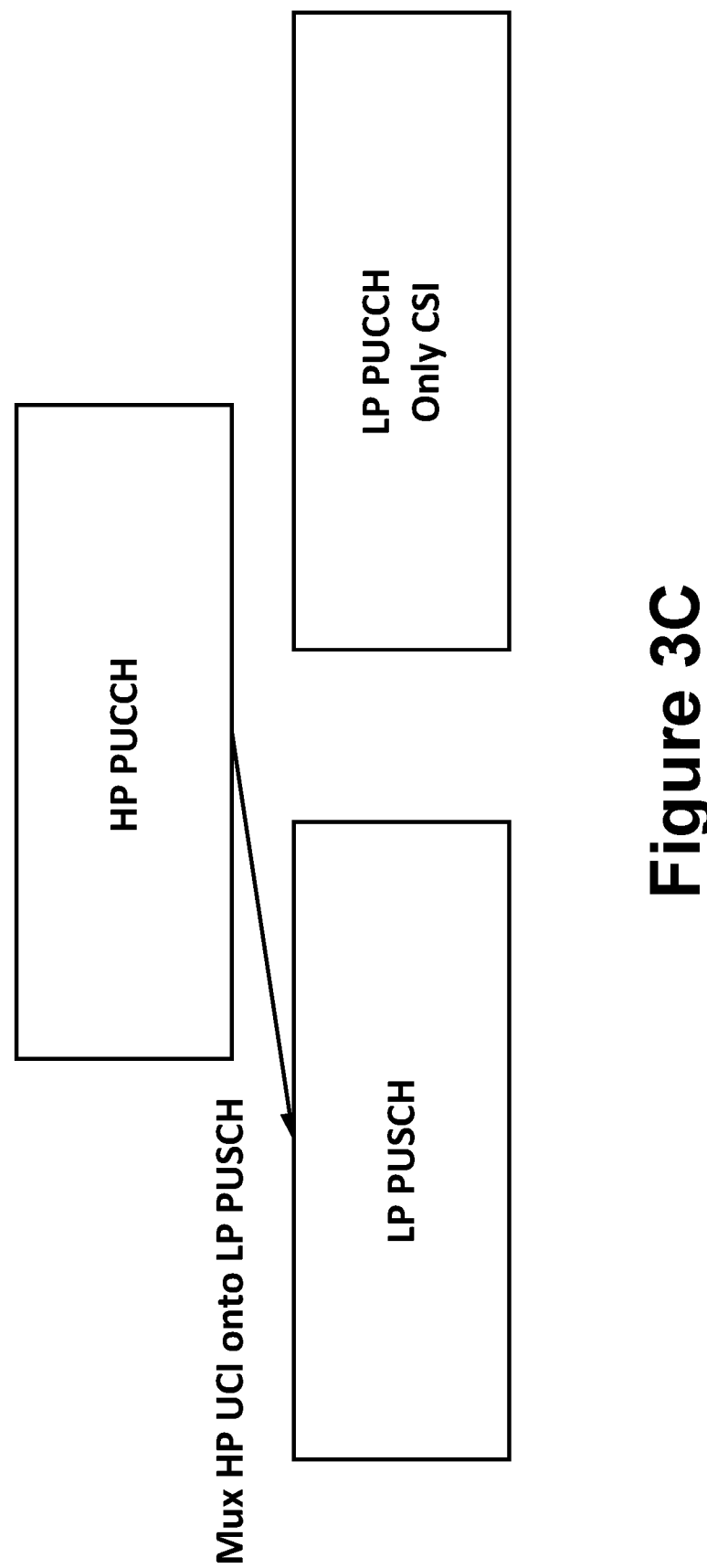
Figure 3D:
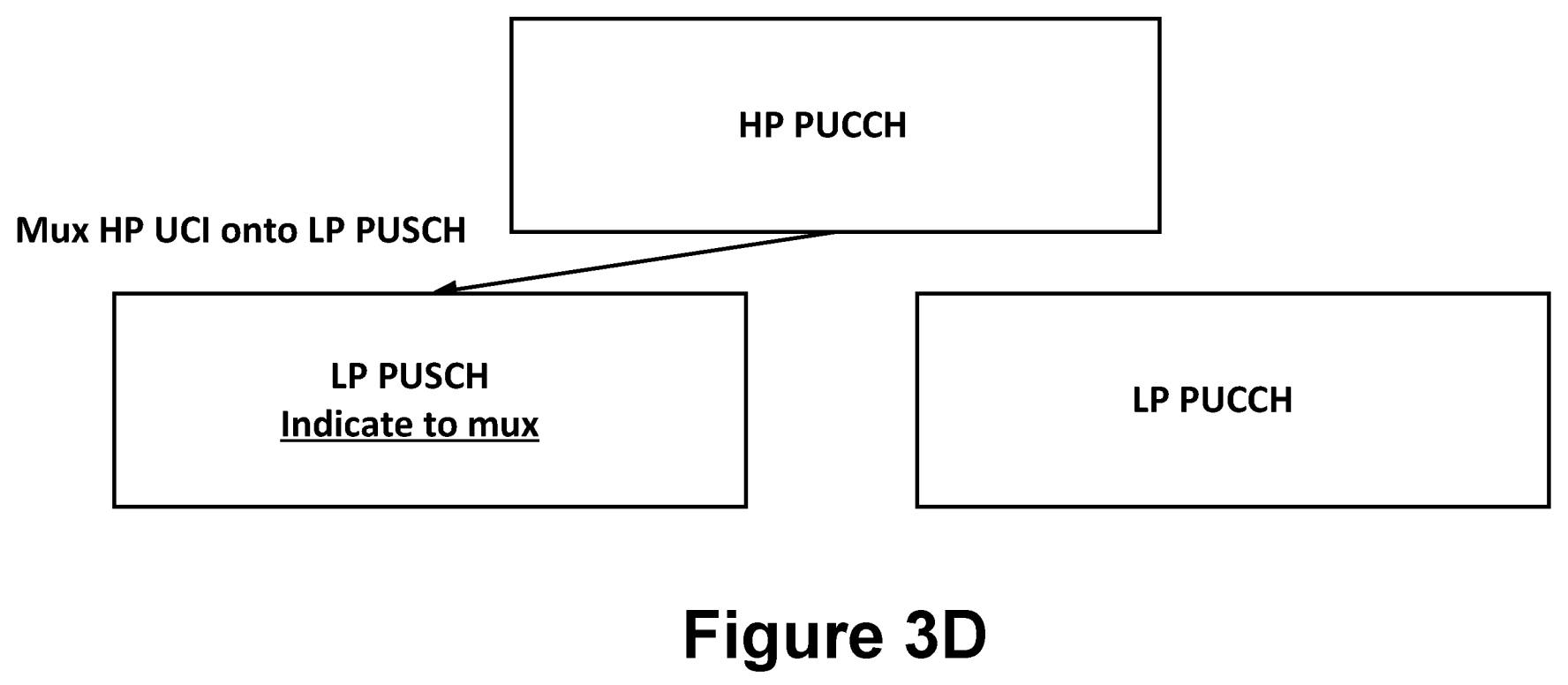
Figure 3E:
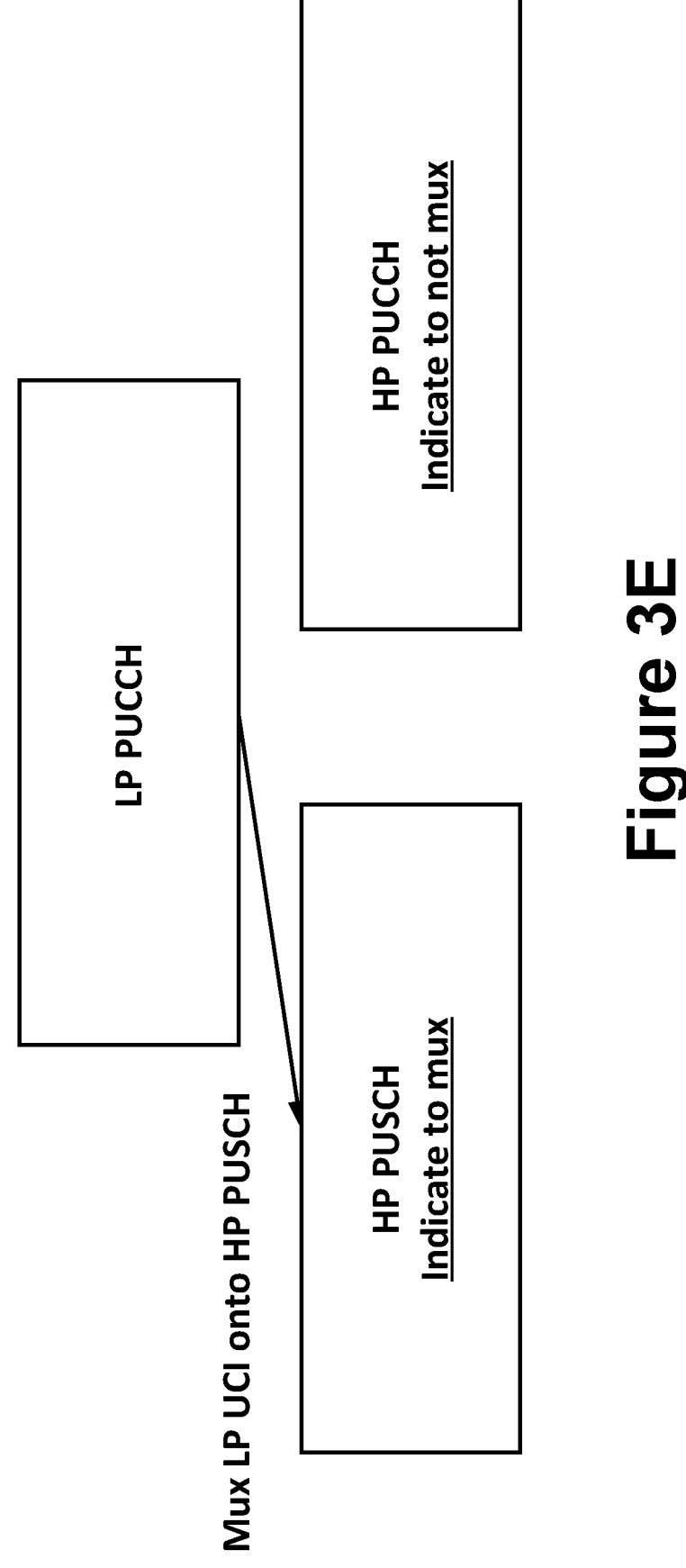

For example, if a LP PUCCH carries a LP UCI type that cannot be multiplexed with the HP PUCCH, and the HP PUCCH can be multiplexed with a LP PUSCH. Then, UE transmits LP PUSCH with HP UCI and transmits LP PUCCH without multiplexing with HP PUCCH, as shown in FIG. 3C. For another example, if a PUSCH indicates multiplexing, then, the PUCCH with priority i overlaps with the PUSCH is multiplexed with the PUSCH. UE can transmit another PUCCH with priority j overlaps with the PUCCH with priority i, as shown in FIGS. 3D and 3E.

In one embodiment, if UE cancels LP PUSCH or PUCCH, UE cancels the LP PUSCH or PUCCH before the first symbol that would overlap with the HP PUSCH or PUCCH transmission, with the assumption that the corresponding timeline is met. For example, if a UE indicates UE capability of ul-IntraUE-Mux-r16, UE can cancel the LP PUSCH or PUCCH before the first symbol that would overlap with the HP PUSCH or PUCCH transmission, according to the cancellation timeline, e.g., $T_{proc,2}$ with $d_{2,1}=d_1$ wherein $d_1$ is determined by pusch-PreparationLowPriority-r16 with the reference to the first symbol of LP PUSCH or PUCCH that would overlap with the HP PUSCH or PUCCH transmission. In one example, gNB can configure UE to cancel LP PUSCH or PUCCH before first symbol that would overlap with the HP PUSCH or PUCCH transmission or before first symbols of the LP PUSCH or PUCCH. In one example, gNB can configure UE to cancel LP PUSCH or PUCCH before first symbol that would overlap with the HP PUSCH or PUCCH transmission or before first symbols of the LP PUSCH or PUCCH. It is noted that only PUCCH and PUSCH which would be multiplexed or cancelled need to meet the corresponding timeline, while PUCCH and PUSCH without multiplexing or cancellation operation do not need to meet the corresponding timeline. For example, if PUCCH and PUSCH are non-overlapped, or overlapped but can be transmitted simultaneously, the multiplexing or cancellation timeline is not applied.

Alternatively, a UE cancels the LP PUSCH or PUCCH before the first symbols of the LP PUSCH or PUCCH, with the assumption that the corresponding timeline is met. For example, if a UE does not indicate UE capability of ul-IntraUE-Mux-r16, UE can cancel the LP PUSCH or PUCCH before the first symbols of the LP PUSCH or PUCCH, according to the cancellation timeline, e.g., $T_{proc,2}$ with the reference to the first symbol of LP PUSCH or PUCCH without pusch-PreparationLowPriority-r16.

In one embodiment, if a UE indicates UE capability of ul-IntraUE-Mux-r16, for overlapped UL channels with different priorities, the UE can perform cancellation at least from the first overlapped symbol of a LP UL channel with Rel-16 timeline, if the overlapped UL channels are at least one of following cases, (a) A LP PUCCH only carries LP CSI overlapping with a HP PUCCH or PUSCH (b) A LP PUCCH only carries LP SR overlapping with a HP PUCCH or PUSCH.

(c) A LP PUCCH with PUCCH format 0 only carries LP SR overlapping with another HP PUCCH with PUCCH format 1 carrying HP HARQ-ACK or with a HP PUSCH.

(d) A LP PUCCH overlaps with a HP PUCCH, and the starting symbol of LP PUCCH is in an earlier sub-slot of the HP PUCCH.

(e) A LP PUSCH overlaps with a HP PUCCH, and the starting symbol of LP PUCCH is in an earlier sub-slot of the HP PUCCH.

(f) ALP PUCCH overlaps with a HP PUSCH, and the starting symbol of LP PUCCH is in an earlier sub-slot of the starting symbol of HP PUSCH.

(g) A LP PUSCH overlaps with a HP PUSCH.

In these cases, DCI for the HP UL channel can come later than the latest multiplexing time of the LP PUCCH.

In one embodiment, in step 1 or step 2, to resolve the overlapping for PUCCHs and PUCCHs with slot-based PUCCH resource, Step A: determine the set Q which includes the set of resources for transmission of corresponding PUCCHs in a single slot.

Step B: Order resources in current set Q and determine PUCCH resource index j for PUCCH resources within set Q, j=0, 1, 2 . . . , according to a pre-defined rule. For example, the pre-defined rule to determine the ordering of PUCCH resource index is based on Section 9.2.5 and 9.2.3 TS 38. 213 v 16.0)

Step C: find a PUCCH resource with smallest PUCCH resource index j and all other PUCCH resources overlapped with the PUCCH resource.

Step D: determine a single PUCCH resource for multiplexing UCI associated with all the PUCCH resources. The single PUCCH resource is indexed with j.

Step E: remove all the PUCCH resources which are already multiplexed into the single PUCCH resource from set Q, and add the resultant single PUCCH resource (with index j) into set Q.

Restart from Step B to Step E with updated set Q, until all PUCCH resources in the set Q is checked.

Due to multiple possibilities of multiplexing and cancellation between different priorities as previously provided, the PUCCH resources to be cancelled is excluded from set Q, therefore, set Q in step A does not include such PUCCH resources. For example, if a resultant PUCCH resource of step 1 only contains LP CSI and the PUCCH resource overlaps with any resource from the resultant HP channels of step 1, the PUCCH resource is excluded. Alternatively, the PUCCH resources to be cancelled are included in set Q, the cancellation is performed in step C or D or E as described below. If a resultant PUCCH resource of step 1 contains UCI type which can not be multiplexed and UCI type which would be multiplexed, the PUCCH resource is still included in set Q, while the UCI which can not be multiplexed is dropped, when determining the resultant PUCCH resource in step 2. For example, if after step1, there is one LP PUCCH with HARQ-ACK and CSI, and one HP PUCCH with HP HARQ-ACK. Both PUCCH resources are added into set Q, and UE determines single PUCCH resource according to the HP HARQ-ACK and LP HARQ-ACK without LP CSI. Alternatively, if a resultant PUCCH resource of step 1 contains UCI type which can not be multiplexed and UCI type which would be multiplexed, the PUCCH resource is still included in set Q, while the UCI which can not be multiplexed is dropped after the final step of step 2. For example, if after step1, there is one LP PUCCH with LP HARQ-ACK and CSI, and one HP PUCCH with HP HARQ-ACK, and one HP PUSCH. Both PUCCH resources are added into set Q, and UE determines single PUCCH resource according to the HP HARQ-ACK and LP HARQ-ACK and CSI. When UE resolves overlapped HP PUSCH and the single PUCCH resource, UE multiplexes HP HARQ-ACK with HP PUSCH and drops LP CSI.

To resolve the overlapping for PUCCHs and PUCCHs with different priority in step 2, in step B, only HP PUCCH resource in current set Q is ordered and determine the HP PUCCH resource index j according to pre-defined rule. For example, index j is ordered based on the order of the starting symbol of the HP PUCCH resources. In step C, find a PUCCH resource with smallest PUCCH resource index j and all other LP PUCCH resources overlapped with the PUCCH resource index j. The cancellation of LP PUCCHs overlapping with HP PUCCH but not multiplexed with the HP PUCCH is performed in step C or D or E.

To resolve the overlapping for PUCCHs and PUCCHs with different priority in step 2, in step D, the single PUCCH resource for multiplexing UCI associated with all the PUCCH resources is a HP PUCCH resource, if there is at least one HP PUCCH resource within all the PUCCH resources determined by step C. In one example, if one LP PUCCH resource overlaps with more than one non-over-lapped HP PUCCH resources, and at least one HP PUCCH resource is the resource for HP HARQ-ACK, the single PUCCH resource for multiplexing UCI associated with all the PUCCH resources is based on the HP PUCCH resource for HP HARQ-ACK. In another example, if one LP PUCCH resource overlaps with more than one non-overlapped HP PUCCH resources, the single PUCCH resource for multi-plexing UCI associated with all the PUCCH resources is based on the HP PUCCH resource with earliest starting symbol, or with the latest ending symbol, or with the earliest ending symbol. In another example, if the selected single PUCCH resource is incapable of transmitting all HP UCIs associated with all the HP PUCCH resources, LP PUCCH is dropped, and non-overlapped HP PUCCH resources without multiplexing is transmitted. In other words, in step D, there can be more than one PUCCH resource after resolving UCI associated with all the PUCCH resources. For example, if one LP PUCCH overlaps with two HP SR, and the single PUCCH resource would be 1st HP SR PUCCH resource, which is not capable of transmitting two HP SRs, then, LP PUCCH is dropped.

Figure 4A:
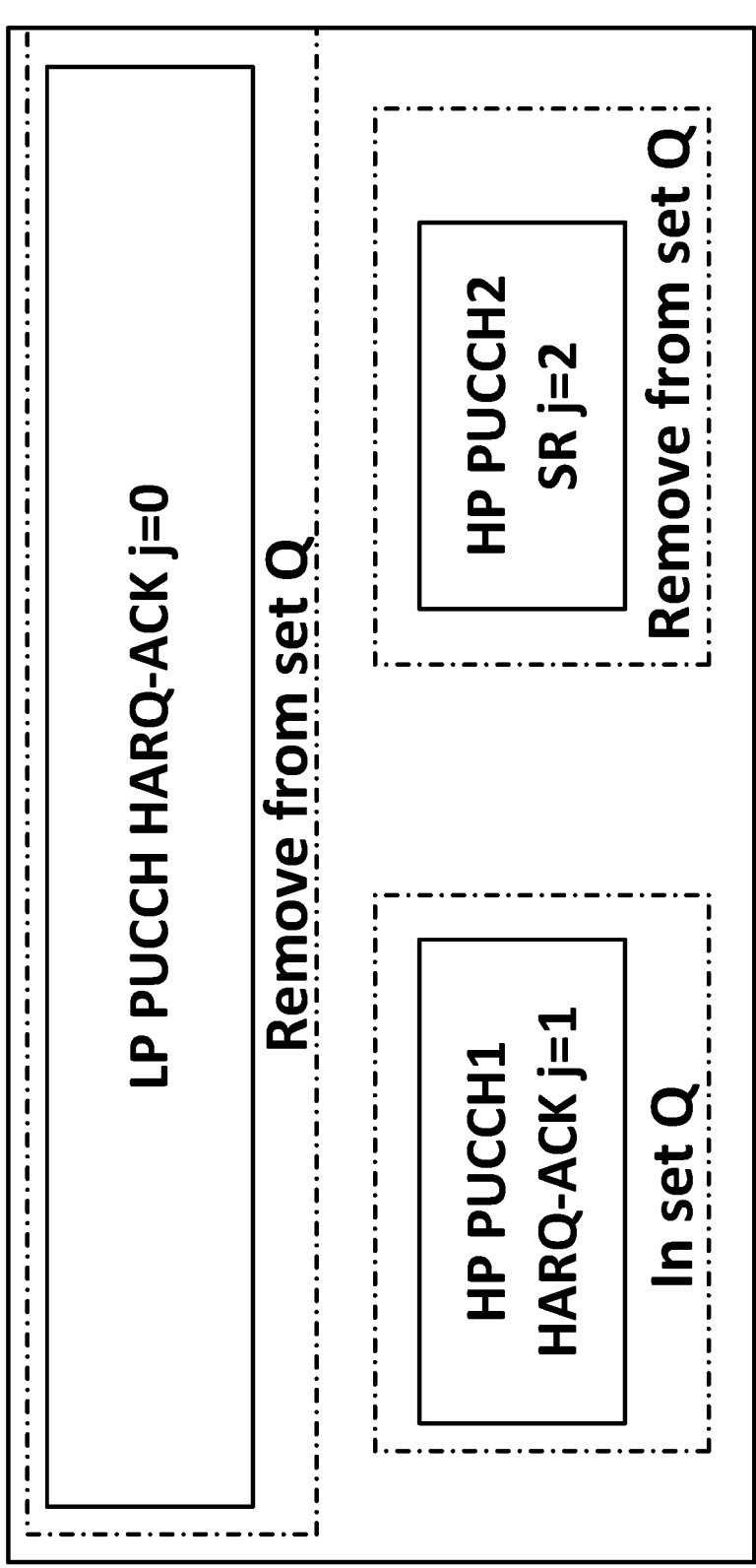
FIG. 4A illustrates an example of a procedure to resolve overlapping for PUCCHs with different priority, in which one LP PUCCH resource overlaps with one HP PUCCH1 for HARQ-ACK and one HP PUCCH2 for SR, in accordance with various embodiments.
Figure 4B:
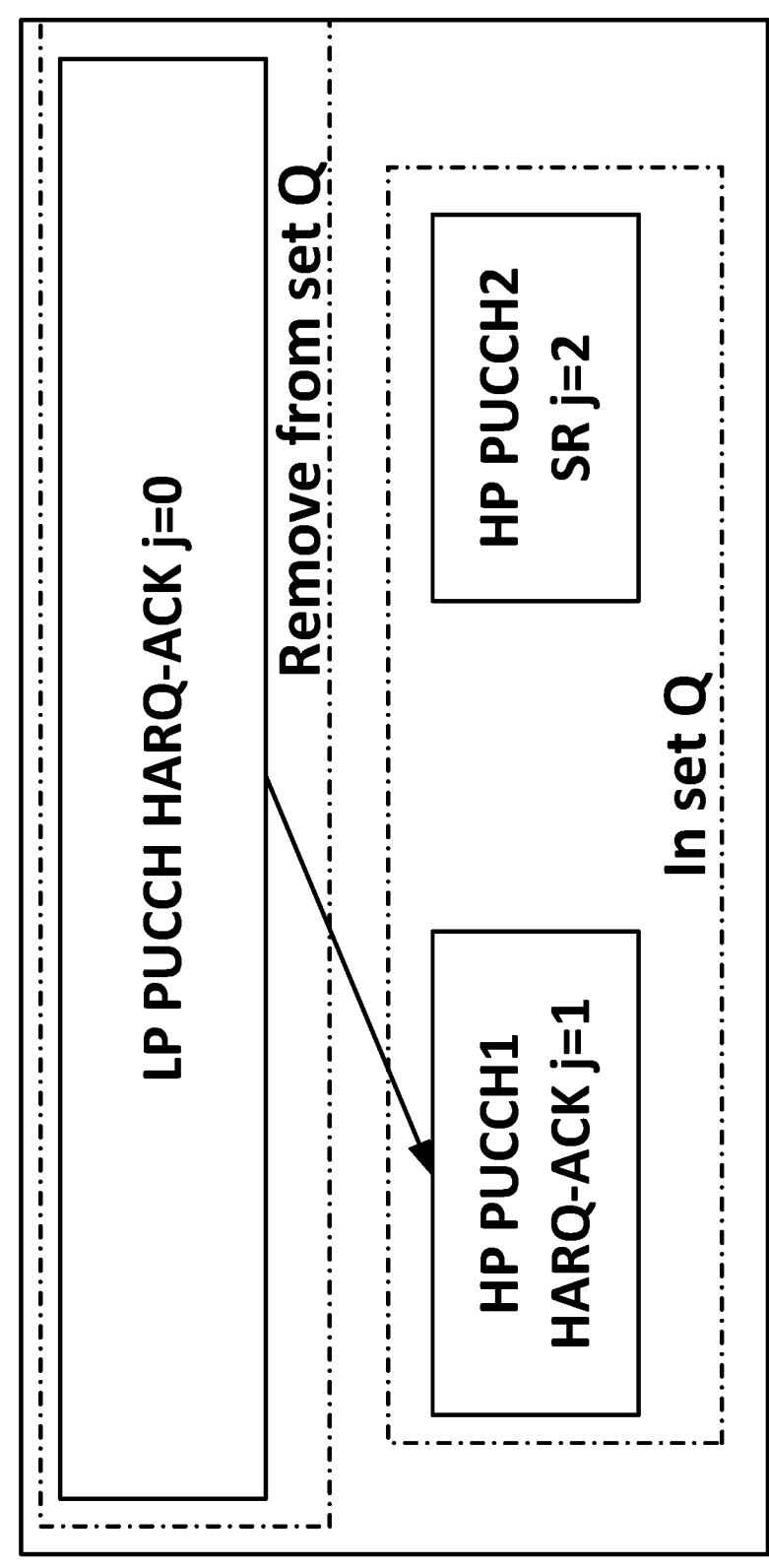
FIG. 4B illustrates an example of a procedure to resolve overlapping for PUCCHs with different priority, in which one LP PuCCH resource overlaps with more than one non-lverlapped HP PUCCH resources, in accordance with various embodiments.

FIG. 4A provides an example, one LP PUCCH resource overlaps with one HP PUCCH1 for HARQ-ACK and one HP PUCCH2 for SR. In step C, UE firstly finds LP PUCCH resource and all PUCCH resource overlapped with the LP PUCCH resource, e.g., HP PUCCH for HARQ-ACK and HP PUCCH for SR. In step D, UE determines a single PUCCH resource to multiplex LP HARQ-ACK, HP HARQ-ACK and HP SR. The single PUCCH resource is based on HP PUCCH1 for HARQ-ACK. Then, in Step E, remove all PUCCH resources, and add resultant HP PUCCH1 in set Q. In another example, if one LP PUCCH resource overlaps with more than one non-overlapped HP PUCCH resources, the single PUCCH resource is resulted from multiplexing UCI associated with the LP PUCCH resource and one HP PUCCH resource, and the single PUCCH resource is based on the HP PUCCH resource. Consequently, there can be one single PUCCH resource and at least one HP PUCCH resource non-overlapped with the single PUCCH resource after step D and Step E in set Q. FIG. 4B provides an example. In step C, UE firstly finds LP PUCCH resource and all PUCCH resource overlapped with the LP PUCCH resource, e.g., HP PUCCH for HARQ-ACK and HP PUCCH for SR. In step D, UE determines a single PUCCH resource to multiplex LP HARQ-ACK and HP HARQ-ACK. The single PUCCH resource is based on HP PUCCH1 for HARQ-ACK. Besides, there is HP PUCCH 2. Then, in Step E, remove all PUCCH resources, and add HP PUCCH2 and resultant HP PUCCH1 in set Q. Or, equivalently, remove HP PUCCH1 and LP PUCCH, and add result HP PUCCH1 in set Q.

Due to multiple possibilities of multiplexing and cancel-lation between different priorities as previously provided, in step D, a single PUCCH resource is determined for multi-plexing and/or cancellation UCI associated with all the PUCCH resources. Then, in Step E, all the PUCCH resources to be removed include a PUCCH resource which is determined in step C and multiplexed with other PUCCH resources in step D, as well as a PUCCH resource which is determined in step C and cancelled due to other PUCCH resources in step D. Furthermore, it is possible that there are more than one non-overlapped PUCCH resource survived after the multiplexing and/or cancellation UCI associated with all the PUCCH resources. Then, the survived multiple PUCCH resources should be included in set Q. For example, in Step E, also remove the PUCCH resource which is already cancelled by another PUCCH resource from PUCCH resources determined in step C. Alternatively, a PUCCH resource with the latest starting symbol out of the survived multiple PUCCH resources are added back to the set Q. Alternatively, a PUCCH resource with the latest ending symbol out of the survived multiple PUCCH resources are added back to the set Q.

In one example, if partial cancellation is supported, the partially cancelled PUCCH resource should also be added back to set Q. The PUCCH resource added back to set Q only contains symbols before 1st cancelled symbol.

Figure 4C:
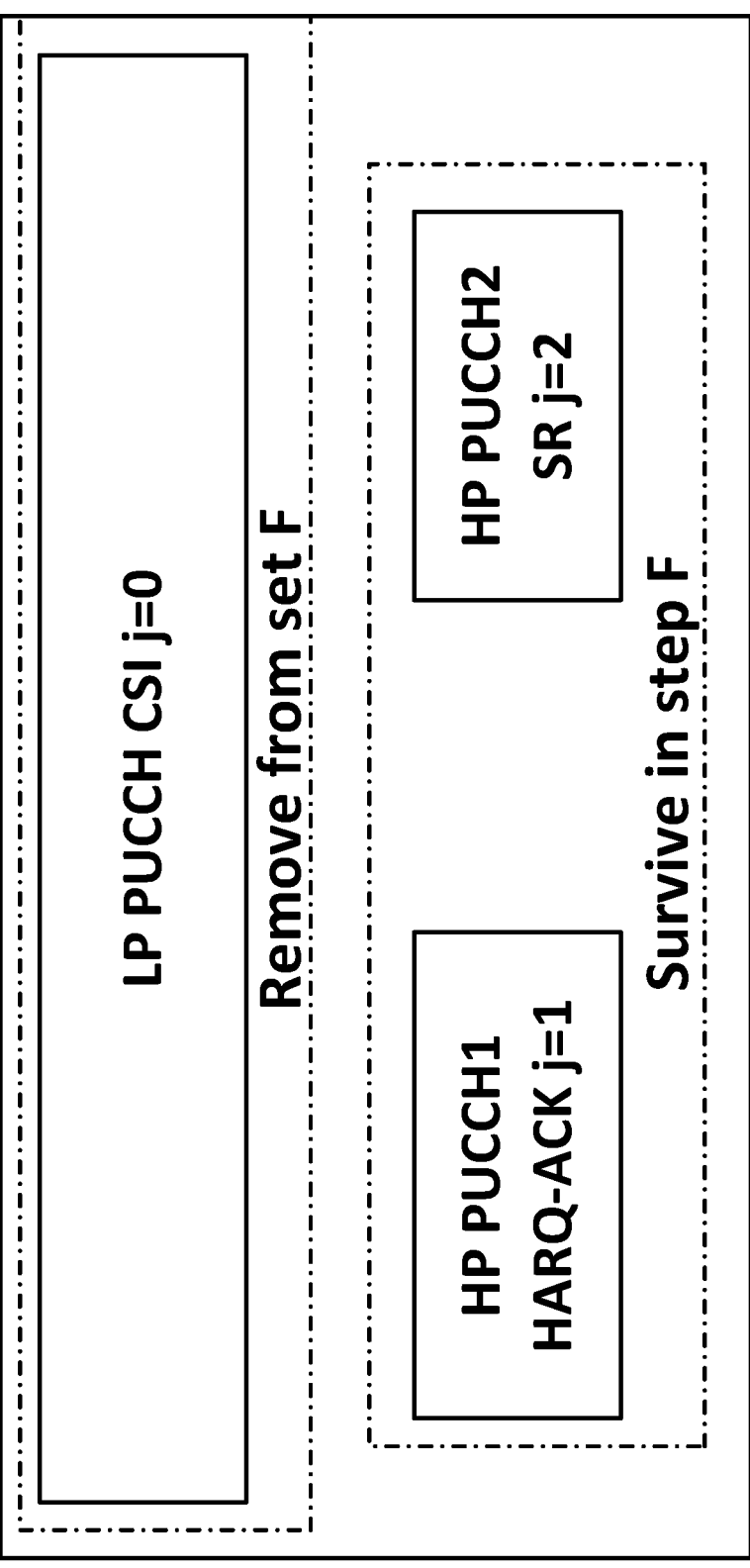
FIG. 4C illustrates an example of a procedure to resolve overlapping for PUCCHs with different priority, in which partial cancellation is supported, in accordance with various embodiments.

FIG. 4C provides an example, if one LP PUCCH resource overlaps with one HP PUCCH for HARQ-ACK and one HP PUCCH for SR. In step C, UE firstly finds LP PUCCH resource and all PUCCH resource overlapped with the LP PUCCH resource, e.g., HP PUCCH for HARQ-ACK and HP PUCCH for SR. In step D, because LP PUCCH ends later than HP PUCCH resource, LP PUCCH is cancelled, both HP PUCCH for HARQ-ACK and HP PUCCH for SR survives. Then, in Step E, only remove LP PUCCH resource from set Q. Or, equivalently, all three PUCCH resources are removed from set Q, and add the resultant HP PUCCH for HARQ-ACK and HP PUCCH for SR into set Q.

Furthermore, if a UE is configured with first and second HARQ-ACK codebook, and if the PUCCH resource for first and second codebook is slot-based and sub-slot based respectively, or both are sub-slot based but with different sub-slot duration, e.g., one is configured with a sub-slot with 7 symbols and the other is configured with a sub-slot with 2 symbols, to resolve the overlapping for PUCCHs and PUCCHs for different priorities with slot-based and sub-slot-based PUCCH in step 2, the UE should determine the 'single slot' for set Q in step A with the consideration of different sub-slot and slot configuration for LP and HP PUCCH resource. In one example, the 'single slot' is a sub-slot determined by sub-slot configuration for HP PUCCH resource for HARQ-ACK. In another example, the 'single slot' is a sub-slot determined by a sub-slot with shortest duration, e.g., the sub-slot is 2-symbol sub-slot, if one codebook is configured with 7-symbol sub-slot and another codebook is configured with 2-symbol sub-slot. For another example, the 'single slot' is a sub-slot with shortest duration for HP PUCCH resource. The 'single slot' deter-mined by the above mechanisms is denoted as a single reference slot.

If a LP PUCCH resource overlaps with more than one single reference slot, the LP PUCCH resource is included into a set Q for a single reference slot, according to one of the following rules:

(1) If a LP PUCCH resource is overlapped with at least one HP PUCCH resource in a reference slot, the LP PUCCH resource is included into set Q for the refer-ence slot.

If a LP PUCCH resource is overlapped with more than one HP PUCCH resource in more than one reference slot, the LP PUCCH resource is included into set Q for the earliest reference slot.

Figure 5:
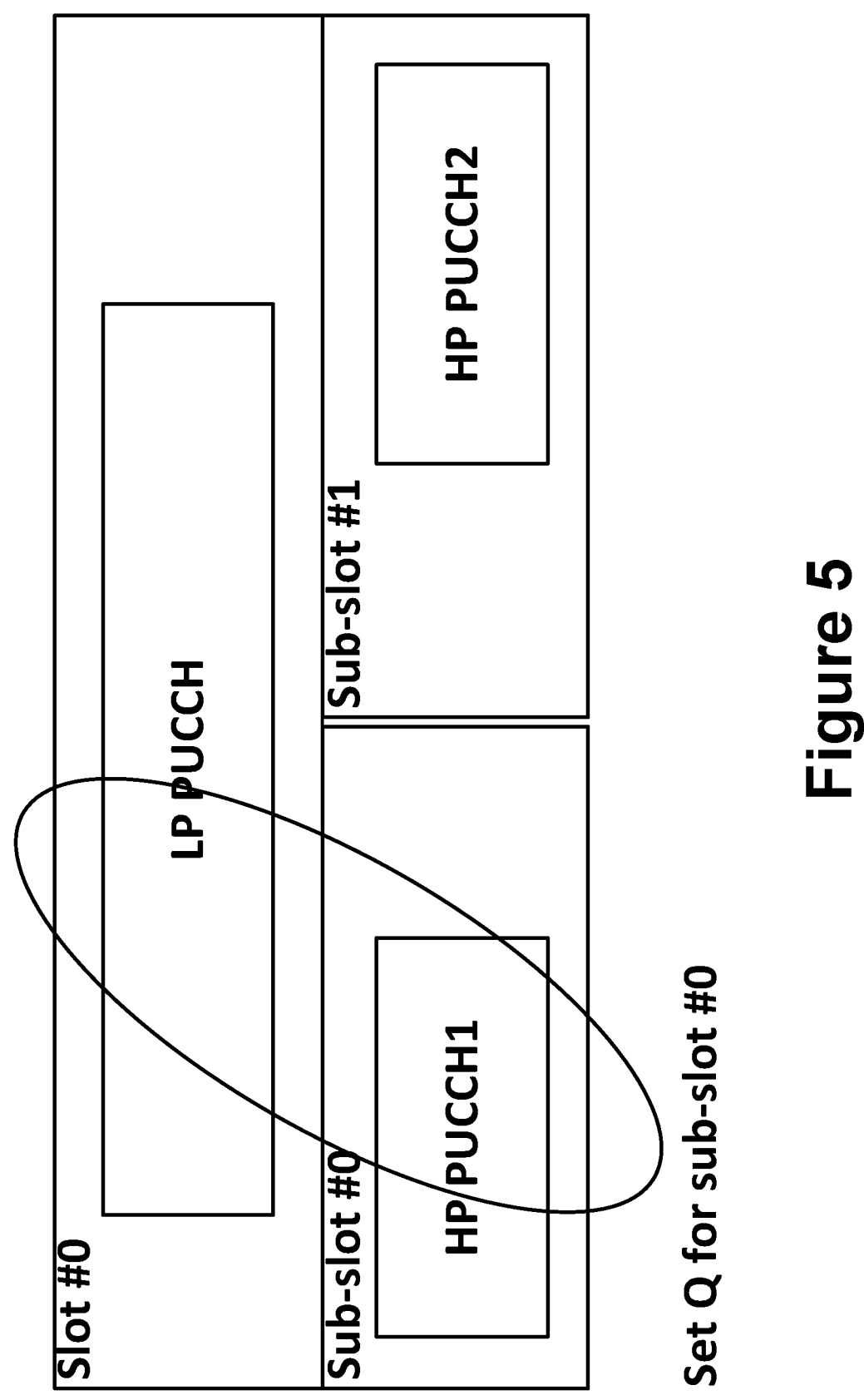
FIG. 5 illustrates an example of overlapping between sub-slot-based HP PUCCH and slot-based LP PuCCH, in accordance with various embodiments.

FIG. 5 provides an example. LP PUCCH resource is configured based on slot, while HP PUCCH resource is configured based on sub-slot with 7 symbols. The reference slot is sub-slot. LP PUCCH overlaps with HP PUCCH1 and HP PUCCH2. LP PUCCH should be included in set Q for the earliest reference slot, e.g. sub-slot #0. Therefore, in step A, set Q includes HP PUCCH1 and LP PUCCH for sub-slot #0, set Q includes HP PUCCH2 for sub-slot #1.

Figure 6A:
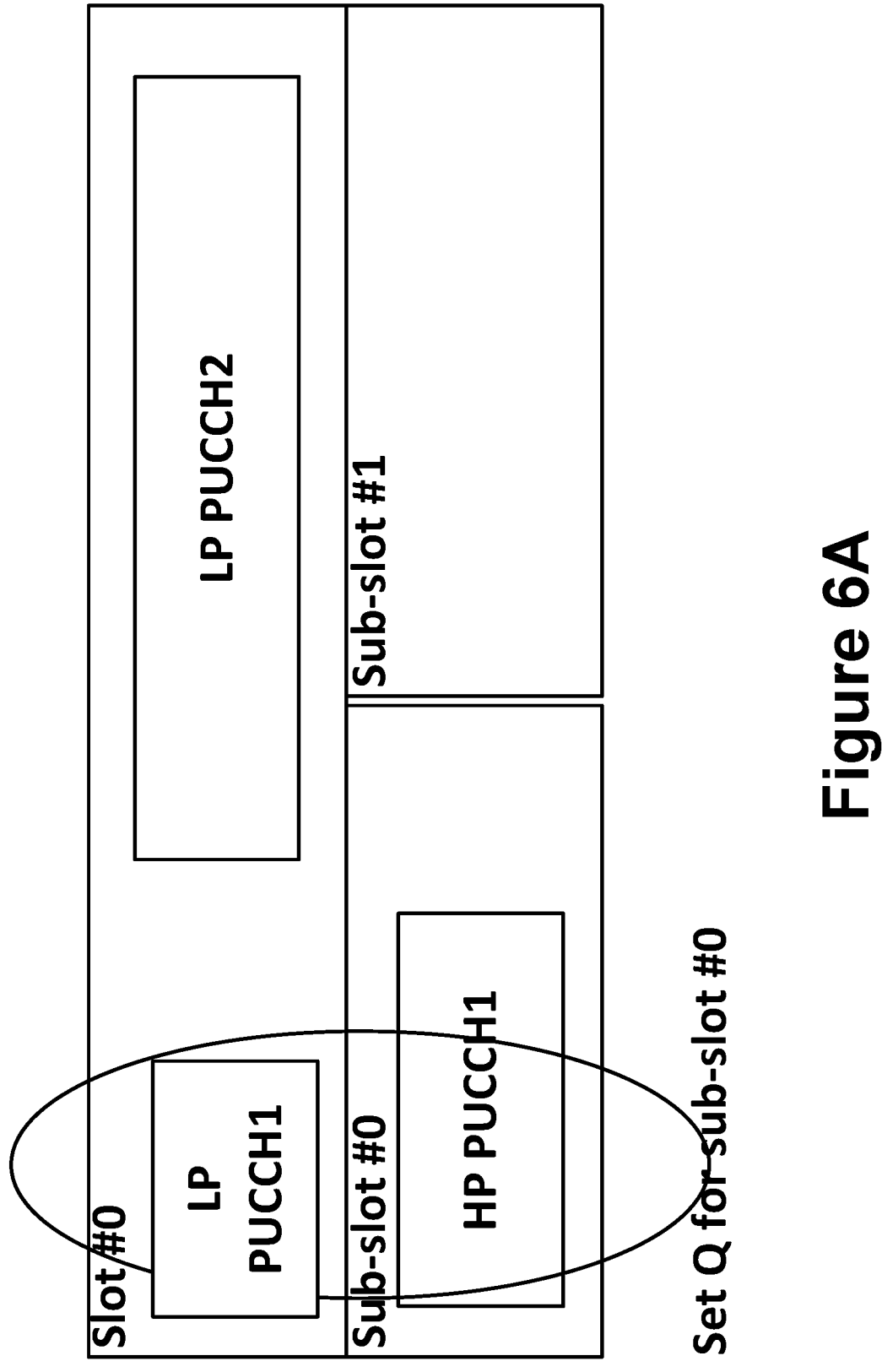
FIG. 6A illustrates an example of original PUCCH resources and FIG. 6B illustrates an example of resultant HP PUCCH resource that overlaps with LP PUCCH2, in accordance with various embodiments.
Figure 6B:
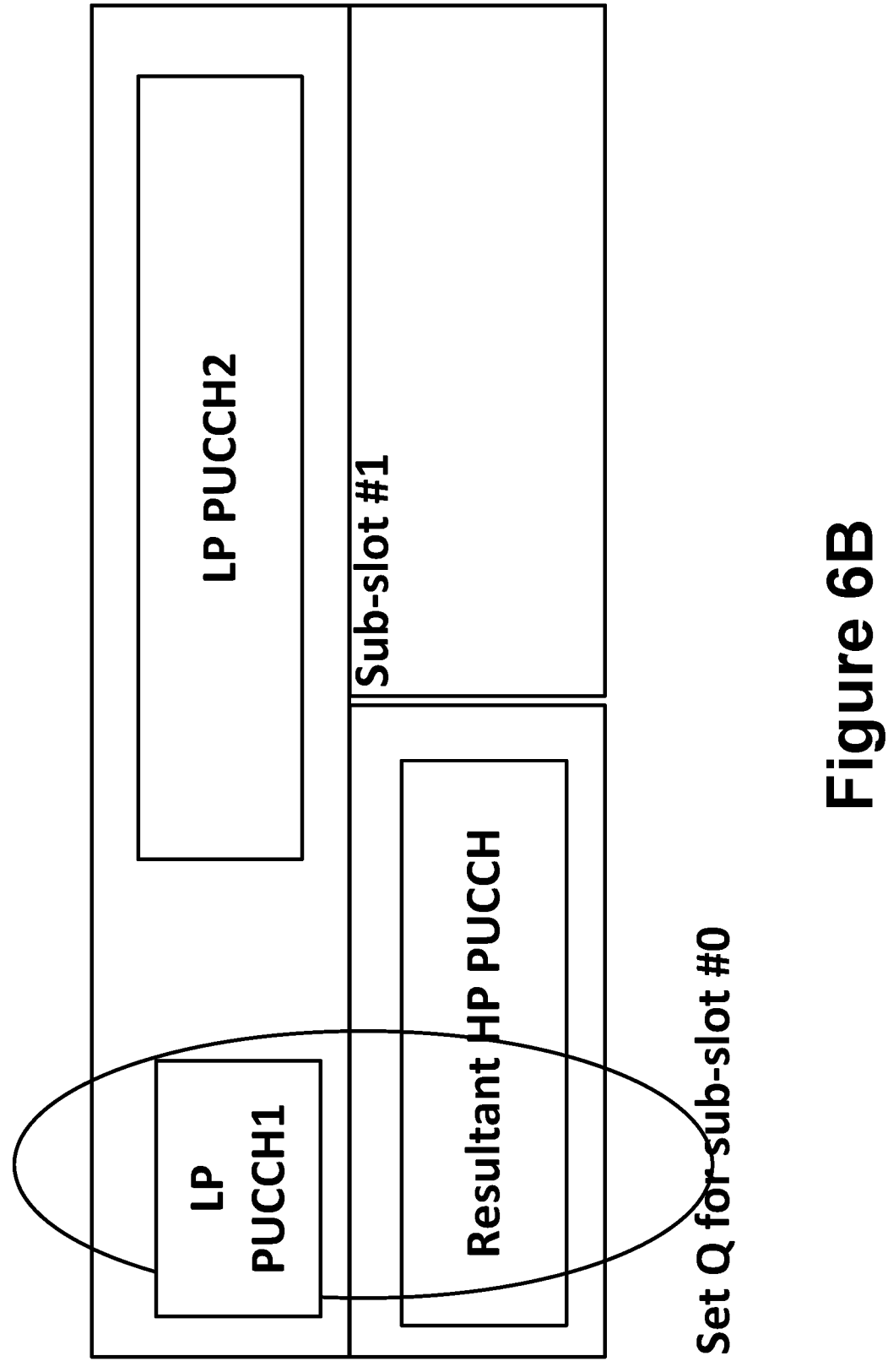

In one example, a LP PUCCH is only added in set Q in step A. UE does not expect the resultant single PUCCH resource (a HP PUCCH resource) in step D would overlap with a LP PUCCH resource which is not originally overlapped with the HP PUCCH resource before multiplexing. As shown in FIG. 6A, in step A, LP PUCCH1 is added in set Q for sub-slot #0, LP PUCCH2 is not added in set Q for sub-slot #0, because it is not overlapped with HP PUCCH1. Then, in step D, after LP UCI multiplexed onto HP PUCCH1, the resultant single PUCCH resource is a new HP PUCCH resource, which is overlapped with LP PUCCH #2 as shown in FIG. 6B. However, because LP PUCCH2 can not be added after step A, UE can not handle the overlap between resultant HP PUCCH and LP PUCCH2. gNB is expected to avoid such scheduling shown in FIG. 6A or 6B.

Figure 6C:
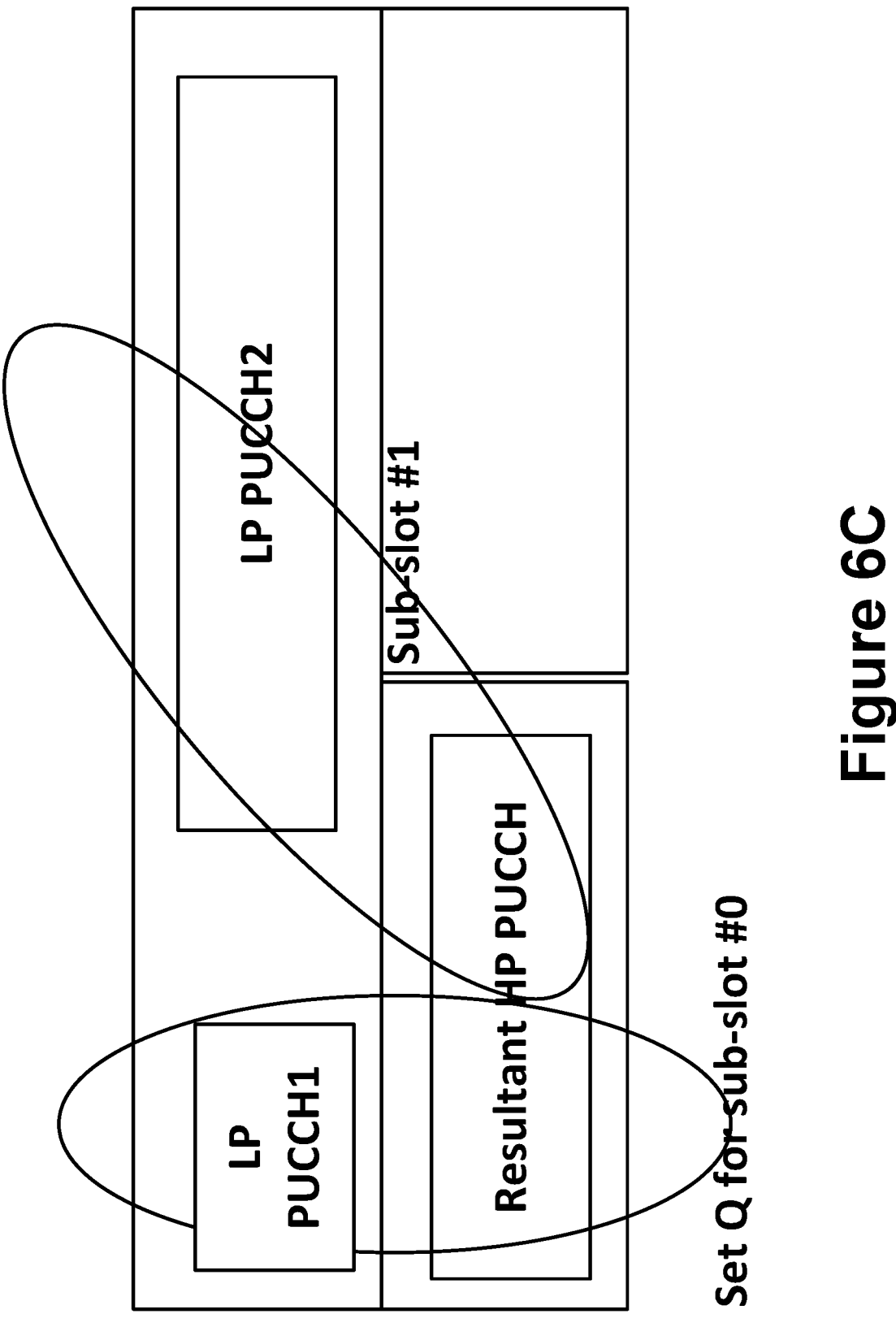
FIG. 6C illustrates an example of an added LP PUCCH2 that overlaps with a resultant HP PUCCH, in accordance with various embodiments.

In another example, a LP PUCCH can be added into set Q in Step E, before iterative step B, if the LP PUCCH overlaps with the resultant single PUCCH resource of step D. For example, after step D for LP PUCCH1 and HP PUCCH1 multiplexing, UE checks whether the resultant HP PUCCH overlaps with LP PUCCH2. LP PUCCH2 is added into set Q in Step E, if the LP PUCCH2 overlaps with the resultant HP PUCCH, see FIG. 6C. Then, UE restarts to perform step B~ step D to handle multiplexing between resultant HP PUCCH and LP PUCCH2. Here, in one example, UE multiplexes resultant HP PUCCH and LP PUCCH2, if timeline is met, otherwise, UE drops LP PUCCH2. In another example, UE multiplexes resultant HP PUCCH and LP PUCCH2 with the assumption that the timeline is always met.

(2) If a LP PUCCH resource is overlapped with one reference slot, the LP PUCCH resource is included into set Q for the reference slot.

If a LP PUCCH resource is overlapped with more than one reference slot, the LP PUCCH resource is included into set Q for the earliest reference slot.

Figure 7A:
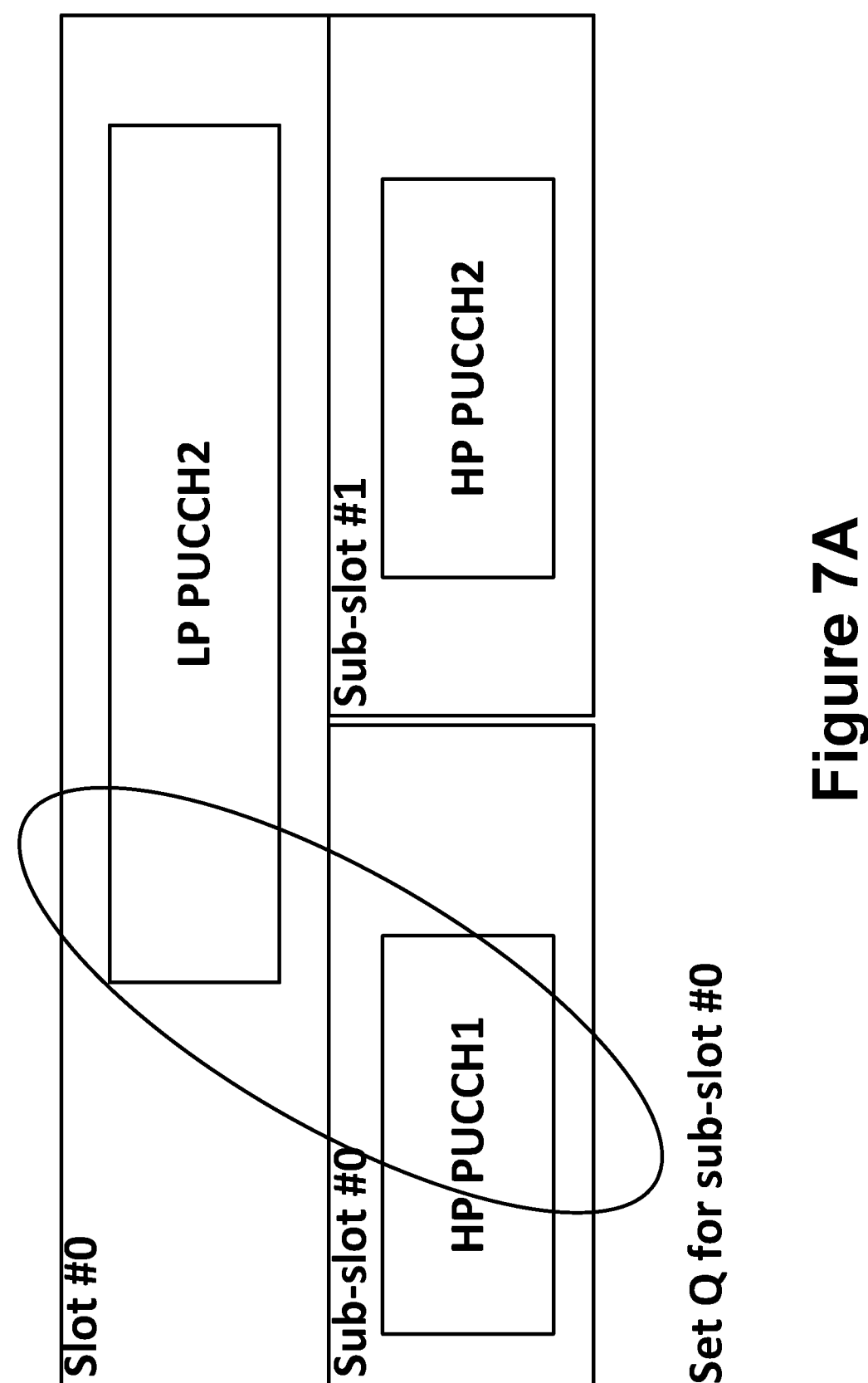
FIGS. 7A and 7B illustrate further examples of procedures for resolving overlapping of PUCCHs with different priority, in accordance with various embodiments.

In one example, the reference slot contains at least one HP PUCCH resource, though the HP PUCCH resource can be overlapped or non-overlapped with the LP PUCCH resource. As shown in FIG. 7A, though LP PUCCH2 is not overlapped with HP PUCCH1, the LP PUCCH2 is still added in set Q for sub-slot #0 in step A.

Figure 7B:
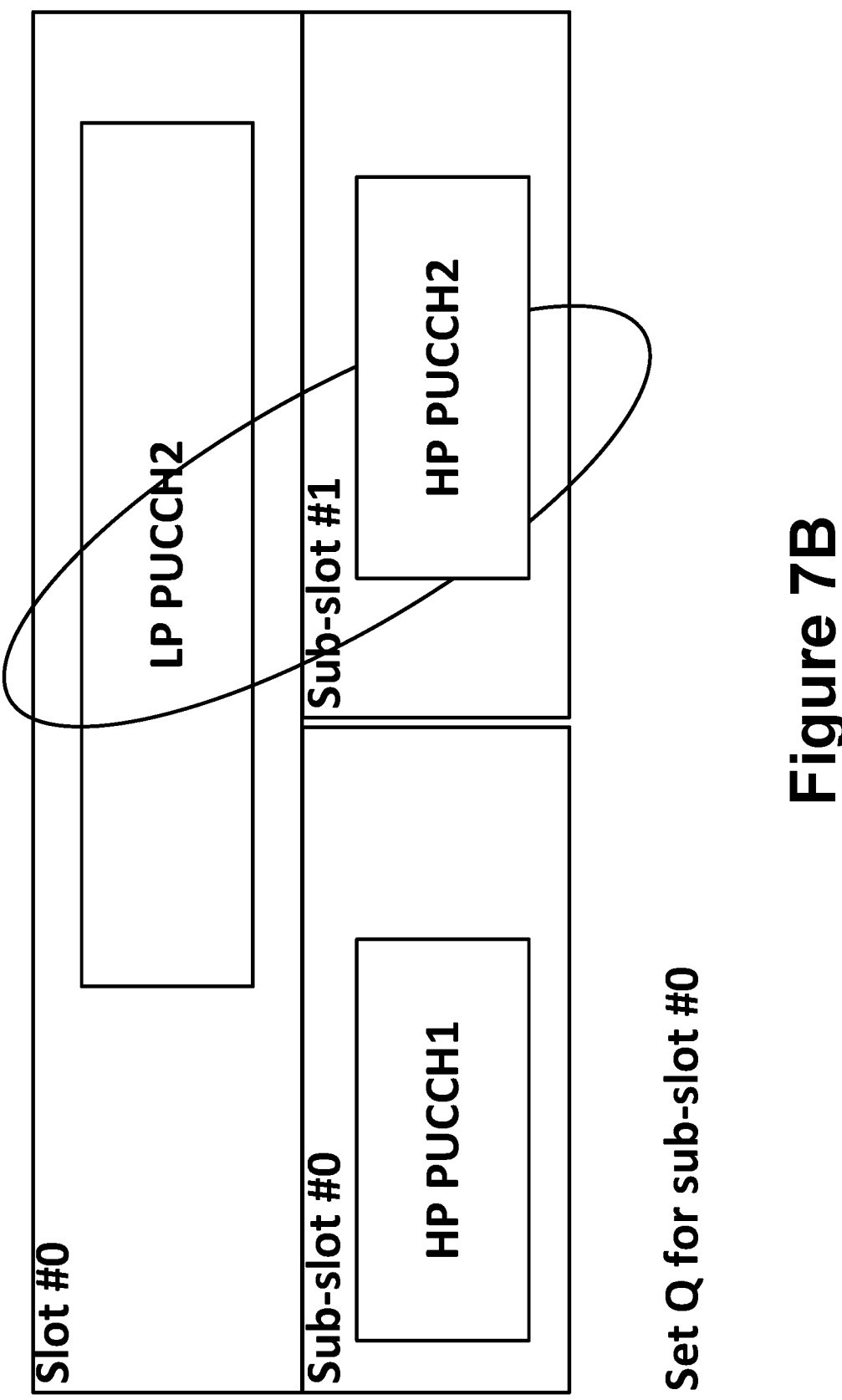

In one example, if a LP PUCCH resource is added into set Q for 1st overlapped sub-slot, but it is not overlapped with any other PUCCH resources in 1st sub-slot, the LP PUCCH resource can be added in set Q for 2nd overlapped sub-slot to check any multiplexing between the LP PUCCH resource and other PUCCH resource in the 2nd sub-slot. As shown in FIG. 71, though LP PUCCH2 is not overlapped with HP PUCCH1, the LP PUCCH2 is still added in set Q for sub-slot #0 in step A. After steps A~E for sub-slot #0, HP PUCCH1 is not overlapped with LP PUCCH2. Then, for the processing in sub-slot #1, LP PUCCH2 is added in set Q for sub-slot #1 in step A as shown in FIG. 7B. After steps A~E, LP PUCCH2 is multiplexed with HP PUCCH2.

If a LP PUCCH resource overlaps with more than one single reference slot, in one example, if a PUCCH resource is added in set Q for $1^{st}$ sub-slot and overlapped with other PUCCH resources in the $1^{st}$ sub-slot, and the UCI carried by the PUCCH resource is dropped, the PUCCH resource can be added in set Q for $2^{nd}$ sub-slot. In another example, if a PUCCH resource is added in set Q for $1^{st}$ sub-slot and overlapped with other PUCCH resources in the $1^{st}$ sub-slot, and the UCI carried by the PUCCH resource is dropped, the PUCCH resource cannot be added in set Q for $2^{nd}$ sub-slot.

In one embodiment, in step 2, if there is overlapped PUCCHs and PUSCHs with different priorities, a UE resolves the overlapping for PUSCH and/or PUSCHs with different priorities according to one of the following procedures:

(1) Firstly, resolve overlapping between PUCCHs with different priorities, if any, and then, resolve overlapping between PUSCHs and resultant PUCCHs with different priorities.

For resolving overlapping between PUCCHs with different priorities, the modified step A~ Step E in third embodiment can be reused.

For resolving overlapping between PUCCH and PUSCH with different priorities, rules (1)~ (11) in a second embodiment (described above) can be reused to determine multiplexing, cancellation, or transmission of LP without HP UCI.

In one example, UE identifies the resultant PUCCH resource resolving overlapping of PUCCHs with different priorities without performing multiplexing of UCIs of overlapped PUCCHs. UE identifies the resultant UL channel resolving overlapping of resultant PUCCH and PUSCH and perform multiplexing of UCIs onto the PUSCH. In another example, UE identifies the resultant PUCCH resource resolving overlapping of PUCCHs with different priorities and performs multiplexing of UCIs of overlapped PUCCHs. UE identifies the resultant UL channel resolving overlapping of resultant PUCCH and PUSCH and perform multiplexing of UCIs onto the PUSCH.

Figures 8A, 8B:
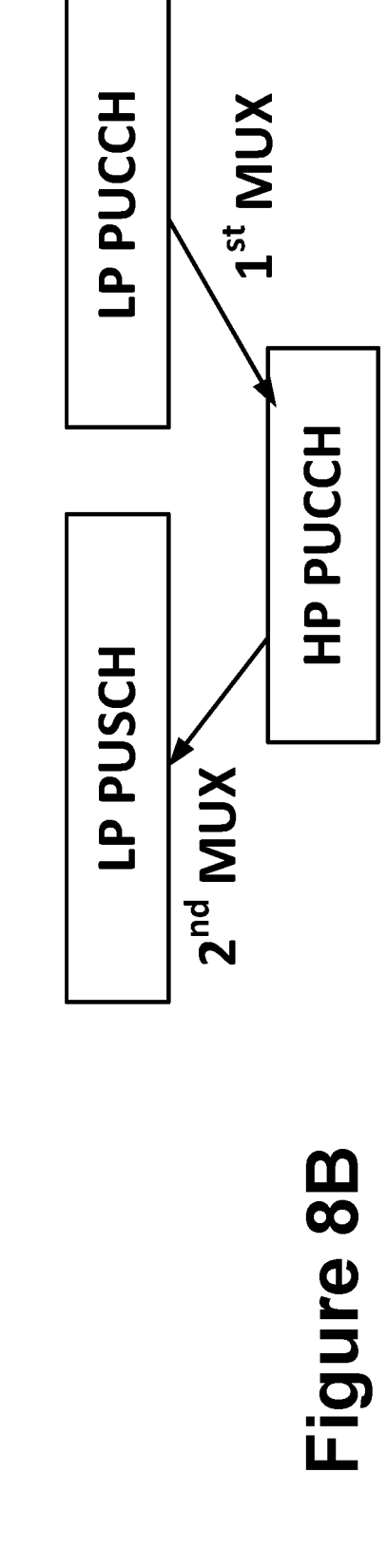
FIG. 8A illustrates an example of overlapping of PUCCHs of different priorities and multiplexing of UCIs, in accordance with various embodiments.
FIG. 8B illustrates another example of overlapping of PUCCHs of different priorities and multiplexing of UCIs, in accordance with various embodiments.

FIG. 8A provides an example. UE first finds all overlapped PUCCHs with different priorities, e.g., HP PUCCH and LP PUCCH. UE multiplexed LP UCI onto HP PUCCH. Then, UE checks whether there is any overlapping between PUSCHs and resultant PUCCH with different priority. Because HP PUSCH and HP PUCCH are non-overlapped, UE transmits both HP PUSCH and HP PUCCH.

FIG. 8B provides an example. UE first finds all overlapped PUCCHs with different priorities, e.g., HP PUCCH and LP PUCCH. UE multiplexed LP UCI onto HP PUCCH. Then, UE checks whether there is any overlapping between PUSCHs and resultant PUCCH with different priority. Because LP PUSCH and HP PUCCH are overlapped, UE multiplexed HP UCI and LP UCI onto LP PUSCH. In one example, UE assumes the multiplexing timeline is always met. In another example, UE performs multiplexing only if the timeline is met.

Figure 8C:
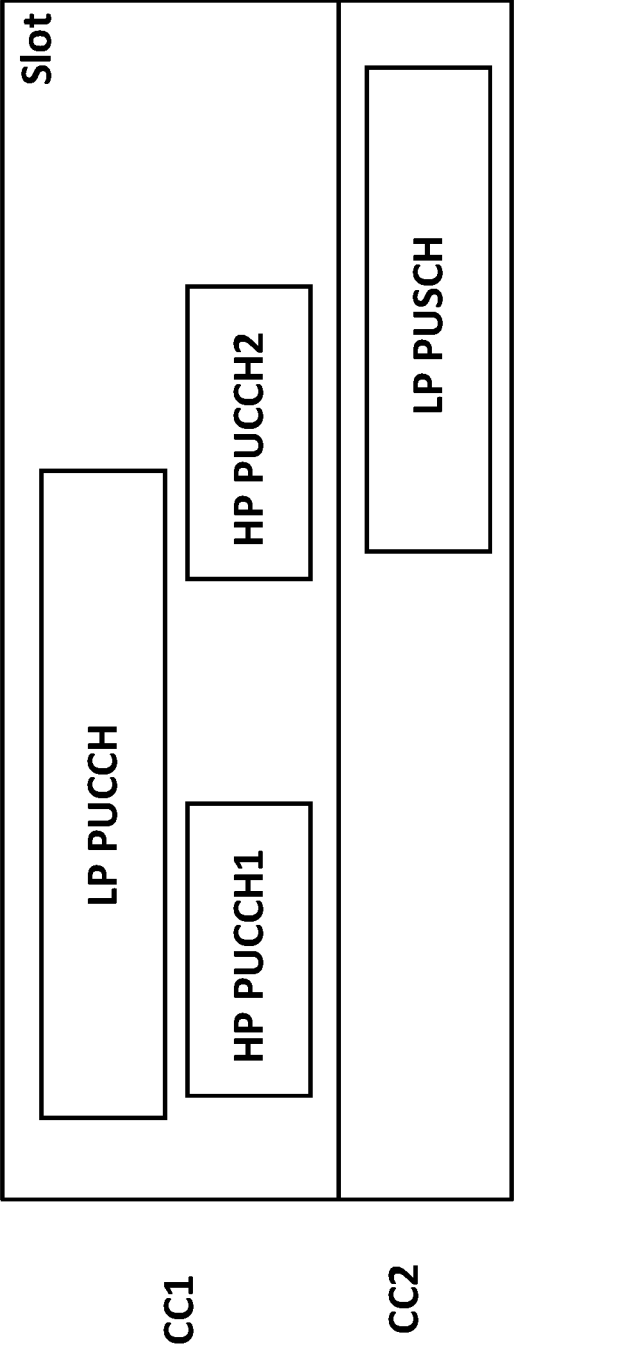
FIG. 8C illustrates an example of a UE configured with two UL carriers, in accordance with various embodiments.

In one example, if a UL channel with one priority overlaps with more than one UL channels with another priority, UE performs multiplexing or cancellation between two UL channels with earliest starting symbols among all these UL channels, and then, performs multiplexing or cancellation between the resultant UL channel and next UL channel with earliest starting symbol among all these UL channels, until all the overlapped UL channels are checked. FIG. 8C provides an example. UE is configured with 2 UL carries, CC1 and CC2 respectively. LP PUCCH overlaps with HP PUCCH1 and HP PUCCH2, all PUCCHs are on CC1. LP PUSCH1 is on CC2. UE firstly resolves overlapping between PUCCHs with different priorities, UE first resolve overlapping between LP PUCCH and HP PUCCH1 because these 2 PUCCHs has earliest staring symbol among 3 overlapping PUCCHs. Assuming UE multiplexes LP UCI onto HP PUCCH1, then, no overlapping between HP PUCCH2. Therefore, after resolving overlapping PUCCHs, there are HP PUCCH1 with LP UCI, and HP PUCCH2. UE secondly resolves overlapping between PUCCHs and PUSCHs with different priorities. HP PUCCH2 overlaps with LP PUSCH1. Then, UE multiplex HP PUCCH2 onto LP PUSCH.

If there is more than one UL channel with same starting symbol overlapped with another UL channel with different priority, e.g., two LP PUSCHs on different serving cells with same starting symbol and they are overlapped with one HP PUCCH, then, choose one of the UL channels with same starting symbol to perform multiplexing or cancellation with another UL channel with different priority. The selection of one of the UL channels with same starting symbol is based on at least one of the factors, including serving cell index, slot index, ending symbol, with or without UL-SCH, with or without aperiodic CSI, UL channel in response to a DCI or not, in the same serving cell with another UL channel with different priority or not, to be cancelled by another UL or DL symbols/channels or not, etc.

Alternatively, when UE resolves overlapping PUCCH and PUSCH with different priorities, and a PUCCH with one priority overlaps with more than one PUSCH with another priority, UE chooses one of the PUSCH to perform multiplexing or cancellation with the PUCCH. The selection of one of the PUSCH is based on at least one of the factors, including serving cell index, slot index, ending symbol, staring symbol, with or without UL-SCH, with or without aperiodic CSI, UL channel in response to a DCI or not, in the same serving cell with another UL channel with different priority or not, to be cancelled by another UL or DL symbols/channels or not, etc.

In another example, if a UL channel with one priority overlaps with more than one UL channels with another priority, UE performs multiplexing or cancellation between two UL channels with earliest ending symbols among all these UL channels, and then, performs multiplexing or cancellation between the resultant UL channel and next UL channel with earliest ending symbol among all these UL channels, until all the overlapped UL channels are checked. If there is more than one UL channel with same ending symbol overlapped with another UL channel with different priority, e.g., two LP PUSCHs on different serving cells with same ending symbol and they are overlapped with one HP PUCCH, then, choose one of the UL channels with same ending symbol to perform multiplexing or cancellation with another UL channel with different priority. The selection of one of the UL channels with same starting symbol is based on at least one of the factors, including serving cell index, starting symbol, with or without UL-SCH, with or without aperiodic CSI, UL channel in response to a DCI or not, in the same serving cell with another UL channel with different priority or not, to be cancelled by another UL or DL symbols/channels or not, etc.

(2) Check every overlapped LP and HP UL channels in time order and perform multiplexing or cancellation for the overlapped LP and HP UL channels in time order. The UL channels can be PUSCH or PUCCH.

In one example, a UE firstly finds a UL channel with earliest starting symbol, and then, determines other UL channels overlapped with the UL channel. In another example, a UE firstly finds a UL channel with earliest ending symbol, and then, determines other UL channels overlapped with the UL channel. In another example, a UE firstly finds a LP UL channel, and then, determines HP UL channels overlapped with LP UL channel. In another example, a UE firstly finds a HP UL channel, and then, determines LP UL channels overlapped with the HP UL channel.

In one example, if a UL channel with one priority overlaps with more than one UL channels with another priority, UE performs multiplexing or cancellation between two UL channels with earliest starting symbols among all these UL channels, and then, performs multiplexing or cancellation between the resultant UL channel and next UL channel with earliest starting symbol among all these UL channels, until all the overlapped UL channels are checked. If there is more than one UL channels with same starting symbol overlapped with another UL channel with different priority, e.g., two LP PUSCHs on different serving cells with same starting symbol and they are overlapped with one HP PUCCH, then, choose one of the UL channels with same starting symbol to perform multiplexing or cancellation with another UL channel with different priority. The selection of one of the UL channels with same starting symbol is based on at least one of the factors, including serving cell index, ending symbol, with or without UL-SCH, with or without aperiodic CSI, UL channel in response to a DCI or not, in the same serving cell with another UL channel with different priority or not, to be cancelled by another UL or DL symbols/channels or not, etc.

In another example, if a UL channel with one priority overlaps with more than one UL channels with another priority, UE performs multiplexing or cancellation between two UL channels with earliest ending symbols among all these UL channels, and then, performs multiplexing or cancellation between the resultant UL channel and next UL channel with earliest ending symbol among all these UL channels, until all the overlapped UL channels are checked. If there is more than one UL channels with same ending symbol overlapped with another UL channel with different priority, e.g., two LP PUSCHs on different serving cells with same ending symbol and they are overlapped with one HP PUCCH, then, choose one of the UL channels with same ending symbol to perform multiplexing or cancellation with another UL channel with different priority. The selection of one of the UL channels with same starting symbol is based on at least one of the factors, including serving cell index, starting symbol, with or without UL-SCH, with or without aperiodic CSI, UL channel in response to a DCI or not, in the same serving cell with another UL channel with different priority or not, to be cancelled by another UL or DL symbols/channels or not, etc.

In one example, UE identifies the resultant UL channel resolving overlapping of UL channels with different priorities without performing multiplexing. UE performs multiplexing after all the overlapped channels are resolved. In another example, for each UE identifies the resultant UL channel resolving overlapping of UL channels with different priorities and performs multiplexing.

Figures 9A, 9B:
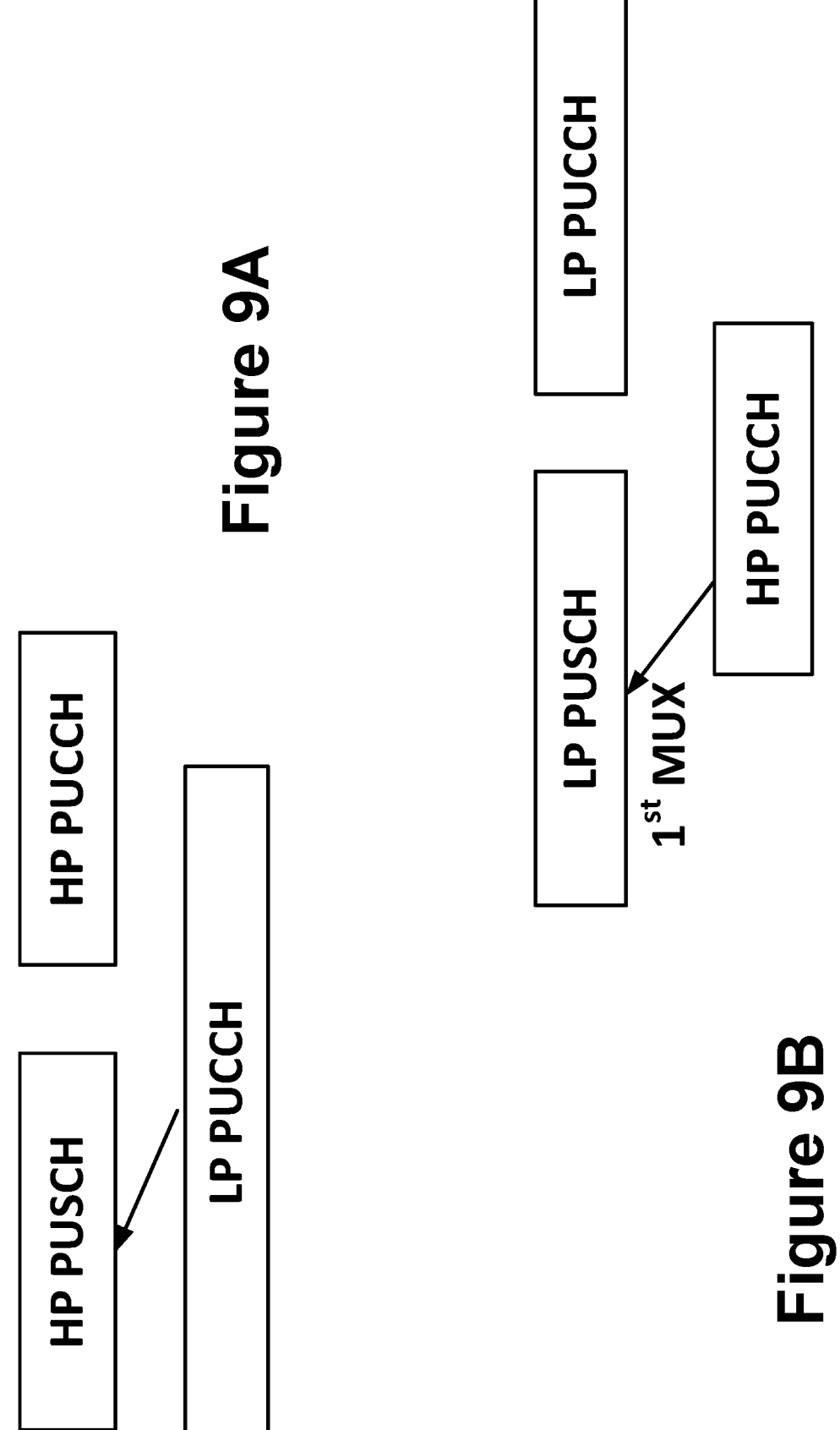
FIGS. 9A-9D illustrate further examples of procedures for resolving overlapping of PUCCHs with different priority, in accordance with various embodiments.

FIG. 9A provides an example. There are 3 overlapped UL channels, including HP PUSCH, HP PUCCH and LP PUCCH. UE first resolves overlapping between two UL channels with earlier starting symbols, e.g., HP PUSCH and LP PUCCH. LP PUCCH is multiplexed onto HP PUSCH. Then, UE checks whether there is any overlapping between HP PUSCH and HP PUCCH. Because HP PUSCH and HP PUCCH are non-overlapped, UE transmits both HP PUSCH and HP PUCCH.

FIG. 9B provides an example. There are 3 overlapped UL channels, including LP PUSCH, HP PUCCH and LP PUCCH. UE first resolves overlapping between two UL channels with earlier starting symbols, e.g., HP PUCCH and LP PUSCH. HP PUCCH is multiplexed onto LP PUSCH. Then, UE checks whether there is any overlapping between LP PUSCH and LP PUCCH. Because LP PUSCH and LP PUCCH are non-overlapped, UE transmits both Because LP PUSCH and LP PUCCH.

Figures 9C, 9D:
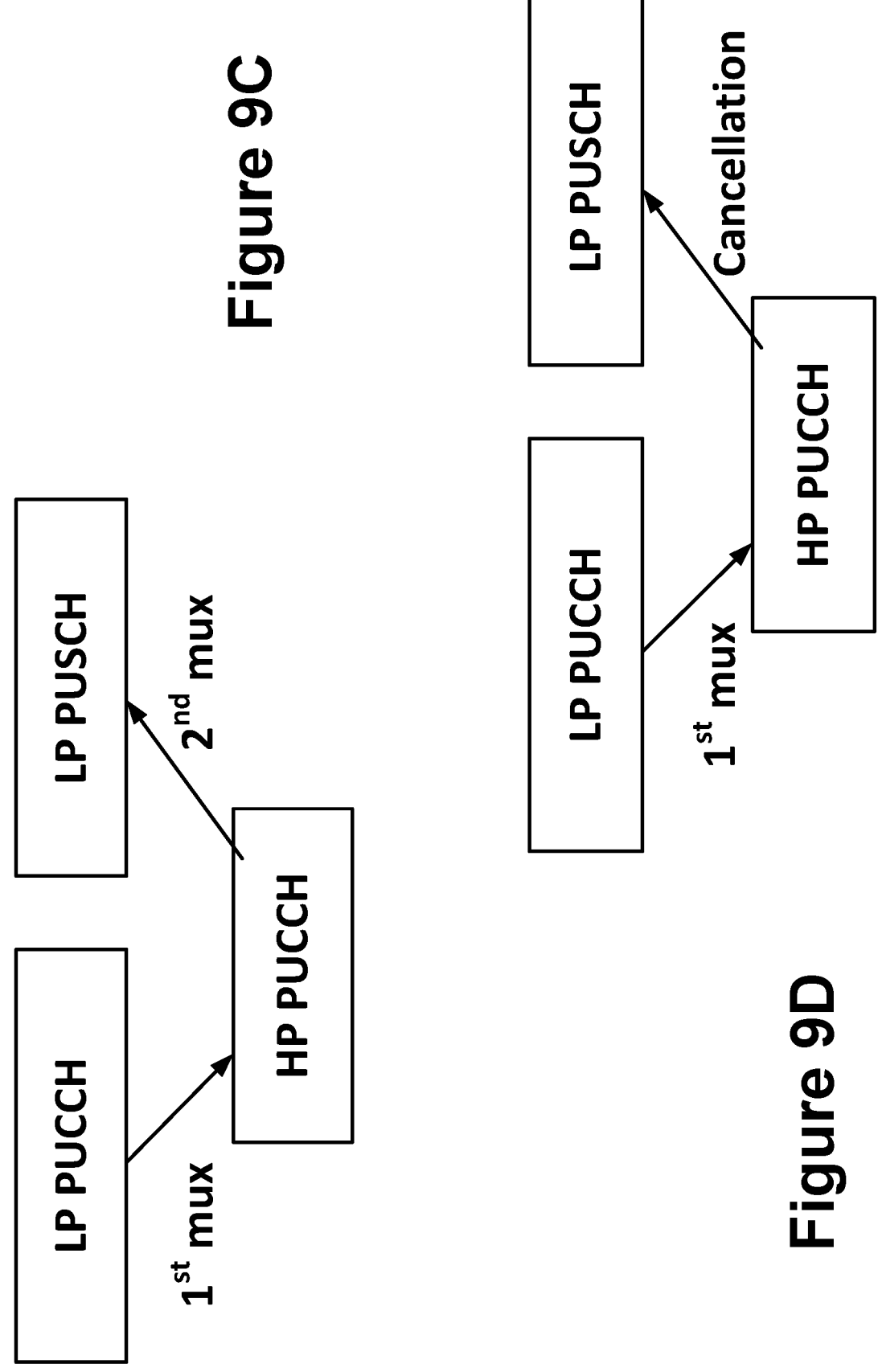

FIG. 9C provides an example. There are 3 overlapped UL channels, including LP PUSCH, HP PUCCH and LP PUCCH. UE first resolves overlapping between two UL channels with earlier starting symbols, e.g., HP PUCCH and LP PUCCH. LP PUCCH is multiplexed onto HP PUCCH. Then, UE checks whether there is any overlapping between HP PUCCH and LP PUSCH. Because LP PUSCH and HP PUCCH are overlapped, UE multiplexes both LP and HP UCI onto LP PUSCH.

FIG. 9D provides an example. There are 3 overlapped UL channels, including LP PUSCH, HP PUCCH and LP PUCCH. UE first resolve overlapping between two UL channels with earlier starting symbols, e.g., HP PUCCH and LP PUCCH. LP PUCCH is multiplexed onto HP PUCCH. Then, UE checks whether there is any overlapping between HP PUCCH and LP PUSCH. Because LP PUSCH and HP PUCCH are overlapped, but the DCI for HP PUCCH indicates to disable multiplexing of HP UCI onto LP PUSCH, UE cancels LP PUSCH and only transmits HP PUCCH with HP and LP UCI.

(3) Firstly, perform multiplexing and/or cancellation between PUCCH and PUSCH with different priorities, if any, and then, perform multiplexing and/or cancellation between PUSCHs with different priorities, or perform multiplexing and/or cancellation between PUCCHs with different priorities.

On top of (1)~ (3), if there is a pair of UL channels to be multiplexed, and a pair of UL channels to be cancelled, and at least one of UL channels of these two pairs is the same UL channel, multiplexing is firstly performed, and then, cancellation is performed, if any. Alternatively, cancellation is firstly performed, and then, multiplexing is performed, if any.

In the embodiment, in one example, if a UE is configured with first and second HARQ codebook, and if the PUCCH resource for first and second codebook is with different slot or sub-slot-based configuration, a PUSCH resource is added in a set Q for a single reference slot. The determination of the reference slot for set Q including the PUSCH resource is determined by the earliest overlapped reference slot, or by the earliest reference slot with a HP PUCCH resource overlapped with the PUSCH resource.

Figure 10:
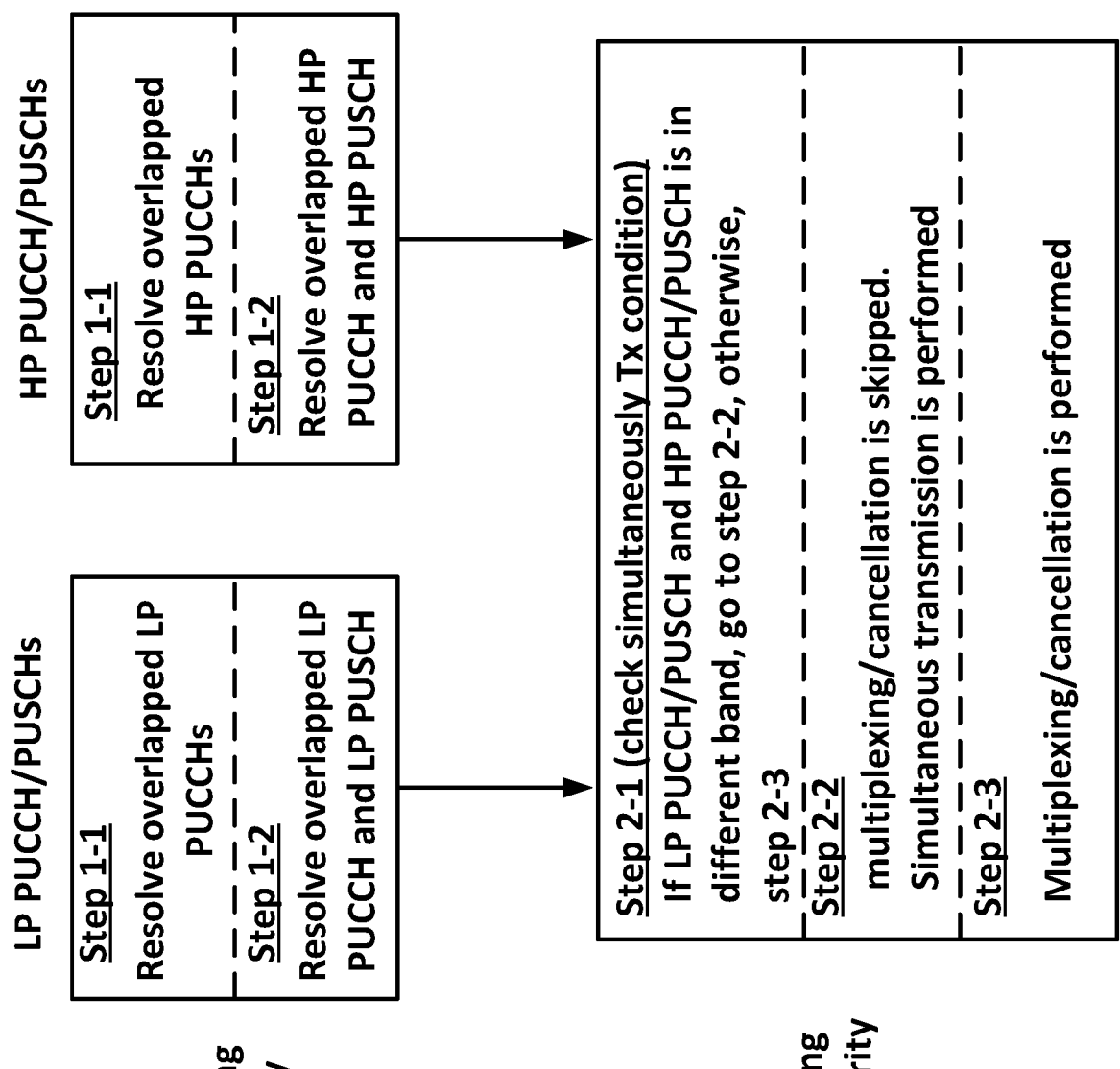
FIG. 10 illustrates an example of simultaneous PUCCH/PUSCH transmission with 2-step UCI multiplexing, in accordance with various embodiments.

In one embodiment, a UE can be configured with simultaneous PUCCH and PUSCH transmission, e.g., for inter-band carrier aggregation and for different priority. That is, if a PUCCH and PUSCH is on serving cells in different frequency band, and if the PUCCH and PUSCH is with different priority, these two channels can be transmitted simultaneously. If the UE is also configured with UCI multiplexing between different priorities, then, UE performs step 1 in first embodiment without the consideration of simultaneous PUCCH and PUSCH transmission, and UE performs step 2 in at least one of first to fourth embodiment with the consideration of simultaneous PUCCH and PUSCH transmission, as shown in FIG. 10.

In one example, in step 2, UE first checks the overlapped resultant PUCCH(s) and/or PUSCH(s) for each priority of step 1:

(a) If the overlapped resultant channels of step 1 is PUCCH with one priority and PUCCH with another priority, UE performs multiplexing/cancellation according to at least one of first to fourth embodiment. UE only transmits one PUCCH.

(b) If the overlapped resultant channels of step 1 is PUSCH with one priority and PUSCH with another priority, if the PUSCHs are in different serving cell, UE transmits both PUSCHs, otherwise, UE cancels LP PUSCH and transmits HP PUSCH.

(c) If the overlapped resultant channels of step 1 is PUSCH with one priority and PUCCH with another priority, if the PUSCH and PUCCH are in different serving cell in different frequency band, UE transmits both PUSCH and PUCCH, otherwise, UE performs multiplexing/cancellation according to at least one of first to fourth embodiment. UE only transmits HP channel with or without LP UCI.

If a UE is configured with simultaneous PUCCH and PUSCH transmission for intra-band carrier aggregation and for different priority, and if the UE is also configured with UCI multiplexing between different priorities, then, (c) is changed to:

If the overlapped resultant channels of step 1 is PUSCH with one priority and PUCCH with another priority, if the PUSCH and PUCCH are in different serving cell, UE transmits both PUSCH and PUCCH, otherwise, UE performs multiplexing/cancellation according to at least one of first to fourth embodiment. UE only transmits HP channel with or without LP UCI.

To support intra-UE multiplexing/cancellation between different priorities in step 2, gNB can semi-statically enable this operation by RRC signaling. gNB can also semi-statically enable dynamic indication for enabling/disabling multiplexing between different priorities by RRC signaling. If the dynamic indication is configured, UE expects a bit field in DCI can explicitly or implicitly enable/disable multiplexing between different priorities. For example, UE expects a separate bit field in DCI to enable/disable multiplexing between different priorities. If the bit field indicates '1', UE expects multiplexing between different priorities, and if the bit field indicates '0', UE expects no multiplexing between different priorities. For another example, UE can derive the indication from other bit field in DCI, e.g., the bit field of beta offset for UCI with priority i onto PUSCH with priority j wherein beta_offset=0 implies no multiplexing while beta_offset≠0 implies multiplexing between LP and HP. For UL transmission without DCI or without the bit field to derive multiplexing, e.g., DCI 0_0 or DCI 1_0, it is treated as an indication of no multiplexing. Alternatively, it is treated as an indication of multiplexing.

In one example, to resolve the overlapped UL channels with different priorities, UE determines whether to perform multiplexing of overlapped UL channels with different priorities according to the dynamic indication in DCI for HP UL channel. UE ignores the indication in DCI for LP UL channel. Alternatively, UE assumes the default state is indicated in DCI for LP UL channel, e.g., the default state is multiplexing, or the default state is no multiplexing. In one example, UE does not expect one HP UL channel overlapped with more than one LP UL channel, or UE does not expect one HP UL channel overlapped with more than one LP UL channel in the same serving cell. In another example, if one HP UL channel overlapped with more than one LP UL channel, UE determines one LP UL channel to be multiplexed with the HP UL channel according to the pre-defined rules. For example, if one HP PUCCH overlaps with more than one LP UL channel, and the dynamic indication for HP PUCCH indicates no multiplexing, UE drops the overlapped LP UL channels. If the dynamic indication for HP PUCCH indicates multiplexing, and the overlapped LP UL channels includes LP PUCCH, UE multiplex LP PUCCH with HP PUCCH according to the indication. If the overlapped LP UL channels includes multiple LP PUSCH, UE selects one LP PUSCH to multiplex the HP PUCCH, according to at least one of the factors, including with or without dynamic indication for multiplexing, with or without aperiodic CSI, slot index, UL channel in response to a DCI or not, serving cell index, staring symbol, ending symbol, with or without UL-SCH, in the same serving cell with another UL channel with different priority or not, to be cancelled by another UL or DL symbols/channels or not, etc.

In another example, if a HP PUCCH with DCI overlaps with both LP PUCCH and LP PUSCH, the dynamic indication applies to both the LP PUCCH and LP PUSCH to determine whether to multiplex. As shown in FIG. 11A (dynamic indication in LP DCI is omitted, considering UE ignores the indication), if dynamic indication in DCI for HP PUCCH is to multiplex, UE multiplexes LP PUCCH with HP PUCCH, and multiplex HP PUCCH onto LP PUSCH, so UE transmits LP PUSCH with both LP PUCCH and HP PUCCH. If dynamic indication in DCI for HP PUCCH is to disable multiplex, UE drops LP PUCCH and LP PUSCH, and UE transmits HP PUCCH. If there are multiple LP PUSCHs overlapping with HP PUCCH, UE selects one LP PUSCH to multiplex LP UCI and HP UCI, if dynamic indication in DCI for HP PUCCH is to multiplex. In another example, if a HP PUSCH with DCI overlaps with both LP PUCCH and LP PUSCH, and the LP PUSCH is in the same CC with the HP PUSCH, UE drops the LP PUSCH, and the dynamic indication applies to the LP PUCCH to determine whether to multiplex. As shown in FIG. 11B (dynamic indication in LP DCI is omitted, considering UE ignores the indication), if dynamic indication in DCI for HP PUSCH is to multiplex, UE multiplexes LP UCI onto HP PUSCH, and drops LP PUSCH. if dynamic indication in DCI for HP PUSCH is not to multiplex, UE drops both LP PUCCH and LP PUSCH.

Figure 11C:
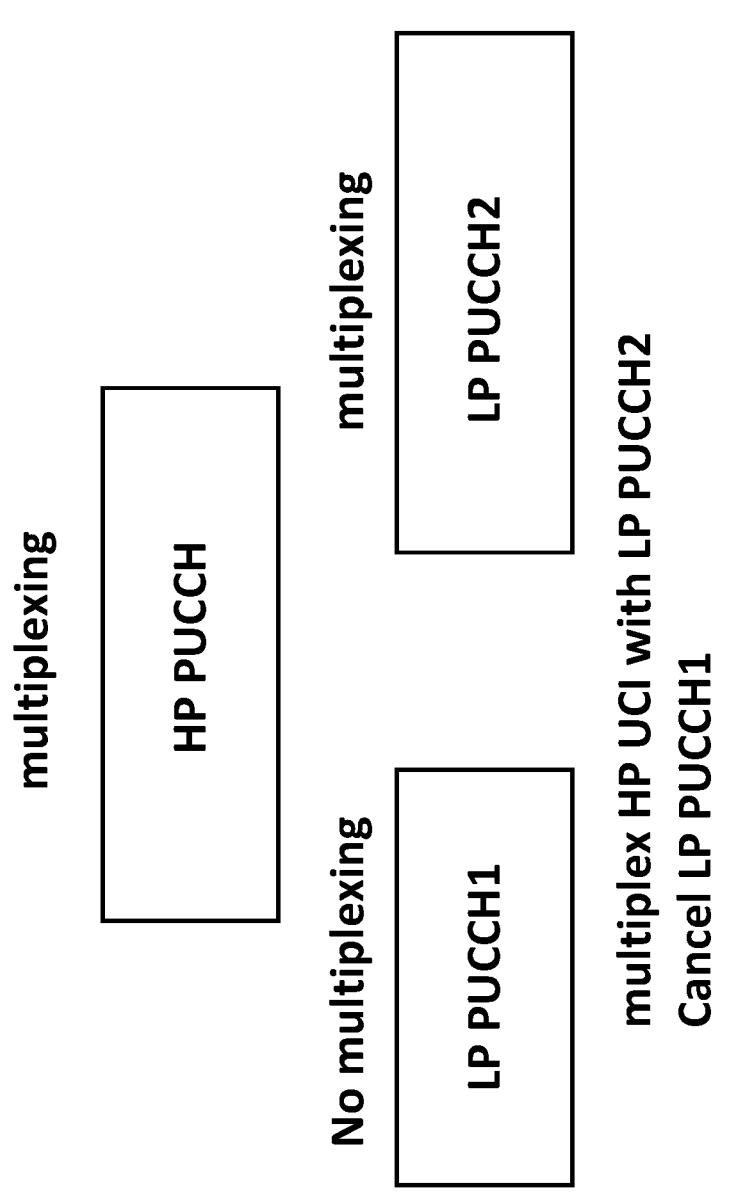
FIG. 11C illustrates an example of a high priority PUCCH overlapping with a first low priority PUCCH (LP PUCCH1) and a second low priority PUCCH (LP PUCCH2) in accordance with various embodiments.

In another example, to resolve the overlapped UL channels with different priorities, UE determines whether to perform multiplexing of overlapped UL channels with different priorities according to dynamic indications in DCI for HP and LP UL channel respectively. For example, if one UL channel with priority i overlapped with one UL channel with priority j, UE checks the dynamic indication in a DCI for the UL channel with priority i and in another DCI for the UL channel with priority j to determine whether these two UL channels are multiplexed. If the dynamic indication is same in these two DCIs, the two UL channels are multiplexed, otherwise, the UL channel with dynamic indication of no multiplexing is dropped or transmit without multiplexing. For example, HP PUCCH overlaps with LP PUCCH1 and LP PUCCH2 as shown in FIG. 11C. The dynamic indication in DCI for LP PUCCH1, DCI for LP PUCCH2 and DCI for HP PUCCH are no multiplexing, multiplexing, and multiplexing respectively. For LP PUCCH1 and HP PUCCH, the indication is different in each DCI, UE does not multiplex HP PUCCH with LP PUCCH1. UE drops LP PUCCH1. For HP PUCCH and LP PUCCH2, the indication is same in each DCI, UE multiplex LP PUCCH2 onto HP PUCCH.

In one example, to resolve the overlapped UL channels with different priorities, if a PUCCH with priority i overlaps with a PUCCH with priority j, UE determines whether to perform multiplexing of the overlapped PUCCHs with different priorities according to the dynamic indication in DCI for HP PUCCH. If a PUCCH with priority i overlaps with a PUSCH with priority j, UE determines whether to perform multiplexing of the overlapped PUCCH and PUSCH with different priorities according to the dynamic indication in DCI for PUSCH, alternatively, UE determines whether to perform multiplexing of the overlapped PUCCH and PUSCH with different priorities according to the dynamic indication in DCI for PUSCH and DCI for HP PUCCH.

Figure 12A:
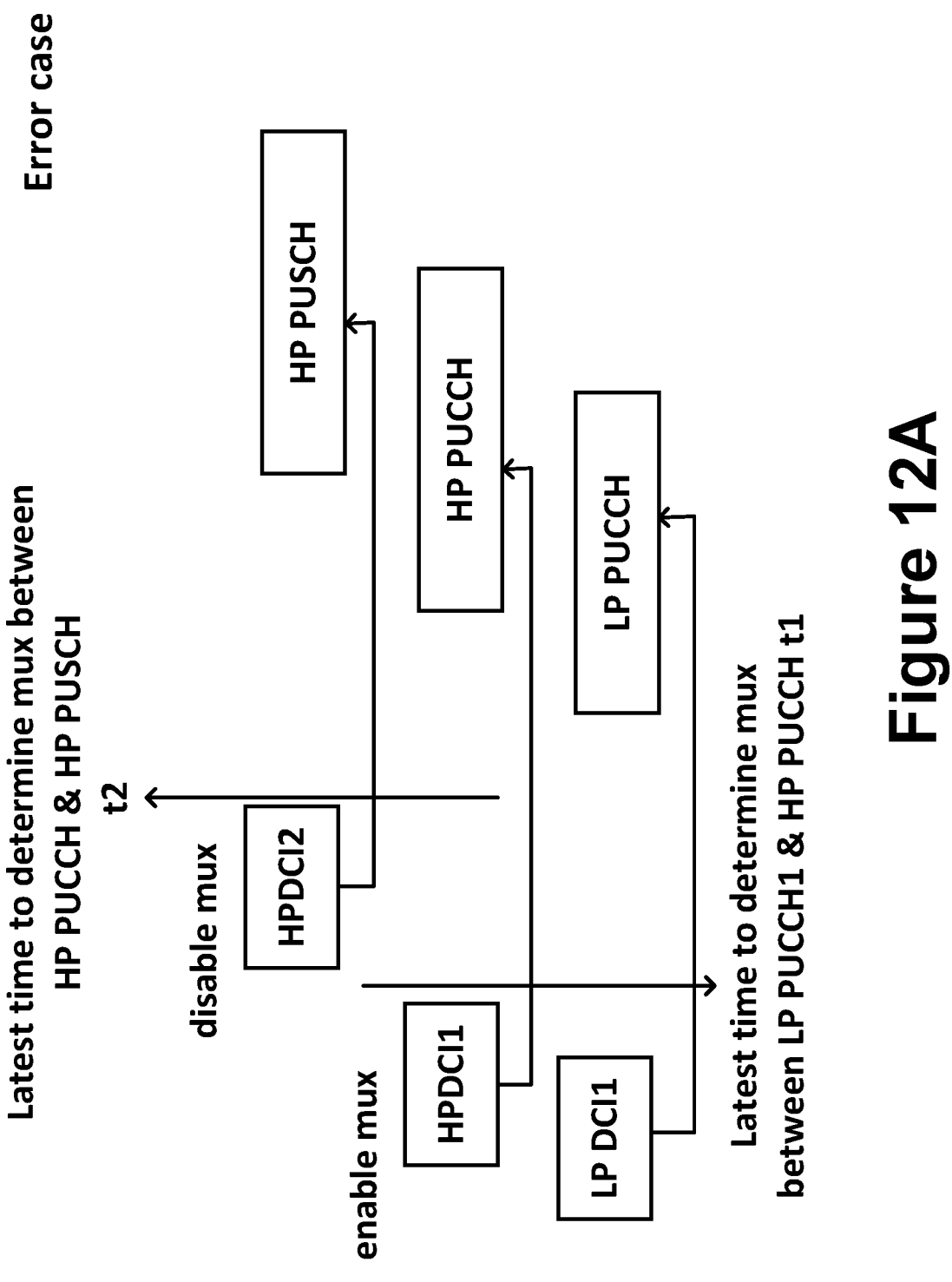
FIGS. 12A and 12B illustrate examples of error cases, in accordance with various embodiments.

In one example, to resolve the overlapped UL channels with different priorities, if a first UL channel with priority i would multiplex with a second UL channel with priority j, UE does not expect a DCI indicating no multiplexing between different priorities (multiplexing is disabled) for the first UL channel to arrive after the latest time to determine the multiplexing between the first and second UL channel. The DCI schedules a third UL channel with priority j which leads to the cancellation of the first UL channel. Alternatively, the DCI schedules a third UL channel with priority j which leads to the cancellation of the first UL channel but multiplexing between the second and the third channel. Alternatively, the DCI schedules a third UL channel with priority i which leads to the cancellation of the first UL channel. Alternatively, the DCI schedules a third UL channel with priority i which leads to the cancellation of the first UL channel but multiplexing between the second and the third channel. Alternatively, the DCI schedules the first UL channel which leads to the cancellation of the first UL channel. It is noted that a first UL channel is not necessarily with earliest starting symbol among the overlapped UL channels. FIG. 12A provides an example. The overlapped UL channels are HP PUSCH, HP PUCCH and LP PUCCH. A first UL channel is LP PUCCH, a second UL channel is HP PUCCH, a third UL channel is HP PUSCH. The DCI indicating no multiplexing between different priorities is HP DCI 2 scheduling the HP PUSCH. The multiplexing deadline for HP PUCCH and LP PUCCH is t1, and the multiplexing deadline for HP PUCCH and HP PUSCH is t2. If HP DCI2 comes after t1, it should be treated as error case. By adding the restriction, demux and re-mux for the same UCI can be avoided.

Alternatively, if a first UL channel with priority i would multiplex with a second UL channel with priority j, UE does not expect a DCI scheduling a third UL channel overlapping with the first and second UL channel, if the DCI arrives after the latest time to determine the multiplexing between the first and second UL channel. In other words, if the overlapped UL channels are to be multiplexed, the DCI should meet the multiplexing time with the reference to the UL channel with earliest starting symbol. This restriction can be equivalent to the restriction discussed above.

It is noted that, if there is only first UL channel and third UL channel overlapped, the DCI for third UL channel indicating no multiplexing can arrive later than t1, as long as the DCI can meet the cancellation timeline for these two UL channels.

In one example, to resolve the overlapped UL channels with different priorities, for a UL channel, if a first UL channel with priority i would be cancelled by a second UL channel with priority j, UE does not expect a DCI indicating multiplexing between different priorities (multiplexing is enabled) for the first UL channel to arrive after the latest time to determine the cancellation of the first UL channel. UE does not expect the DCI to arrive after the latest time to determine the multiplexing between the UL channels. If second UL channel is also to be multiplexed, UE does not expect the DCI to arrive after the latest time to determine the multiplexing between all three channels. The DCI schedules a third UL channel with priority j which leads to multiplexing between at least the first and the third UL channel. Alternatively, the DCI schedules a third UL channel with priority i which leads to multiplexing between at least the first and the third UL channel. Alternatively, the DCI schedules the first UL channel or the third UL channel which leads to the transmission of first UL channel without multiplexing with second or third UL channel. It is noted that a first UL channel is not necessarily with earliest starting symbol among the overlapped UL channels.

Figure 12B:
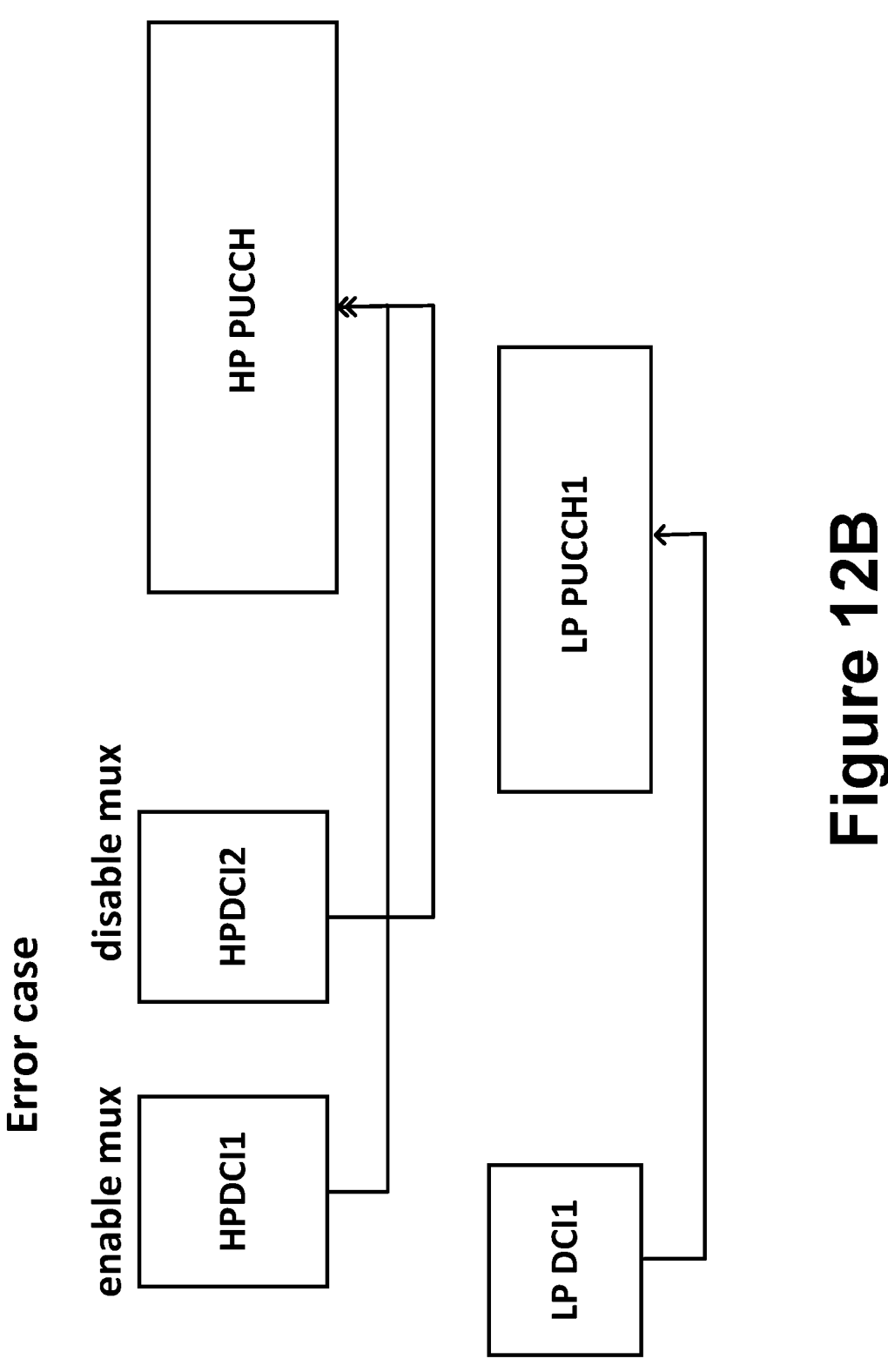

In one example, to resolve the overlapped UL channels with different priorities, for a UL channel, UE does not expect the indication of enable/disable multiplexing in multiple DCIs with same priority associated with the same UL channel is different. As shown in FIG. 12B, if DCI1 and DCI2 are both associated with the same HP PUCCH, DCI1 indicates enabling of multiplexing while DCI2 indicates disabling of multiplexing, then, it is an error case. DCI1 and DCI2 should both indicate enabling multiplexing, or both indicate disabling multiplexing.

Figure 13:
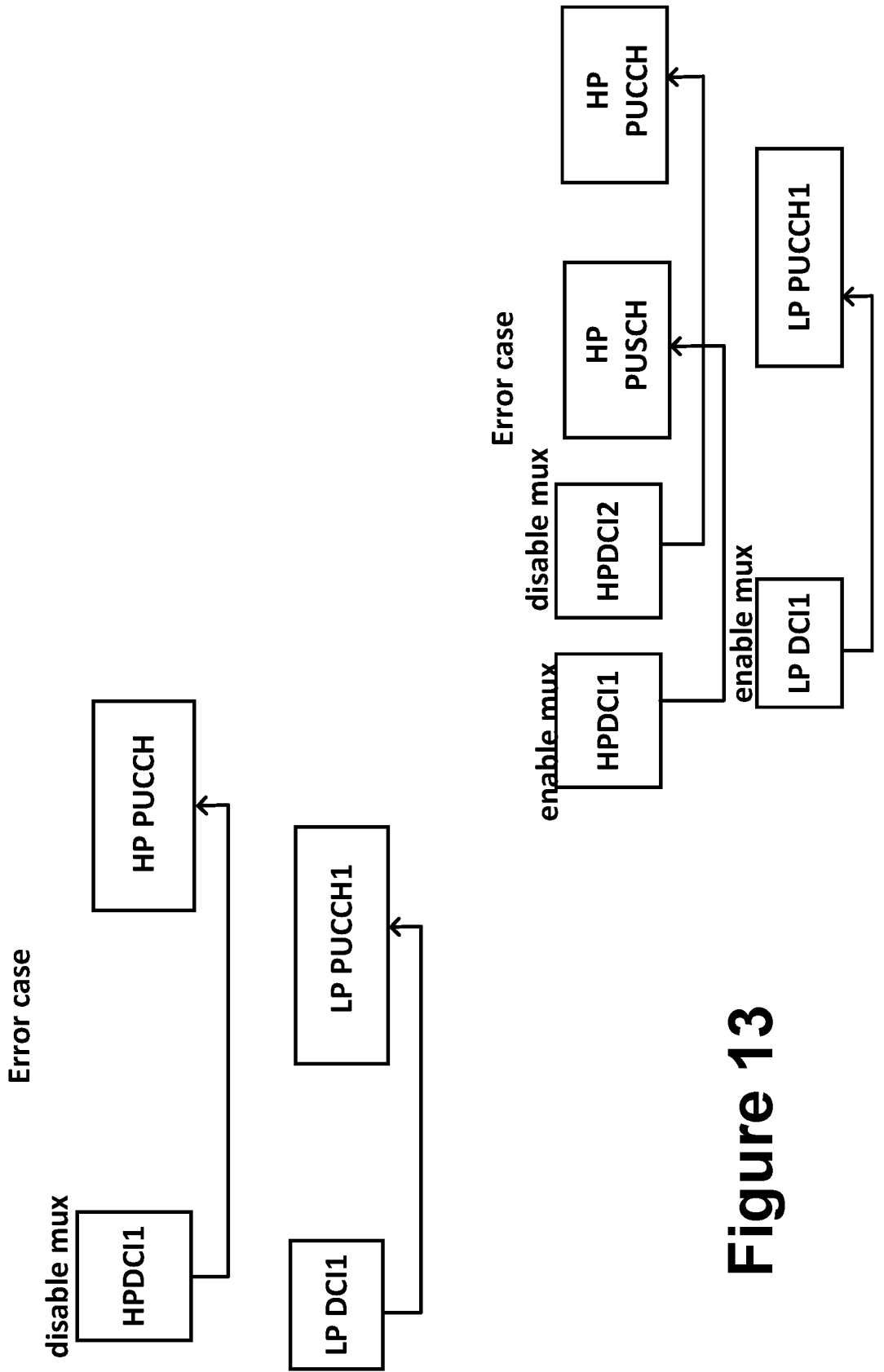
FIG. 13 illustrates additional examples of error cases, in accordance with various embodiments.

In another example, to resolve the overlapped UL channels with different priorities, UE does not expect the indication of enable/disable multiplexing in multiple DCIs associated with the overlapped UL channels is different. FIG. 13 provide examples. If LP PUCCH1 overlaps with a HP UL channel, e.g., HP PUSCH and HP PUCCH. The indication of HP DCI1, HP DCI2 and LP DCI1 should either all enables multiplexing, or all disables multiplexing, otherwise, it is an error case.

Figure 14:
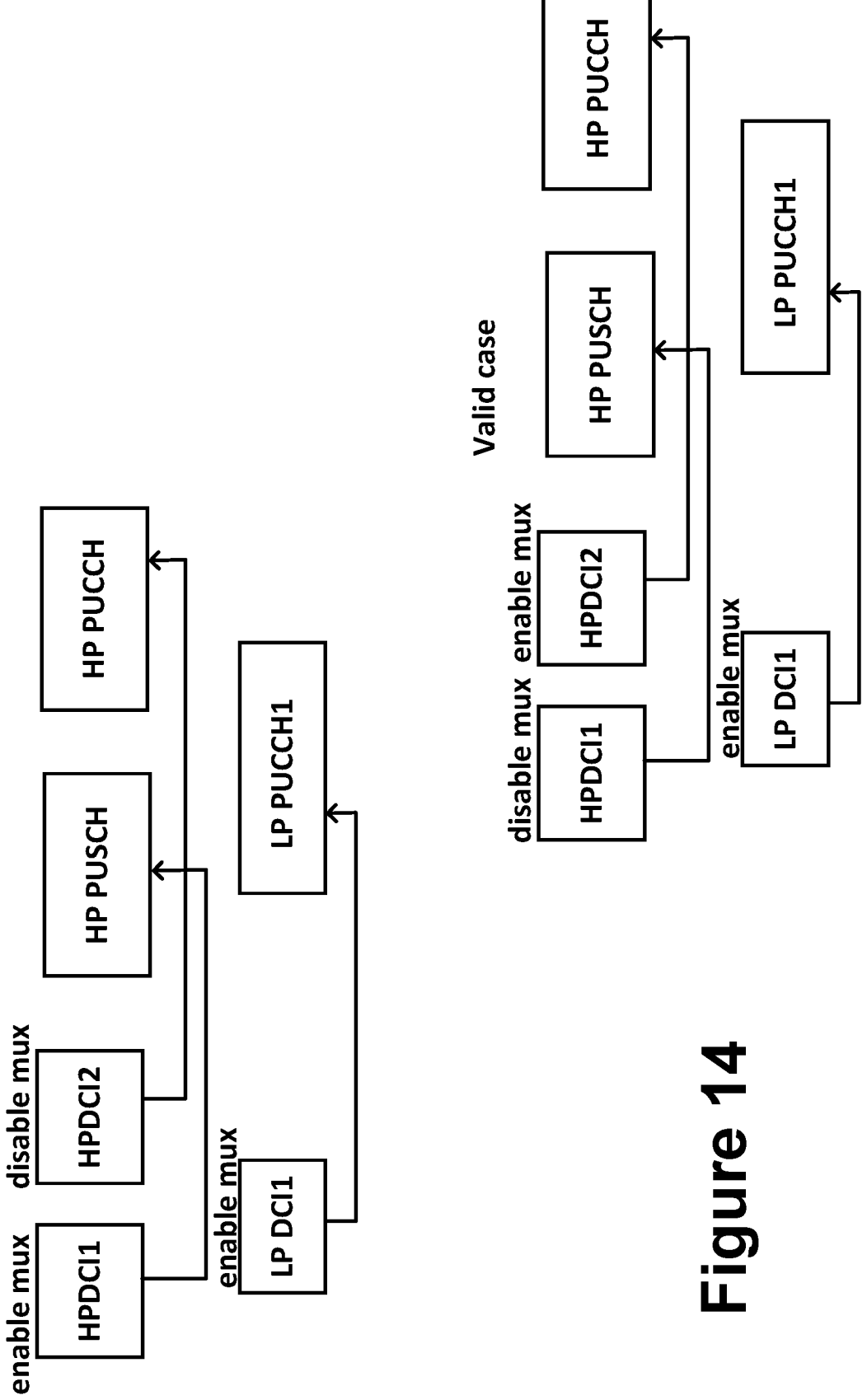
FIG. 14 illustrates an example of an error case and a valid case, in accordance with various embodiments.

In another example, to resolve the overlapped UL channels with different priorities, UE does not expect the indication of enable/disable multiplexing in multiple DCIs associated with the overlapped PUCCHs is different. UE may expect the indication of enable/disable multiplexing in two DCIs associated with overlapped PUCCH and PUSCH is different, where the two DCIs are scheduling PUCCH and PUSCH with different priorities respectively. FIG. 14 provides examples. In one particular case, UE does not expect a DCI scheduling a PUSCH with priority i enabling multiplexing and another DCI scheduling a PUSCH with priority j disabling multiplexing, and the PUSCH overlaps with the PUCCH.

In another example, to resolve the overlapped PUCCHs with different priorities, UE does not expect the indication of enable/disable multiplexing in multiple DCIs with same priority associated with the same UL channel is different, UE may expect the indication of enable/disable multiplexing in multiple DCIs scheduling different PUCCHs of the overlapped PUCCHs are different. For example, in step 2, if one LP PUCCH overlaps with HP PUCCH1 and HP PUCCH2, gNB can indicate multiplexing in DCI for HP PUCCH1 while no multiplexing in DCI for HP PUCCH2. UE multiplexes LP UCI onto HP PUCCH1, and UE does not multiplex LP UCI onto HP PUCCH2.

For a UL transmission, if the associated indication for enable/disable multiplexing is no multiplexing, UE performs cancellation of LP UL channel.

Alternatively, for a UL transmission, if the associated indication for enable/disable multiplexing is no multiplexing, UE performs cancellation of LP UL channel, or UE transmits a UL channel with priority i without UCI with priority j. For example, as shown in FIG. 3E, LP PUCCH overlaps with HP PUCCH, and DCI for HP PUCCH indicates no multiplexing, UE transmits HP PUCCH without LP UCI.

In one example, if UE detects conflicted indication, UE transmits according to a pre-defined rule. The pre-defined rule at least includes UE transmits HP UL channel and drops LP UL channel. For example, in step2, if UE detects a DCI for PUCCH with priority i to indicate multiplexing, and the UE does not detect any DCI for PUSCH with priority j, UE drops the UL channel with low priority. Alternatively, UE transmits according to a pre-defined rule.

Figure 15:
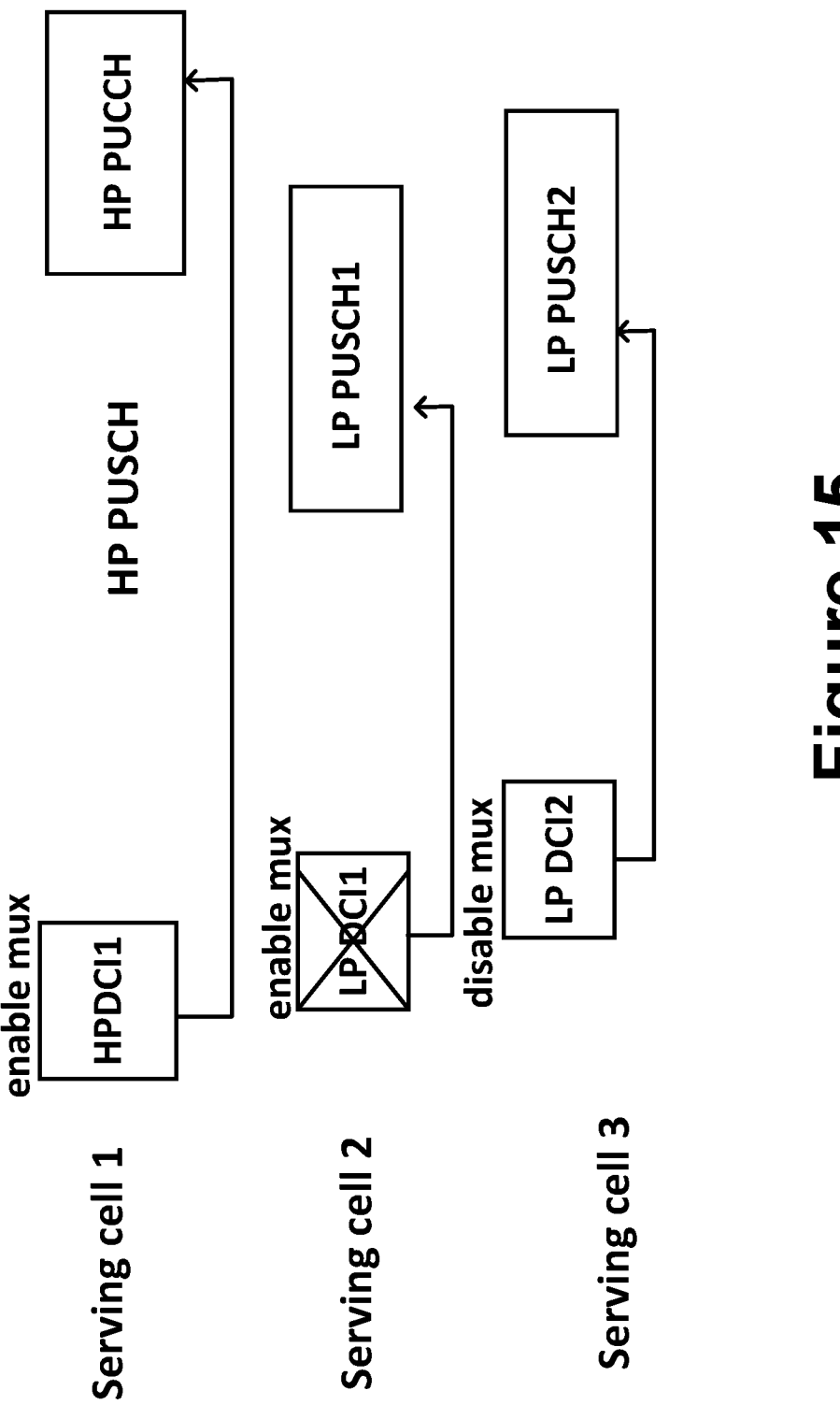
FIG. 15 illustrates another example of a multiplexing procedure, in accordance with various embodiments.

As shown in FIG. 15, gNB transmits HP PUCCH on CC1, LP PUSCH1 on CC2 and LP PUSCH 2 on CC3. DCI for these 3 channels indicates enabling multiplexing, enabling multiplexing, and disabling multiplexing respectively. gNB expects UE to transmit HP UCI onto LP PUSCH1 and also transmit LP PUSCH2 without the HP UCI simultaneously. If UE miss-detects LP DCI1 for LP PUSCH1, UE only identifies HP DCI1 with dynamic indication for enabling multiplexing and LP DCI2 with dynamic indication to disable multiplexing. Therefore, the dynamic indication is conflicted for HP DCI1 and LP DCI 2. Then, UE transmits HP PUCCH and drops LP PUSCH1.

For another example, assuming serving cell 1 and 2 is in the same band, while serving cell 3 is in another band. Assuming the UE is configured with simultaneous transmission for PUSCH/PUCCH with different priorities in different band. If UE miss-detects LP DCI1 for LP PUSCH1, UE only identifies HP DCI1 with dynamic indication for enabling multiplexing and LP DCI2 with dynamic indication to disable multiplexing. Since LP PUSCH2 and HP PUCCH on different serving cells in different band, UE can simultaneously transmit these two UL channels independent of dynamic indication for enabling/disabling multiplexing. Therefore, it can be assumed the dynamic indication is not conflicted. UE transmits HP PUCCH on serving cell1 and LP PUSCH2 without HP UCI on serving cell 2 simultaneously.

In one embodiment, to support intra-UE multiplexing/cancellation between different priorities, gNB can semi-statically enable this operation by RRC signaling. If gNB enables this function, and if a LP HARQ-ACK is to be multiplexed onto a HP PUSCH without HP HARQ-ACK, and the HP PUSCH carries HP CSI, rate matching and RE mapping for the UCIs are multiplexed onto the HP PUSCH according to one of options below:

Option 1: UE performs rate matching and RE mapping for LP HARQ-ACK same as Rel-15 HARQ-ACK and performs rate matching and RE mapping for HP CSI same as Rel-15 CSI. UE does not expect there is not sufficient REs available for HP CSI. Alternatively, UE does not expect there is not sufficient REs available for HP CSI part 1.

Option 2: If HP CSI consists of both CSI part 1 and CSI part 2, UE performs rate matching for HP CSI part 1 same as Rel-15 HARQ-ACK. UE performs rate matching for HP CSI part 2 same as Rel-15 CSI part 1. UE performs rate matching for LP HARQ-ACK same as Rel-15 CSI part 2. UE performs RE mapping for LP HARQ-ACK same as Rel-15 HARQ-ACK, UE performs RE mapping for HP CSI part 1 same as Rel-15 CSI part 1, UE performs RE mapping for HP CSI part 2 same as Rel-15 CSI part 2.

In one option, for rate matching of HP CSI part 1, UE uses the equation for Rel-15 HARQ-ACK to determine the number of coded symbols per layer, by replacing ACK/NACK with HP CSI part 1, replacing $l=l_0$ ($l_0$ is the symbol index of $1s^r$ symbol that does not carry DMRS of the PUSCH) with $l=0$ ($l=0$ is $1s^r$ symbol of the PUSCH), and replacing $$\beta_{offset}^{PUSCH}$$

by $$\beta_{offset}^{CSI-part1}$$

for HP CSI part 1. Then, equation (1) which is from Rel-15 HARQ-ACK is effectively changed to equation (2).

$$Q'_{ACK} = \min \left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{1}$$
$$\left. \left\lceil \alpha \cdot \sum_{l=l_0}^{N_{symb,all}^{PUSCH}-1} M_{sc}^{UCI}(l) \right\rceil \right\}$$

$$Q'_{HPCSIpart1} = \tag{2}$$
$$\min \left\{ \left\lceil \frac{(O_{HPCSI\,part1} + L_{HPCSI\,part1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$
$$\left. \left\lceil \alpha \cdot \sum_{l=0}^{N_{symb,all}^{PUSCH}-1} M_{sc}^{UCI}(l) \right\rceil \right\}$$

Equivalently, UE performs rate matching for HP CSI part 1 same as Rel-15 CSI part 1, assuming the number of HARQ-ACK is 0, e.g., $Q'_{ACK/CG-UCI}=0$ in equation (3). And for HP CSI part 2, UE performs rate matching for HP CSI part 1 same as Rel-15 CSI part 1, assuming the number of HARQ-ACK is 0, e.g., $Q'_{ACK/CG-UCI}=0$ in equation (4).

$$Q'_{CSI-1} = \min \left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{3}$$
$$\left. \left\lceil \alpha \cdot \sum_{l=0}^{N_{symb,all}^{PUSCH}-1} M_{sc}^{UCI}(l) \right\rceil - Q'_{ACK/CG-UCI} \right\}$$

$$Q'_{CSI-2} = \min \left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{4}$$
$$\left. \left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \right\}$$

In one option, for rate matching of LP HARQ-ACK, UE uses the equation for Rel-15 CSI part 2 to determine the number of coded symbols per layer, by replacing CSI part 2 with LP HARQ-ACK, replacing l=0 with l=l_0, and replacing $$\beta_{offset}^{PUSCH}$$

by $$\beta_{offset}^{HARQ-ACK-LP}.$$

Then, equation (4) which is from Rel-15 CSI part 2 is effectively changed to equation (5). Alternatively, l=0 is not replaced with l=l_0, as shown in equation (6).

$$Q'_{ACK-LP} = \tag{5}$$
$$\min \left\{ \left\lceil \frac{(O_{ACK-LP} + L_{ACK-LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$
$$\left. \left\lceil \alpha \cdot \sum_{l=l_0}^{N_{symb,all}^{PUSCH}-1} M_{sc}^{UCI}(l) \right\rceil - Q'_{HP-CSI-1} - Q'_{HP-CSI-2} \right\}$$

$$Q'_{ACK-LP} = \tag{6}$$
$$\min \left\{ \left\lceil \frac{(O_{ACK-LP} + L_{ACK-LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$
$$\left. \left\lceil \alpha \cdot \sum_{l=l_0}^{N_{symb,all}^{PUSCH}-1} M_{sc}^{UCI}(l) \right\rceil - Q'_{ACK-HP/CG-UCI} - Q'_{HP-CSI-1} \right\}$$

Option 3: If HP CSI consists of both CSI part 1 and CSI part 2, UE performs rate matching and RE mapping for HP CSI part 1 same as Rel-15 HARQ-ACK. UE performs rate matching and RE mapping for HP CSI part 2 same as Rel-15 CSI part 1. UE performs rate matching and RE mapping for LP HARQ-ACK same as Rel-15 CSI part 2. Then, equation (1) which is from Rel-15 HARQ-ACK is effectively changed to equation (7), for HP CSI Part 1. Equation (6) is for LP HARQ-ACK.

$$Q'_{HPCSIpart1} = \tag{7}$$
$$\min \left\{ \left\lceil \frac{(O_{HPCSI\,part1} + L_{HPCSI\,part1}) \cdot \beta_{offset}^{PUSCH} \cdot \sum_{l=0}^{N_{symb,all}^{PUSCH}} M_{sc}^{UCI}(l)}{\sum_{r=0}^{C_{UL-SCH}-1} K_r} \right\rceil, \right.$$
$$\left. \left\lceil \alpha \cdot \sum_{l=0}^{N_{symb,all}^{PUSCH}-1} M_{sc}^{UCI}(l) \right\rceil \right\}$$

Option 4: If HP CSI consists of only CSI part 1, UE performs rate matching for HP CSI part 1 same as Rel-15 HARQ-ACK. UE performs rate matching for LP HARQ-ACK same as Rel-15 CSI part 1. UE performs RE mapping for LP HARQ-ACK same as Rel-15 HARQ-ACK, UE performs RE mapping for HP CSI part 1 same as Rel-15 CSI part 1. For LP HARQ-ACK, UE uses the equation for Rel-15 CSI part 1 to determine the number of coded symbols per layer, by replacing CSI-1 with LP HARQ-ACK, replacing l=0 with l=l_0, replacing $$\beta_{offset}^{PUSCH}$$

by $$\beta_{offset}^{HARQ-ACK-LP}$$

for LP HARQ-ACK, and replacing $Q'_{ACK/CG-UCI}$ with $Q'_{HP\ CSI\ part1}$. So, equation (7) which is from Rel-15 CSI part 1 is effectively changed to equation (8).

$$Q'_{CSI-1} = \min \left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \tag{7}$$
$$\left. \left\lceil \alpha \cdot \sum_{l=0}^{N_{symb,all}^{PUSCH}-1} M_{sc}^{UCI}(l) \right\rceil - Q'_{ACK/CG-UCI} \right\}$$

$$Q'_{ACK-LP} = \tag{8}$$
$$\min \left\{ \left\lceil \frac{(O_{ACK-LP} + L_{ACK-LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$
$$\left. \left\lceil \alpha \cdot \sum_{l=l_0}^{N_{symb,all}^{PUSCH}-1} M_{sc}^{UCI}(l) \right\rceil - Q'_{HP-CSI\ part1} \right\}$$

Option 5: If HP CSI consists of only CSI part 1, UE performs rate matching and RE mapping for HP CSI part 1 same as Rel-15 HARQ-ACK. UE performs rate matching and RE mapping for LP HARQ-ACK same as Rel-15 CSI part 1. For LP HARQ-ACK, equation (7) which is from Rel-15 CSI part 1 is effectively changed to equation (9).

$$Q'_{ACK-LP} = \tag{9}$$
$$\min \left\{ \left\lceil \frac{(O_{ACK-LP} + L_{ACK-LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$
$$\left. \left\lceil \alpha \cdot \sum_{l=l_0}^{N_{symb,all}^{PUSCH}-1} M_{sc}^{UCI}(l) \right\rceil - Q'_{HP-CSI\ part1} \right\}$$

Option 6: If HP CSI consists of only CSI part 1, UE performs rate matching for HP CSI part 1 same as Rel-15 CSI part 1 assuming the number of HARQ-ACK is 0, e.g., $Q'_{ACK/CG-UCI}=0$ in equation (3). UE performs rate matching for LP HARQ-ACK same as Rel-15 CSI part 2 assuming the number of HARQ-ACK is 0, e.g., $Q'_{ACK/CG-UCI}=0$ in equation (4). UE performs RE mapping for LP HARQ-ACK same as Rel-15 CSI part 2, UE performs RE mapping for HP CSI part same as Rel-15 CSI part 1.

For option 2~option 6, if there is not sufficient REs for LP HARQ-ACK, e.g., if $$\left\lceil \frac{(O_{ACK-LP} + L_{ACK-LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil >$$
$$\left\lceil \alpha \cdot \sum_{l=l_0}^{N_{symb,all}^{PUSCH}-1} M_{sc}^{UCI}(l) \right\rceil - Q'_{HP-CSI\ part1},$$

UE drops LP HARQ-ACK, and other UCI RE mapping and UL-SCH RE mapping is performed same as the case without any LP HARQ-ACK. Alternatively, UE transmits LP HARQ-ACK according to $Q'_{ACK/LP}$ determined by equation.

Option 7: If HP CSI consists of both CSI part 1 and CSI part 2, UE performs joint coding of LP HARQ-ACK with HP CSI part 1, or joint coding of LP HARQ-ACK with HP CSI part 2. If there is not sufficient REs for HP CSI part1+LP HARQ-ACK, or HP CSI part 2+LP HARQ-ACK, LP HARQ-ACK is firstly dropped before partial CSI dropping, if any.

In one embodiment, f a LP CG PUSCH overlaps with a HP DG PUSCH, t1 is determined as N2 or N2+d1 symbols before start of the LP CG PUSCH, and t0 is determined as (N2+d1+d3) symbols before start of the first overlapping symbol of LP CG PUSCH and HP DG PUSCH. d3={0, 1, . . . , $2^{\mu+1}$} symbol(s), μ represents different SCS. The value of d3 is reported by UE.

Figure 16A:
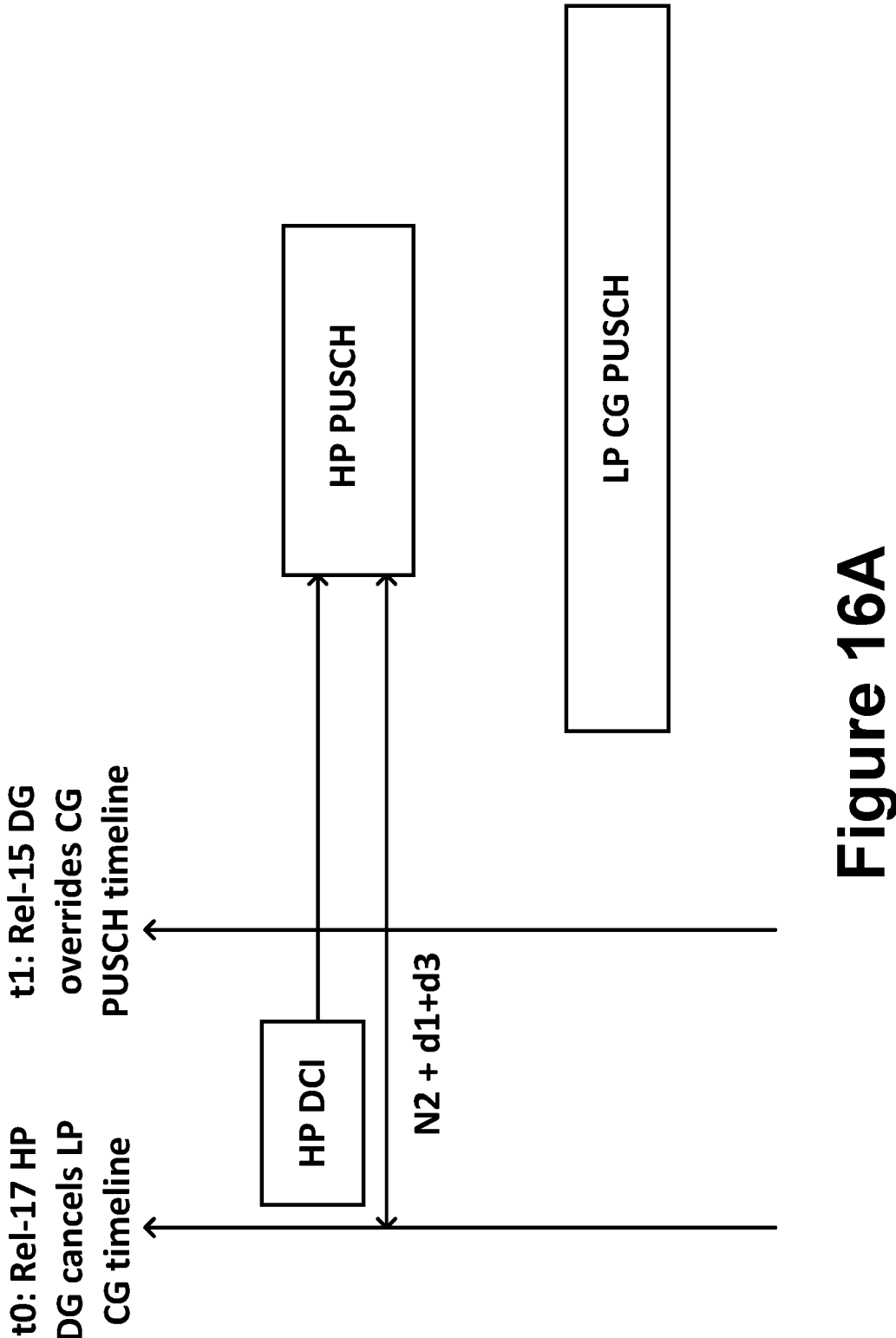
FIGS. 16A-16C illustrate examples of uplink grant scheduling, in accordance with various embodiments.
Figure 16B:
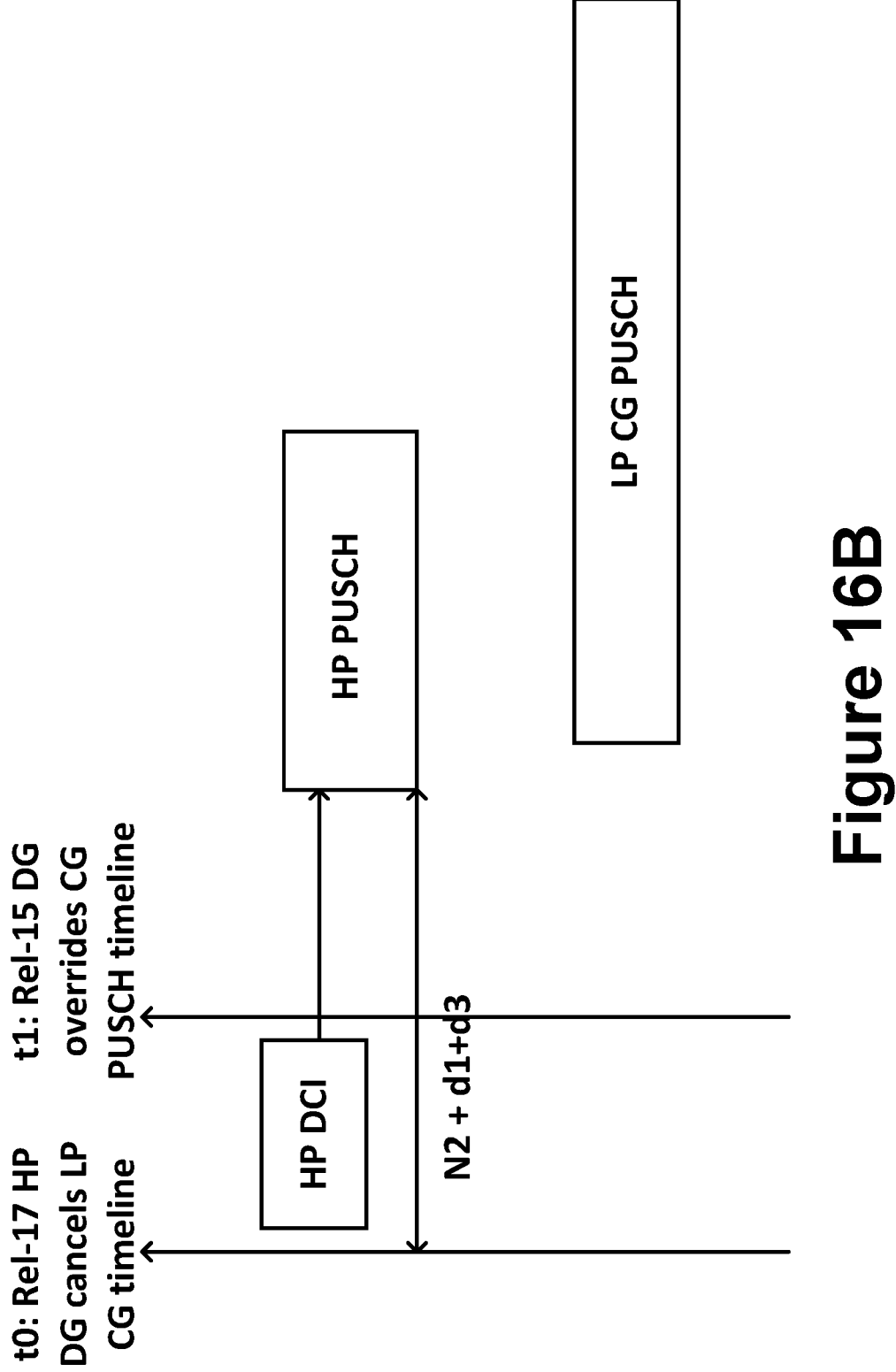
Figure 16C:
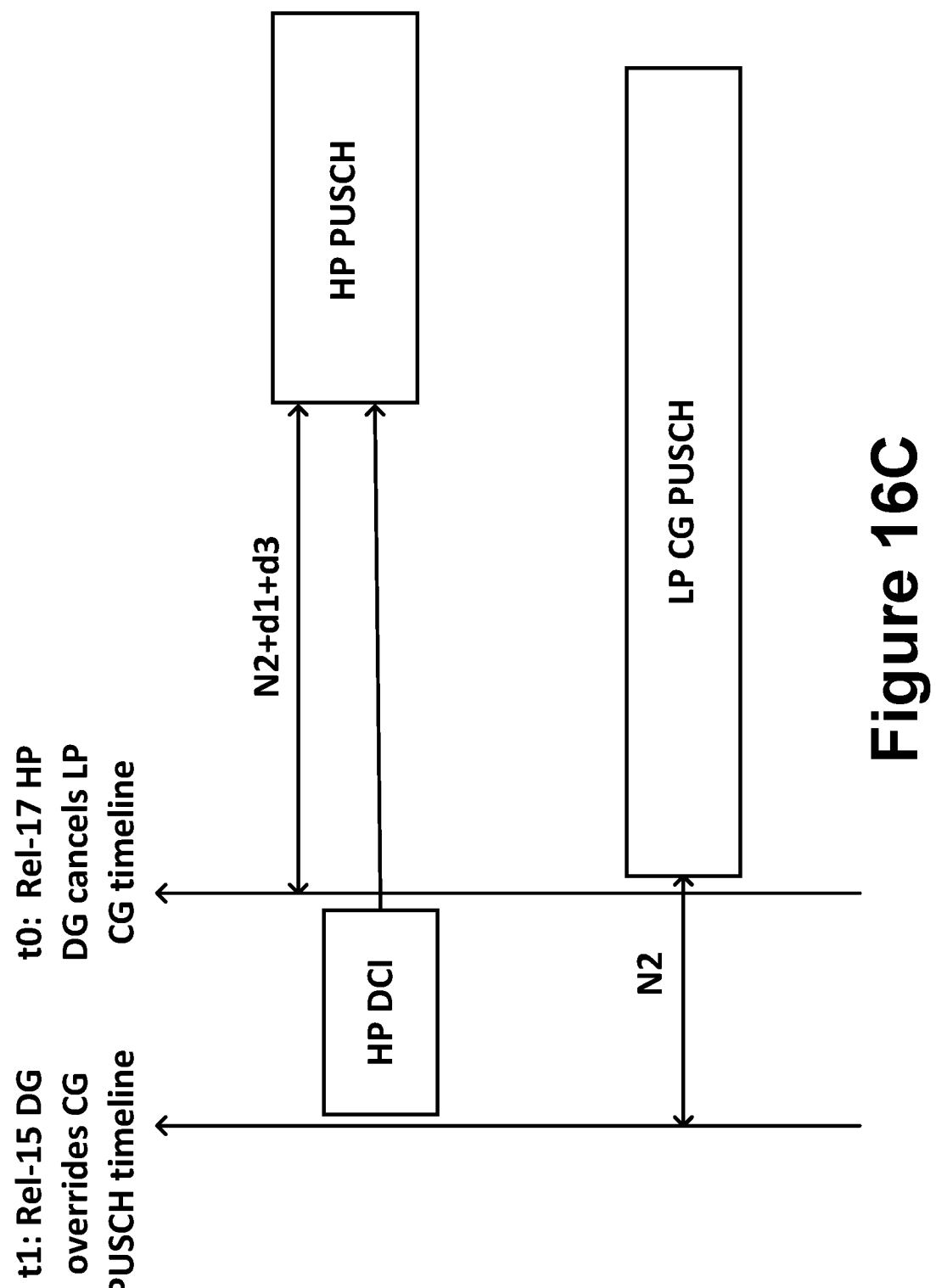

If t0 occurs at or before t1, UL grant scheduling the HP DG PUSCH should end no later than t1, to ensure sufficient time to cancel the LP CG PUSCH, as shown in FIGS. 16A and 16B. In other words, UL grant scheduling the HP DG PUSCH can occur later than t0. In such case, MAC layer may only deliver MAC PDU for HP DG PUSCH. Otherwise, UL grant scheduling the HP DG PUSCH should end no later than t0, in such case, MAC layer delivers MAC PDU for both LP CG PUSCH and HP DG PUSCH, as shown in FIG. 16C.

Systems and Implementations

Figure 17:
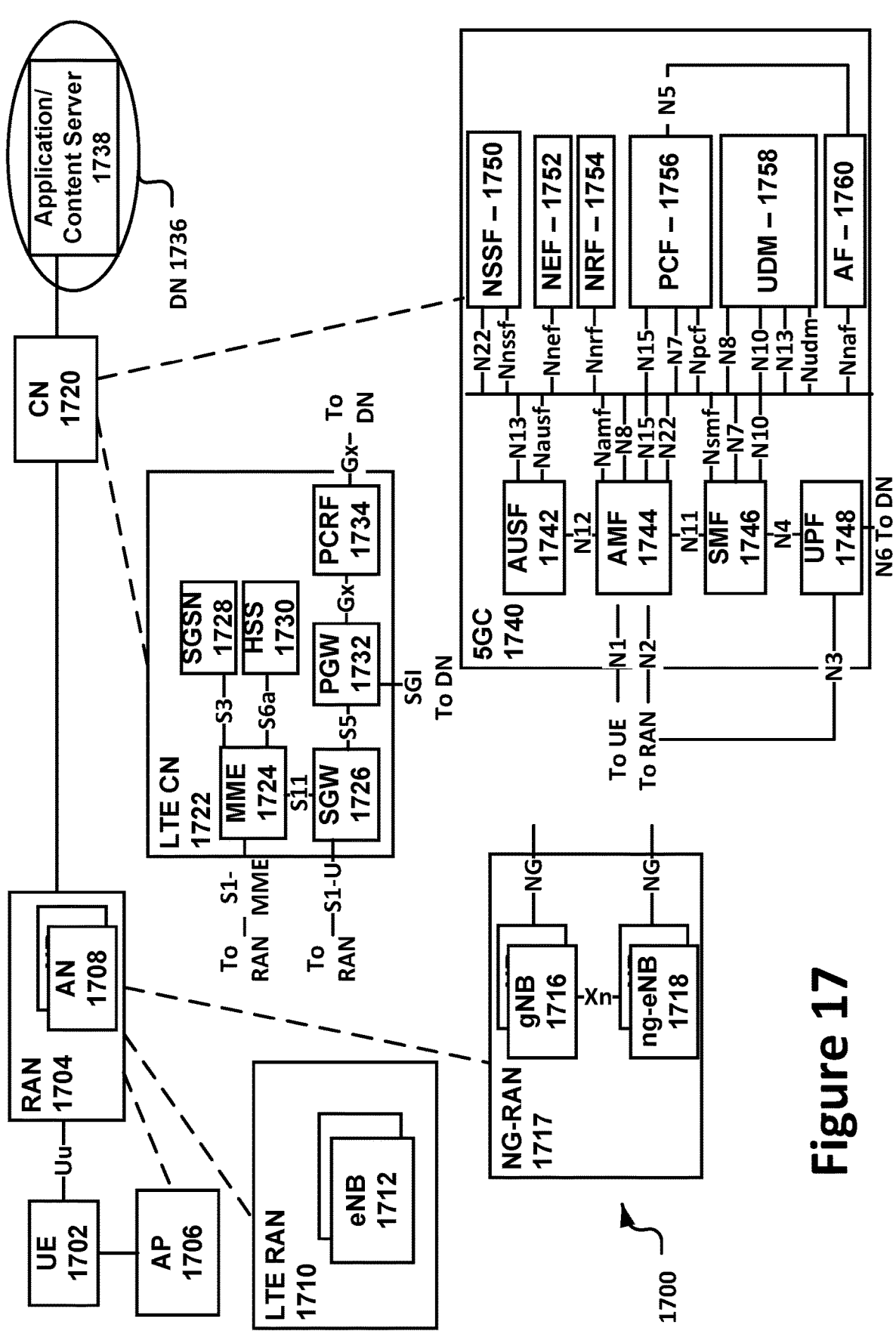
FIG. 17 schematically illustrates a wireless network in accordance with various embodiments.
Figure 18:
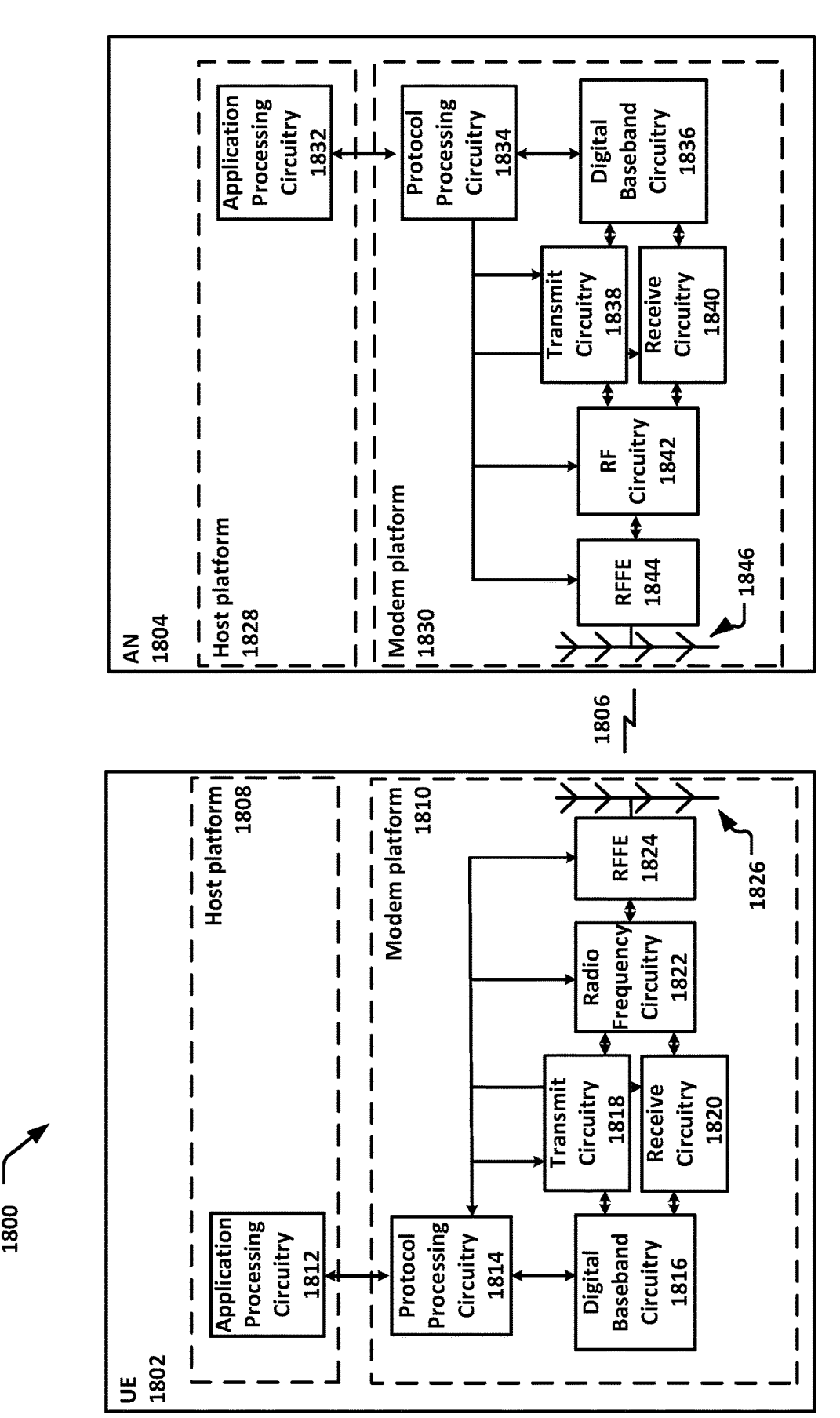
FIG. 18 schematically illustrates components of a wireless network in accordance with various embodiments.
Figure 19:
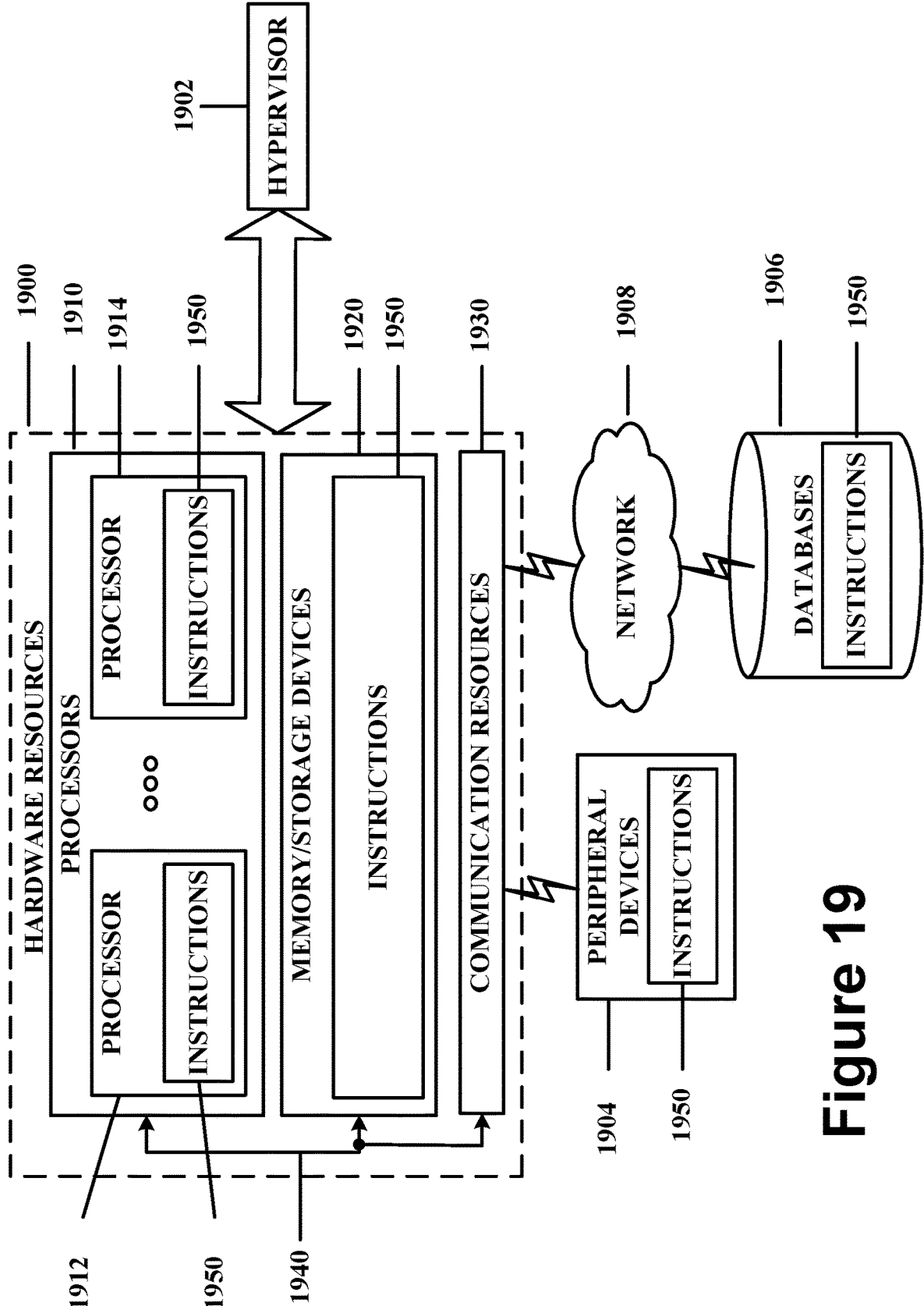
FIG. 19 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 17-19 illustrate various systems, devices, and components that may implement aspects of disclosed embodiments.

FIG. 17 illustrates a network 1700 in accordance with various embodiments. The network 1700 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1700 may include a UE 1702, which may include any mobile or non-mobile computing device designed to communicate with a RAN 1704 via an over-the-air connection. The UE 1702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1702 may additionally communicate with an AP 1706 via an over-the-air connection. The AP 1706 may manage a WLAN connection, which may serve to offload some/all network traffic from the RAN 1704. The connection between the UE 1702 and the AP 1706 may be consistent with any IEEE 802.11 protocol, wherein the AP 1706 could be a wireless fidelity (Wi-Fi®) router. In some embodiments, the UE 1702, RAN 1704, and AP 1706 may utilize cellular-WLAN aggregation (for example, LWA/LWIP). Cellular-WLAN aggregation may involve the UE 1702 being configured by the RAN 1704 to utilize both cellular radio resources and WLAN resources.

The RAN 1704 may include one or more access nodes, for example, AN 1708. AN 1708 may terminate air-interface protocols for the UE 1702 by providing access stratum protocols including RRC, PDCP, RLC, MAC, and L1 protocols. In this manner, the AN 1708 may enable data/voice connectivity between CN 1720 and the UE 1702. In some embodiments, the AN 1708 may be implemented in a discrete device or as one or more software entities running on server computers as part of, for example, a virtual network, which may be referred to as a CRAN or virtual baseband unit pool. The AN 1708 be referred to as a BS, gNB, RAN node, eNB, ng-eNB, NodeB, RSU, TRxP, TRP, etc. The AN 1708 may be a macrocell base station or a low power base station for providing femtocells, picocells or other like cells having smaller coverage areas, smaller user capacity, or higher bandwidth compared to macrocells.

In embodiments in which the RAN 1704 includes a plurality of ANs, they may be coupled with one another via an X2 interface (if the RAN 1704 is an LTE RAN) or an Xn interface (if the RAN 1704 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1704 may each manage one or more cells, cell groups, component carriers, etc. to provide the UE 1702 with an air interface for network access. The UE 1702 may be simultaneously connected with a plurality of cells provided by the same or different ANs of the RAN 1704. For example, the UE 1702 and RAN 1704 may use carrier aggregation to allow the UE 1702 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1704 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1702 or AN 1708 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1704 may be an LTE RAN 1710 with eNBs, for example, eNB 1712. The LTE RAN 1710 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1704 may be an NG-RAN 1714 with gNBs, for example, gNB 1716, or ng-eNBs, for example, ng-eNB 1718. The gNB 1716 may connect with 5G-enabled UEs using a 5G NR interface. The gNB 1716 may connect with a 5G core through an NG interface, which may include an N2 interface or an N3 interface. The ng-eNB 1718 may also connect with the 5G core through an NG interface, but may connect with a UE via an LTE air interface. The gNB 1716 and the ng-eNB 1718 may connect with each other over an Xn interface.

In some embodiments, the NG interface may be split into two parts, an NG user plane (NG-U) interface, which carries traffic data between the nodes of the NG-RAN 1714 and a UPF 1748 (e.g., N3 interface), and an NG control plane (NG-C) interface, which is a signaling interface between the nodes of the NG-RAN1714 and an AMF 1744 (e.g., N2 interface).

The NG-RAN 1714 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1702 can be configured with multiple BWPs where each BWP configuration has a different SCS. When a BWP change is indicated to the UE 1702, the SCS of the transmission is changed as well. Another use case example of BWP is related to power saving. In particular, multiple BWPs can be configured for the UE 1702 with different amount of frequency resources (for example, PRBs) to support data transmission under different traffic loading scenarios. A BWP containing a smaller number of PRBs can be used for data transmission with small traffic load while allowing power saving at the UE 1702 and in some cases at the gNB 1716. A BWP containing a larger number of PRBs can be used for scenarios with higher traffic load.

The RAN 1704 is communicatively coupled to CN 1720 that includes network elements to provide various functions to support data and telecommunications services to customers/subscribers (for example, users of UE 1702). The components of the CN 1720 may be implemented in one physical node or separate physical nodes. In some embodiments, NFV may be utilized to virtualize any or all of the functions provided by the network elements of the CN 1720 onto physical compute/storage resources in servers, switches, etc. A logical instantiation of the CN 1720 may be referred to as a network slice, and a logical instantiation of a portion of the CN 1720 may be referred to as a network sub-slice.

In some embodiments, the CN 1720 may be an LTE CN 1722, which may also be referred to as an EPC. The LTE CN 1722 may include MME 1724, SGW 1726, SGSN 1728, HSS 1730, PGW 1732, and PCRF 1734 coupled with one another over interfaces (or "reference points") as shown. Functions of the elements of the LTE CN 1722 may be briefly introduced as follows.

The MME 1724 may implement mobility management functions to track a current location of the UE 1702 to facilitate paging, bearer activation/deactivation, handovers, gateway selection, authentication, etc.

The SGW 1726 may terminate an Si interface toward the RAN and route data packets between the RAN and the LTE CN 1722. The SGW 1726 may be a local mobility anchor point for inter-RAN node handovers and also may provide an anchor for inter-3GPP mobility. Other responsibilities may include lawful intercept, charging, and some policy enforcement.

The SGSN 1728 may track a location of the UE 1702 and perform security functions and access control. In addition, the SGSN 1728 may perform inter-EPC node signaling for mobility between different RAT networks; PDN and S-GW selection as specified by MME 1724; MME selection for handovers; etc. The S3 reference point between the MME 1724 and the SGSN 1728 may enable user and bearer information exchange for inter-3GPP access network mobility in idle/active states.

The HSS 1730 may include a database for network users, including subscription-related information to support the network entities' handling of communication sessions. The HSS 1730 can provide support for routing/roaming, authentication, authorization, naming/addressing resolution, location dependencies, etc. An S6a reference point between the HSS 1730 and the MME 1724 may enable transfer of subscription and authentication data for authenticating/authorizing user access to the LTE CN 1720.

The PGW 1732 may terminate an SGi interface toward a data network (DN) 1736 that may include an application/content server 1738. The PGW 1732 may route data packets between the LTE CN 1722 and the data network 1736. The PGW 1732 may be coupled with the SGW 1726 by an S5 reference point to facilitate user plane tunneling and tunnel management. The PGW 1732 may further include a node for policy enforcement and charging data collection (for example, PCEF). Additionally, the SGi reference point between the PGW 1732 and the data network 17 36 may be an operator external public, a private PDN, or an intra-operator packet data network, for example, for provision of IMS services. The PGW 1732 may be coupled with a PCRF 1734 via a Gx reference point.

The PCRF 1734 is the policy and charging control element of the LTE CN 1722. The PCRF 1734 may be communicatively coupled to the app/content server 1738 to determine appropriate QoS and charging parameters for service flows. The PCRF 1732 may provision associated rules into a PCEF (via Gx reference point) with appropriate TFT and QCI.

In some embodiments, the CN 1720 may be a 5GC 1740. The 5GC 1740 may include an AUSF 1742, AMF 1744, SMF 1746, UPF 1748, NSSF 1750, NEF 1752, NRF 1754, PCF 1756, UDM 1758, and AF 1760 coupled with one another over interfaces (or "reference points") as shown. Functions of the elements of the 5GC 1740 may be briefly introduced as follows.

The AUSF 1742 may store data for authentication of UE 1702 and handle authentication-related functionality. The AUSF 1742 may facilitate a common authentication framework for various access types. In addition to communicating with other elements of the 5GC 1740 over reference points as shown, the AUSF 1742 may exhibit an Nausf service-based interface.

The AMF 1744 may allow other functions of the 5GC 1740 to communicate with the UE 1702 and the RAN 1704 and to subscribe to notifications about mobility events with respect to the UE 1702. The AMF 1744 may be responsible for registration management (for example, for registering UE 1702), connection management, reachability management, mobility management, lawful interception of AMF-related events, and access authentication and authorization. The AMF 1744 may provide transport for SM messages between the UE 1702 and the SMF 1746, and act as a transparent proxy for routing SM messages. AMF 1744 may also provide transport for SMS messages between UE 1702 and an SMSF. AMF 1744 may interact with the AUSF 1742 and the UE 1702 to perform various security anchor and context management functions. Furthermore, AMF 1744 may be a termination point of a RAN CP interface, which may include or be an N2 reference point between the RAN 1704 and the AMF 1744; and the AMF 1744 may be a termination point of NAS (N1) signaling, and perform NAS ciphering and integrity protection. AMF 1744 may also support NAS signaling with the UE 1702 over an N3 IWF interface.

The SMF 1746 may be responsible for SM (for example, session establishment, tunnel management between UPF 1748 and AN 1708); UE IP address allocation and management (including optional authorization); selection and control of UP function; configuring traffic steering at UPF 1748 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1744 over N2 to AN 1708; and determining SSC mode of a session. SM may refer to management of a PDU session, and a PDU session or "session" may refer to a PDU connectivity service that provides or enables the exchange of PDUs between the UE 1702 and the data network 1736.

The UPF 1748 may act as an anchor point for intra-RAT and inter-RAT mobility, an external PDU session point of interconnect to data network 1736, and a branching point to support multi-homed PDU session. The UPF 1748 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1748 may include an uplink classifier to support routing traffic flows to a data network.

The NSSF 1750 may select a set of network slice instances serving the UE 1702. The NSSF 1750 may also determine allowed NSSAI and the mapping to the subscribed S-NSSAIs, if needed. The NSSF 1750 may also determine the AMF set to be used to serve the UE 1702, or a list of candidate AMFs based on a suitable configuration and possibly by querying the NRF 1754. The selection of a set of network slice instances for the UE 1702 may be triggered by the AMF 1744 with which the UE 1702 is registered by interacting with the NSSF 1750, which may lead to a change of AMF. The NSSF 1750 may interact with the AMF 1744 via an N22 reference point; and may communicate with another NSSF in a visited network via an N31 reference point (not shown). Additionally, the NSSF 1750 may exhibit an Nnssf service-based interface.

The NEF 1752 may securely expose services and capabilities provided by 3GPP network functions for third party, internal exposure/re-exposure, AFs (e.g., AF 1760), edge computing or fog computing systems, etc. In such embodiments, the NEF 1752 may authenticate, authorize, or throttle the AFs. NEF 1752 may also translate information exchanged with the AF 1760 and information exchanged with internal network functions. For example, the NEF 1752 may translate between an AF-Service-Identifier and an internal 5GC information. NEF 1752 may also receive information from other NFs based on exposed capabilities of other NFs. This information may be stored at the NEF 1752 as structured data, or at a data storage NF using standardized interfaces. The stored information can then be re-exposed by the NEF 1752 to other NFs and AFs, or used for other purposes such as analytics. Additionally, the NEF 1752 may exhibit an Nnef service-based interface.

The NRF 1754 may support service discovery functions, receive NF discovery requests from NF instances, and provide the information of the discovered NF instances to the NF instances. NRF 1754 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1754 may exhibit the Nnrf service-based interface.

The PCF 1756 may provide policy rules to control plane functions to enforce them, and may also support unified policy framework to govern network behavior. The PCF 1756 may also implement a front end to access subscription information relevant for policy decisions in a UDR of the UDM 1758. In addition to communicating with functions over reference points as shown, the PCF 1756 exhibit an Npcf service-based interface.

The UDM 1758 may handle subscription-related information to support the network entities' handling of communication sessions, and may store subscription data of UE 1702. For example, subscription data may be communicated via an N8 reference point between the UDM 1758 and the AMF 1744. The UDM 1758 may include two parts, an application front end and a UDR. The UDR may store subscription data and policy data for the UDM 1758 and the PCF 1756, and/or structured data for exposure and application data (including PFDs for application detection, application request information for multiple UEs 1702) for the NEF 1752. The Nudr service-based interface may be exhibited by the UDR 221 to allow the UDM 1758, PCF 1756, and NEF 1752 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1758 may exhibit the Nudm service-based interface.

The AF 1760 may provide application influence on traffic routing, provide access to NEF, and interact with the policy framework for policy control.

In some embodiments, the 5GC 1740 may enable edge computing by selecting operator/$3^{Rd}$ party services to be geographically close to a point that the UE 1702 is attached to the network. This may reduce latency and load on the network. To provide edge-computing implementations, the 5GC 1740 may select a UPF 1748 close to the UE 1702 and execute traffic steering from the UPF 1748 to data network 1736 via the N6 interface. This may be based on the UE subscription data, UE location, and information provided by the AF 1760. In this way, the AF 1760 may influence UPF (re)selection and traffic routing. Based on operator deployment, when AF 1760 is considered to be a trusted entity, the network operator may permit AF 1760 to interact directly with relevant NFs. Additionally, the AF 1760 may exhibit an Naf service-based interface.

The data network 1736 may represent various network operator services, Internet access, or third party services that may be provided by one or more servers including, for example, application/content server 1738.

FIG. 18 schematically illustrates a wireless network 1800 in accordance with various embodiments. The wireless network 1800 may include a UE 1802 in wireless communication with an AN 1804. The UE 1802 and AN 1804 may be similar to, and substantially interchangeable with, like-named components described elsewhere herein.

The UE 1802 may be communicatively coupled with the AN 1804 via connection 1806. The connection 1806 is illustrated as an air interface to enable communicative coupling, and can be consistent with cellular communications protocols such as an LTE protocol or a 5G NR protocol operating at mmWave or sub-6 GHz frequencies.

The UE 1802 may include a host platform 1808 coupled with a modem platform 1810. The host platform 1808 may include application processing circuitry 1812, which may be coupled with protocol processing circuitry 1814 of the modem platform 1810. The application processing circuitry 1812 may run various applications for the UE 1802 that source/sink application data. The application processing circuitry 1812 may further implement one or more layer operations to transmit/receive application data to/from a data network. These layer operations may include transport (for example UDP) and Internet (for example, IP) operations The protocol processing circuitry 1814 may implement one or more of layer operations to facilitate transmission or reception of data over the connection 1806. The layer operations implemented by the protocol processing circuitry 1814 may include, for example, MAC, RLC, PDCP, RRC and NAS operations.

The modem platform 1810 may further include digital baseband circuitry 1816 that may implement one or more layer operations that are "below" layer operations performed by the protocol processing circuitry 1814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1810 may further include transmit circuitry 1818, receive circuitry 1820, RF circuitry 1822, and RF front end (RFFE) 1824, which may include or connect to one or more antenna panels 1826. Briefly, the transmit circuitry 1818 may include a digital-to-analog converter, mixer, intermediate frequency (IF) components, etc.; the receive circuitry 1820 may include an analog-to-digital converter, mixer, IF components, etc.; the RF circuitry 1822 may include a low-noise amplifier, a power amplifier, power tracking components, etc.; RFFE 1824 may include filters (for example, surface/bulk acoustic wave filters), switches, antenna tuners, beamforming components (for example, phase-array antenna components), etc. The selection and arrangement of the components of the transmit circuitry 1818, receive circuitry 1820, RF circuitry 1822, RFFE 1824, and antenna panels 1826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1814 may include one or more instances of control circuitry (not shown) to provide control functions for the transmit/receive components.

A UE reception may be established by and via the antenna panels 1826, RFFE 1824, RF circuitry 1822, receive circuitry 1820, digital baseband circuitry 1816, and protocol processing circuitry 1814. In some embodiments, the antenna panels 1826 may receive a transmission from the AN 1804 by receive-beamforming signals received by a plurality of antennas/antenna elements of the one or more antenna panels 1826.

A UE transmission may be established by and via the protocol processing circuitry 1814, digital baseband circuitry 1816, transmit circuitry 1818, RF circuitry 1822, RFFE 1824, and antenna panels 1826. In some embodiments, the transmit components of the UE 1804 may apply a spatial filter to the data to be transmitted to form a transmit beam emitted by the antenna elements of the antenna panels 1826.

Similar to the UE 1802, the AN 1804 may include a host platform 1828 coupled with a modem platform 1830. The host platform 1828 may include application processing circuitry 1832 coupled with protocol processing circuitry 1834 of the modem platform 1830. The modem platform may further include digital baseband circuitry 1836, transmit circuitry 1838, receive circuitry 1840, RF circuitry 1842, RFFE circuitry 1844, and antenna panels 1846. The components of the AN 1804 may be similar to and substantially interchangeable with like-named components of the UE 1802. In addition to performing data transmission/reception as described above, the components of the AN 1808 may perform various logical functions that include, for example, RNC functions such as radio bearer management, uplink and downlink dynamic radio resource management, and data packet scheduling.

FIG. 19 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1900 including one or more processors (or processor cores) 1910, one or more memory/storage devices 1920, and one or more communication resources 1930, each of which may be communicatively coupled via a bus 1940 or other interface circuitry. For embodiments where node virtualization (e.g., NFV) is utilized, a hypervisor 1902 may be executed to provide an execution environment for one or more network slices/sub-slices to utilize the hardware resources 1900.

The processors 1910 may include, for example, a processor 1912 and a processor 1914. The processors 1910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1920 may include main memory, disk storage, or any suitable combination thereof. The memory/storage devices 1920 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1930 may include interconnection or network interface controllers, components, or other suitable devices to communicate with one or more peripheral devices 1904 or one or more databases 1906 or other network elements via a network 1908. For example, the communication resources 1930 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1950 may comprise software, a program, an application, an applet, an app, or other executable code for causing at least any of the processors 1910 to perform any one or more of the methodologies discussed herein. The instructions 1950 may reside, completely or partially, within at least one of the processors 1910 (e.g., within the processor's cache memory), the memory/storage devices 1920, or any suitable combination thereof. Furthermore, any portion of the instructions 1950 may be transferred to the hardware resources 1900 from any combination of the peripheral devices 1904 or the databases 1906. Accordingly, the memory of processors 1910, the memory/storage devices 1920, the peripheral devices 1904, and the databases 1906 are examples of computer-readable and machine-readable media.

Example Procedures

In some embodiments, the electronic device(s), network(s), system(s), chip(s) or component(s), or portions or implementations thereof, of FIGS. 17-19, or some other figure herein, may be configured to perform one or more processes, techniques, or methods as described herein, or portions thereof. One such process 2000 is depicted in FIG. 20. In some embodiments, the process 200 may be performed by a gNB or a portion thereof. At 2002, the process

2000 may include identifying resources on which a user equipment (UE) is to transmit an uplink message with uplink control information (UCI) with a first priority and UCI with a second priority, wherein the first priority is a higher priority than the second priority. At 2004, the process may further include determining, based on the identification, not to schedule a physical uplink control channel (PUCCH) with the first priority that overlaps with the identified resources.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include One or more non-transitory, computer-readable media (NTCRM) having instructions, stored thereon, that when executed by one or more processors of a next generation Node B (gNB) configure the gNB to: identify resources on which a user equipment (UE) is to transmit an uplink message with uplink control information (UCI) with a first priority and UCI with a second priority, wherein the first priority is a higher priority than the second priority; and determine, based on the identification, not to schedule a physical uplink control channel (PUCCH) with the first priority that overlaps with the identified resources.

Example A2 may include the one or more NTCRM of example A1, wherein the instructions, when executed, are further to configure the gNB to determine, based on the identification, not to schedule a physical uplink shared channel (PUSCH) with the first or second priority that overlaps with the identified resources.

Example A3 may include the one or more NTCRM of example A1, wherein the uplink message is a PUCCH or a physical uplink shared channel (PUSCH).

Example A4 may include the one or more NTCRM of example A1, wherein the uplink message is a result of a collision handling procedure in which the UE first resolves overlapping for PUCCHs and/or PUSCHs with a same priority and then resolves overlapping of PUCCHs with different priorities.

Example A5 may include the one or more NTCRM of example A1, wherein the first UCI and second UCI are associated with different service types.

Example A6 may include one or more non-transitory, computer-readable media (NTCRM) having instructions, stored thereon, that when executed by one or more processors of a user equipment (UE) configure the UE to: receive a first physical uplink control channel (PUCCH) configuration and a second PUCCH configuration, wherein the first PUCCH configuration is sub-slot based; identify a first PUCCH resource allocation for transmission of a first PUCCH transmission based on the first PUCCH configuration, wherein the first PUCCH transmission has a first priority; identify a second PUCCH resource allocation for transmission of a second PUCCH based on the second PUCCH configuration, wherein the second PUCCH resource allocation overlaps with the first PUCCH resource allocation, and wherein the second PUCCH has a second priority that is less than the first priority; determine a reference slot based on the second PUCCH configuration, wherein the second PUCCH resource allocation is in the reference slot; determine a set of resources for the reference slot, wherein the set of resources includes the first and second PUCCH resource allocations; and determine whether to multiplex uplink control information (UCI) of the first and second PUCCHs based on the determined set of resources.

Example A7 may include the one or more NTCRM of example A6, wherein the reference slot is an earliest sub-slot of the first PUCCH configuration with which the second PUCCH transmission overlaps.

Example A8 may include the one or more NTCRM of example A6, wherein a portion of the second PUCCH resource allocation does not overlap with the reference slot.

Example A9 may include the one or more NTCRM of example A6, wherein it is determined to multiplex the UCI of the first and second PUCCHs, and wherein the instructions, when executed, are further to configure the UE to encode the multiplexed UCI for transmission.

Example A10 may include the one or more NTCRM of example A6, wherein the reference slot is a first reference slot, wherein the set of resources is a first set of resources, and wherein the instructions, when executed, are further to configure the UE to: if it is determined not to multiplex the UCI of the second PUCCH with the UCI of the first PUCCH, include the second PUCCH resource allocation in a second set of resources for a second reference slot of the first PUCCH configuration, wherein the second PUCCH resource allocation overlaps with the second reference slot; and determine whether to multiplex the UCI of the second PUCCH based on the second set of resources.

Example A11 may include the one or more NTCRM of example A10, wherein the second reference slot is a subsequent subslot from the first reference slot based on the first PUCCH configuration.

Example B1 may include a method of NR UL wireless communication, the method comprising: receiving by a UE, a first resource for a first PUCCH or PUSCH transmission; receiving by the UE, at least a second resource for a second PUCCH or PUSCH transmission, wherein the second resource overlaps with the first resource; and determining by the UE, how to multiplex the one or more UCIs from the PUCCHs onto one PUCCH or PUSCH, or drop PUSCH and transmit one or both PUCCHs.

Example B2 may include the method of example B1 or some other example herein, wherein at least a second resource includes a second resource and a third resource, and the third resource does not overlap with the second resource, and the third resource overlaps with the first resource.

Example B3 may include the method of example B1 or example B2 or some other example herein, where how to multiplex the one or more UCIs from the PUCCHs onto one PUCCH or PUSCH, or drop PUSCH and transmit one or both PUCCHs, includes: determine a reference slot to determine a resource set Q to perform PUCCH multiplexing, where the reference slot is the determined by PUCCH resource configuration with high priority.

Example B4 may include the method of example B3 or some other example herein, where the resource set Q includes PUCCH resources with high priority within the reference slot, and PUCCH resources with low priority associated with the reference slot.

Example B5 may include the method of example B1 or example B2 or some other example herein, where how to multiplex the one or more UCIs from the PUCCHs onto one PUCCH or PUSCH, or drop PUSCH and transmit one or both PUCCHs, includes: firstly resolving overlapping between PUCCH and PUSCH within the same priority, secondly resolving overlapping between PUCCHs with different priorities first, and thirdly resolving overlapping between PUSCH and PUSCHs with different priorities.

Example B6 may include the method of example B1 or example B2 or some other example herein, where how to multiplex the one or more UCIs from the PUCCHs onto one PUCCH or PUSCH, or drop PUSCH and transmit one or both PUCCHs, includes: firstly, resolving overlapping between PUCCH and PUSCH within the same priority, secondly resolving overlapping between PUCCH and/or PUSCHs with different priorities in time order.

Example B7 may include the method of example B6 or some other example herein, where resolving overlapping between PUCCH and/or PUSCHs with different priorities in time order includes: identify two overlapped resources with earliest starting symbols and perform multiplexing or cancellation, and, identify a resource that results from multiplexing or cancellation of the two overlapped resources, and, identify another resource overlapped with the resultant resource with earliest starting symbols and perform multiplexing or cancellation.

Example B8 may include a method of a UE, the method comprising: receiving a first resource allocation for a first uplink transmission; receiving a second resource allocation for a second uplink transmission, wherein the second resource allocation overlaps with the first resource allocation; and determining whether to multiplex one or more UCIs onto the first or second uplink transmission or drop the first or second uplink transmission.

Example B9 may include the method of example B8 or some other example herein, wherein the first and/or second uplink transmissions include a PUCCH or a PUSCH.

Example B10 may include the method of example B8-B9 or some other example herein, further comprising determining a reference slot to determine a resource set Q to perform PUCCH multiplexing, where the reference slot is the determined by a PUCCH resource configuration with high priority.

Example B11 may include the method of example B10 or some other example herein, where the resource set Q includes PUCCH resources with high priority within the reference slot, and PUCCH resources with low priority associated with the reference slot.

Example Z01 may include an apparatus comprising means to perform one or more elements of a method described in or related to any of examples A1-A11, B1-B11, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A11, B1-B11, or any other method or process described herein.

Example Z03 may include an apparatus comprising logic, modules, or circuitry to perform one or more elements of a method described in or related to any of examples A1-A11, B1-B11, or any other method or process described herein.

Example Z04 may include a method, technique, or process as described in or related to any of examples A1-A11, B1-B11, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A11, B1-B11, or portions thereof.

Example Z06 may include a signal as described in or related to any of examples A1-A11, B1-B11, or portions or parts thereof.

Example Z07 may include a datagram, packet, frame, segment, protocol data unit (PDU), or message as described in or related to any of examples A1-A11, B1-B11, or portions or parts thereof, or otherwise described in the present disclosure.

Example Z08 may include a signal encoded with data as described in or related to any of examples A1-A11, B1-B11, or portions or parts thereof, or otherwise described in the present disclosure.

Example Z09 may include a signal encoded with a datagram, packet, frame, segment, protocol data unit (PDU), or message as described in or related to any of examples A1-A11, B1-B11, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A11, B1-B11, or portions thereof.

Example Z11 may include a computer program comprising instructions, wherein execution of the program by a processing element is to cause the processing element to carry out the method, techniques, or process as described in or related to any of examples A1-A11, B1-B11, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |

-continued

| | |
|---|---|
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |

-continued

| | |
|---|---|
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |

| | |
|---|---|
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |

-continued

| | |
|---|---|
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |

| | |
|---|---|
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |

| | |
|---|---|
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |

| | |
|---|---|
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field"

refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. An apparatus for use in a user equipment (UE), wherein the UE comprises:

memory to store:

an indication of a first priority for a first uplink transmission; and an indication of a second priority for a second uplink transmission, wherein the second priority is lower than the first priority and the second uplink transmission at least partially overlaps in time with the first uplink transmission; and one or more processors configured to:

identify that the first uplink transmission is to be transmitted on resources that are based on a sub-slot time division;

identify, based on (a) the first priority being higher than the second priority, and (b) both the first uplink transmission and the second uplink transmission being based on a sub- slot time division, a slot in which to transmit the second uplink transmission, the slot being further based on a first slot of the time division related to the first uplink transmission;

cause completion of the first uplink transmission on the resources that are based on the sub-slot time division; and cause completion of the second uplink transmission in the identified slot.

2. The apparatus of claim 1, wherein the second uplink transmission is a physical uplink control channel (PUCCH) transmission.

3. The apparatus of claim 2, wherein the first uplink transmission is a physical uplink control channel (PUCCH) transmission.

4. The apparatus of claim 1, wherein the time division related to the second uplink transmission is sub-slot based.

5. The apparatus of claim 1, wherein the one or more processors are further configured to multiplex the first and second uplink transmissions in the slot.

6. One or more non-transitory computer-readable media comprising instructions that, upon execution of the instructions by one or more processors of an electronic device, are to cause a user equipment (UE) to:

identify a first priority for a first uplink transmission;

identify a second priority for a second uplink transmission, wherein the second priority is lower than the first priority and the second uplink transmission at least partially overlaps in time with the first uplink transmission;

identify that the first uplink transmission is to be transmitted on resources that are based on a sub-slot time division;

identify, based on (a) the first priority being higher than the second priority, and (b) both the first uplink transmission and the second uplink transmission being based on a sub-slot time division, a slot in which to transmit the second uplink transmission, the slot being further based on a first slot of the time division related to the first uplink transmission;

perform the first uplink transmission on the resources that are based on the sub-slot time division; and perform the second uplink transmission in the identified slot.

7. The one or more non-transitory computer-readable media of claim 6, wherein the second uplink transmission is a physical uplink control channel (PUCCH) transmission.

8. The one or more non-transitory computer-readable media of claim 7, wherein the first uplink transmission is a physical uplink control channel (PUCCH) transmission.

9. The one or more non-transitory computer-readable media of claim 6, wherein the time division related to the second uplink transmission is sub-slot based.

10. The one or more non-transitory computer-readable media of claim 6, wherein the instructions are further to cause the UE to multiplex the first and second uplink transmissions in the slot.

11. One or more non-transitory computer-readable media comprising instructions that, upon execution of the instructions by one or more processors of an electronic device, are to cause a base station to:

transmit, to a user equipment (UE), an indication of a first priority for a first uplink transmission;

transmit, to the UE, an indication of a second priority for a second uplink transmission, wherein the second priority is lower than the first priority and the second uplink transmission at least partially overlaps in time with the first uplink transmission;

transmit, to the UE, an indication that the first uplink transmission is to be transmitted on resources that are based on a sub-slot time division;

receive, from the UE, the first uplink transmission via the resources based on the sub-slot time division; and identify, from the UE, the second uplink transmission performed in a slot that is based on (a) the first priority being higher than the second priority, and (b) both the first uplink transmission and the second uplink transmission being based on a sub-slot time division, the slot being further based on a first slot of the time division related to the first uplink transmission.

12. The one or more non-transitory computer-readable media of claim 11, wherein the second uplink transmission is a physical uplink control channel (PUCCH) transmission.

13. The one or more non-transitory computer-readable media of claim 12, wherein the first uplink transmission is a physical uplink control channel (PUCCH) transmission.

14. The one or more non-transitory computer-readable media of claim 11, wherein the time division related to the first uplink transmission is slot-based.

15. The one or more non-transitory computer-readable media of claim 11, wherein the time division related to the first uplink transmission is sub-slot based.

16. The one or more non-transitory computer-readable media of claim 11, wherein the first and second uplink transmissions are multiplexed in the slot.

\* \* \* \* \*